United States Patent
Yamamoto

(10) Patent No.: US 7,591,560 B2
(45) Date of Patent: Sep. 22, 2009

(54) REFLECTION OPTICAL SYSTEM AND PROJECTION DISPLAY APPARATUS USING THE SAME

(75) Inventor: Chikara Yamamoto, Saitama (JP)

(73) Assignees: Fujinon Corporation, Tokyo (JP); NEC Display Solutions, Ltd., Tokyo (JP)

( * ) Notice: Subject to any disclaimer, the term of this patent is extended or adjusted under 35 U.S.C. 154(b) by 620 days.

(21) Appl. No.: 11/311,324

(22) Filed: Dec. 20, 2005

(65) Prior Publication Data

US 2006/0140635 A1 Jun. 29, 2006

(30) Foreign Application Priority Data

Dec. 28, 2004 (JP) ............................. 2004-380690

(51) Int. Cl.
| | |
|---|---|
| G03B 21/28 | (2006.01) |
| G03B 21/14 | (2006.01) |
| G03B 21/26 | (2006.01) |
| G03B 21/56 | (2006.01) |
| G02B 5/08 | (2006.01) |
| G02B 7/182 | (2006.01) |
| G02B 5/10 | (2006.01) |
| G02F 1/00 | (2006.01) |
| H04N 9/31 | (2006.01) |
| H04N 5/74 | (2006.01) |
| H04N 3/14 | (2006.01) |

(52) U.S. Cl. .............................. 353/99; 353/97; 353/37; 359/450; 359/864; 359/850; 359/449; 359/859; 348/751; 348/761; 348/766; 348/790

(58) Field of Classification Search .................. 353/99, 353/98, 97, 37; 359/450, 864, 460, 838, 359/850, 449, 858, 859; 348/749, 751, 761, 348/766, 790
See application file for complete search history.

(56) References Cited

U.S. PATENT DOCUMENTS 7,178,921 B2 * 2/2007 Konno et al. .................. 353/99

(Continued)

FOREIGN PATENT DOCUMENTS

JP 10-111458 A 4/1998

(Continued)

OTHER PUBLICATIONS

Abstract translation of JP 07-253544 A (patent-family of JP-0343583-B2).*

*Primary Examiner*—Diane I Lee
*Assistant Examiner*—Magda Cruz
(74) *Attorney, Agent, or Firm*—Birch, Stewart, Kolasch & Birch, LLP.

(57) ABSTRACT

A reflection optical system placed between a light valve 5 and a screen 4, wherein curved surfaces are only three reflection surfaces of first to third mirrors 1 to 3, and satisfies the following:

(1) $\theta L < 20$ degrees, (2) 25 degrees $< \theta UL < 55$ degrees, (3) 20 degrees $< \theta M1 < 55$ degrees, (4) 15 degrees $< \theta M2 < 50$ degrees, (5) 8 degrees $< \theta M3 < 30$ degrees, (6) $\theta L < 15$ degrees, (7) 30 degrees $< \theta UL$ and (8) 7.5 degrees $< |\theta F|$, where $\theta L$: minimum angle which a light beam of pupil center forms with respect to the enlargement side image surface; $\theta UL$: difference between maximum and minimum angles which a light beam of pupil center forms with respect to the enlargement side image surface; $\theta M1$, $\theta M2$ and $\theta M3$: deviation angles of the light beam of pupil center passing the center of the reduction-side image surface in first to third mirrors 1 to 3; and $\theta F$: reduction-side pupil divergent angle.

16 Claims, 19 Drawing Sheets

EXAMPLE 1

U.S. PATENT DOCUMENTS

2003/0090794 A1* 5/2003 Chatani et al. .............. 359/449
2005/0041220 A1* 2/2005 Sunaga ........................ 353/99

FOREIGN PATENT DOCUMENTS

| JP | 3043583 B2 | 3/2000 |
| JP | 2001-222063 A | 8/2001 |
| JP | 2001-235681 A | 8/2001 |
| JP | 2003-344772 A | 12/2003 |

* cited by examiner

EXAMPLE 1

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

YZ CROSS-SECTIONAL VIEW

ILLUMINATION LIGHT

XZ CROSS-SECTIONAL VIEW

YZ CROSS-SECTIONAL VIEW

ILLUMINATION LIGHT

XZ CROSS-SECTIONAL VIEW

REFLECTION OPTICAL SYSTEM AND PROJECTION DISPLAY APPARATUS USING THE SAME

RELATED APPLICATIONS

This application claims the priority of Japanese Patent Application No. 2004-380690 filed on Dec. 28, 2004, which is incorporated herein by reference.

BACKGROUND OF THE INVENTION

1. Field of the Invention

The present invention relates to a reflection optical system applicable to a projection optical system or a image optical system which is used in a camera using an image pickup device such as a CCD or image pickup tube and a film, and particularly to a reflection optical system suitable for a projection optical system projecting display information of a light valve under magnification, and a projection display apparatus using the reflection optical system.

2. Description of the Prior Art

In projection optical systems of projection display apparatuses and projection television apparatuses, refracting optical systems using an optical glass, and optical systems having a refracting optical system and a mirror in combination are widely known, and most of projection optical systems that are currently used are these types of projection optical systems.

However, if the refracting optical system is used, a chromatic aberration inevitably occurs because of characteristics of the optical glass. Particularly, an on-axis chromatic aberration for the long-focus telephoto type and a magnification chromatic aberration for the short-focus wide angle type are very serious problems.

For eliminating such aberrations, an optical system comprised only of mirrors has been proposed.

In Japanese Unexamined Patent Publication Nos. HEI 10-111458, 2001-222063, 2001-235681, and 2003-344772, and Japanese Patent No. 3043583, optical systems including three mirrors formed of curved surfaces and having a small number of mirrors is proposed.

However, the optical systems described in the above five documents described above have still many serious problems for practical use as a projection optical system, such that an enlargement side angle of view is narrow, an angle formed with an enlargement side image surface is large, a reduction side luminous flux divergent angle is small, and any specific proposal for a focus system is not made.

If the enlargement side angle of view is small, a distance between the enlargement side image surface and the optical system is increased when a magnification is to be increased, and therefore upsizing of apparatuses is incurred and limitations on placement positions become severer, which is not preferable. If the angle formed with the enlargement side image surface is large, a difference between the enlargement side image surface and the position of the optical system in the height direction increases, and therefore upsizing of apparatuses is incurred and limitations on placement positions become severer, which is not preferable.

If the reduction side luminous flux divergent angle is small, it means, so to speak, that the F-number of the optical system is large, and therefore a configuration making the F-number smaller and increasing the reduction side luminous flux divergent angle is desired. It is difficult to put the optical system to practical use unless a specific proposal is made on what focus system is employed, e.g. how to shift which member to perform focusing.

SUMMARY OF THE INVENTION

The present invention has been made in view of the circumstances described above, and an object of the present invention is to provide a reflection optical system which having less aberrations and particularly being free of chromatic aberration, being cost-effective, having a wide angle, and allowing an enlargement side image surface and the position of an optical system to be close to each other in the height direction when used in a projection optical system, and a projection display apparatus using the reflection optical system.

Further, it is an object of the present invention to provide a reflection optical system with consideration also given to a focus system ensuring brightness and having a reduced performance degradation which is strongly desired as a projection optical system, and a projection display apparatus using the reflection optical system.

The reflection optical system according to the present invention is a reflection optical system placed between two image surfaces one of which is an enlargement side image surface and the other of which is a reduction side image surface, and forming no intermediate image between the two image surfaces, said reflection optical system comprising:

a first mirror;
a second mirror; and
a third mirror;

wherein among optical surfaces of the reflection optical system, curved surfaces are only three reflection surfaces of the first mirror, the second mirror and the third mirror in the order from the side of the enlargement side image surface, and the following conditional expressions (1) and (2) are met:

$$\theta L < 20 \text{ degrees} \tag{1}$$

$$25 \text{ degrees} < \theta UL < 55 \text{ degrees} \tag{2}$$

where

θL: minimum angle which a light beam passing through a pupil center (hereinafter referred to a light beam of pupil center) forms with respect to the enlargement side image surface; and θUL: difference between maximum and minimum angles which a light beam of pupil center forms with respect to the enlargement side image surface.

In this specification, if lines substantially bisecting angularly sharp angles formed by projecting a reflection optical system effective luminous flux from each position of the reduction side image surface onto a plane vertical to the reduction side image surface and including the center of the reduction side image surface and the center of the enlargement side image surface substantially intersect in this plane, the "light beam of pupil center" represents each light beam passing through the substantially intersecting position and each position of the reduction side image surface, and if lines substantially bisecting angularly the respective sharp angles are mutually substantially parallel in this plane, the "light beam of pupil center" represents each light beam passing through each position of the reduction side image surface and parallel to the substantially parallel lines.

It is preferable that in the reflection optical system, only one symmetry plane exists, and the following conditional expressions (3) to (5) are met in this symmetry plane:

$$20 \text{ degrees} < \theta M1 < 55 \text{ degrees} \tag{3}$$

$$15 \text{ degrees} < \theta M2 < 50 \text{ degrees} \tag{4}$$

$$8 \text{ degrees} < \theta M3 < 30 \text{ degrees} \tag{5}$$

where

θM1: deviation angle of the light beam of pupil center passing through the center of the reduction side image surface in the first mirror;

θM2: deviation angle of the light beam of pupil center passing through the center of the reduction side image surface in the second mirror; and θM3: deviation angle of the light beam of pupil center passing through the center of the reduction side image surface in the third mirror.

It is preferable that the following conditional expressions (6) to (8) are met:

$$\theta L < 15 \text{ degrees} \quad (6)$$

$$30 \text{ degrees} < \theta UL \quad (7)$$

$$7.5 \text{ degrees} < |\theta F| \quad (8)$$

where

θF: reduction side pupil divergent angle.

It is preferable that the enlargement side image surface and the reduction side image surface are non-parallel.

It is preferable that a focus operation is adapted so that the first mirror is shifted alone, the second mirror and the third mirror are shifted integrally, and shift trails of the three mirrors form straight lines.

In the focus operation the first mirror may be shifted alone, and the second mirror and the third mirror are fixed to the reduction side image surface. It is preferable that in the focus operation, a shift trail of the first mirror forms a straight line.

It is preferable that in the reflection optical system, a reduction side pupil position is at an infinite distance, and angles which the light beam of pupil center form with respect to the normal line of the reduction side image surface at points on the reduction side image surface are mutually substantially equal. In this case, it is more preferable that a fixed diaphragm or adjustable diaphragm for controlling luminous flux diameter is placed between the second mirror and the third mirror.

A reduction side pupil position may be near the third mirror. In this case, it is more preferable that a fixed diaphragm or adjustable diaphragm for controlling the luminous flux diameter is placed near the third mirror.

It is preferable that this reflection optical system is used as a projection optical system projecting under magnification an image displayed on the reduction side image surface onto the enlargement side image surface. In this case, it is preferable that a color combining optical system is placed between the third mirror and the reduction side image surface.

It is preferable that, in the reflection optical system, the color combining optical system is a cross dichroic prism. Further, the color combining optical system may be a polarization beam splitter.

It is preferable that at least one color correction means for correcting a chromatic aberration occurring in the color combining optical system is placed between the color combining optical system and the reduction side image surface.

The projection display apparatus according to the present invention comprises: a light source; a light valve placed on the reduction side image surface; an illumination optical section guiding a luminous flux from the light source to the light valve; and any of the above-mentioned reflection optical systems; wherein the luminous flux from the light source is optically modulated by the light valve, and projected onto a screen placed on the enlargement side image surface by the reflection optical system.

DESCRIPTION OF THE PREFERRED EMBODIMENTS

Figure 1A:
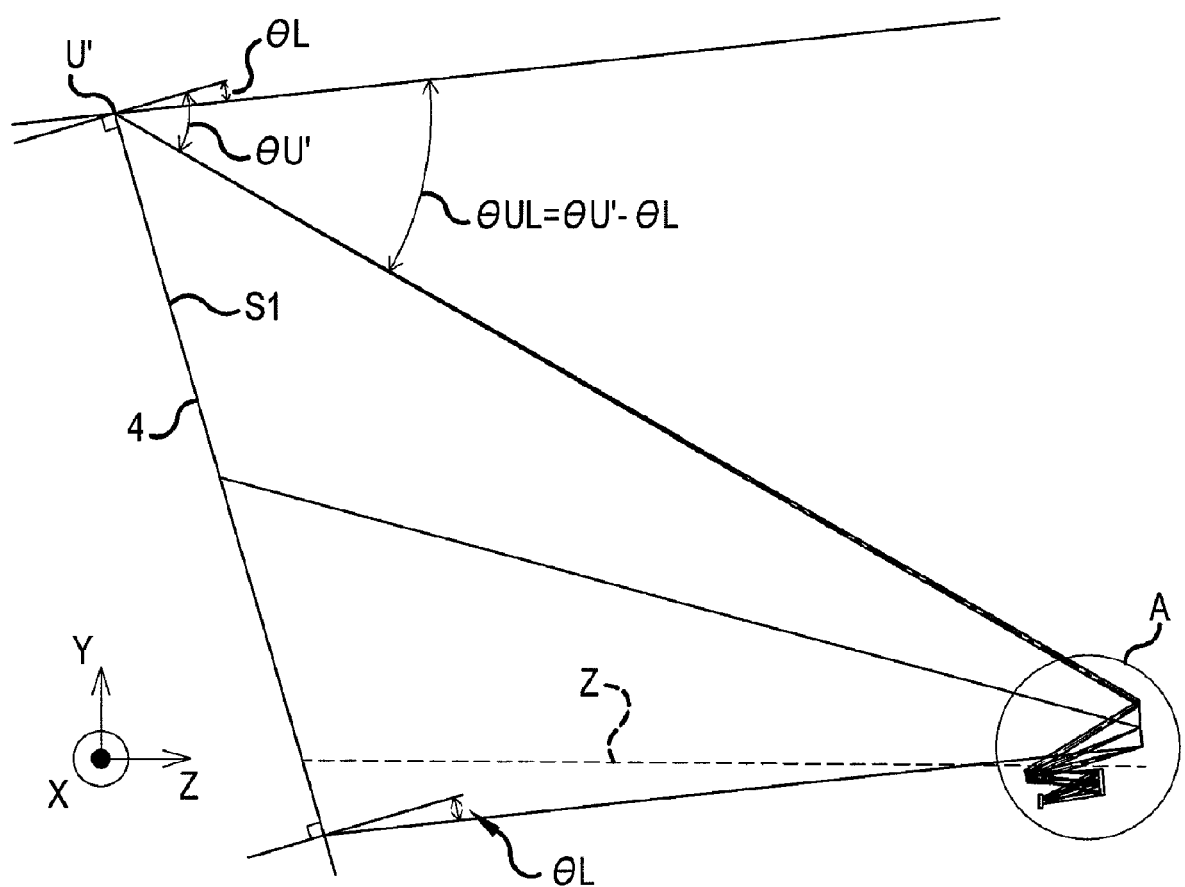
FIGS. 1A and 1B show the configuration of a reflection optical system according to example 1.
Figure 1B:
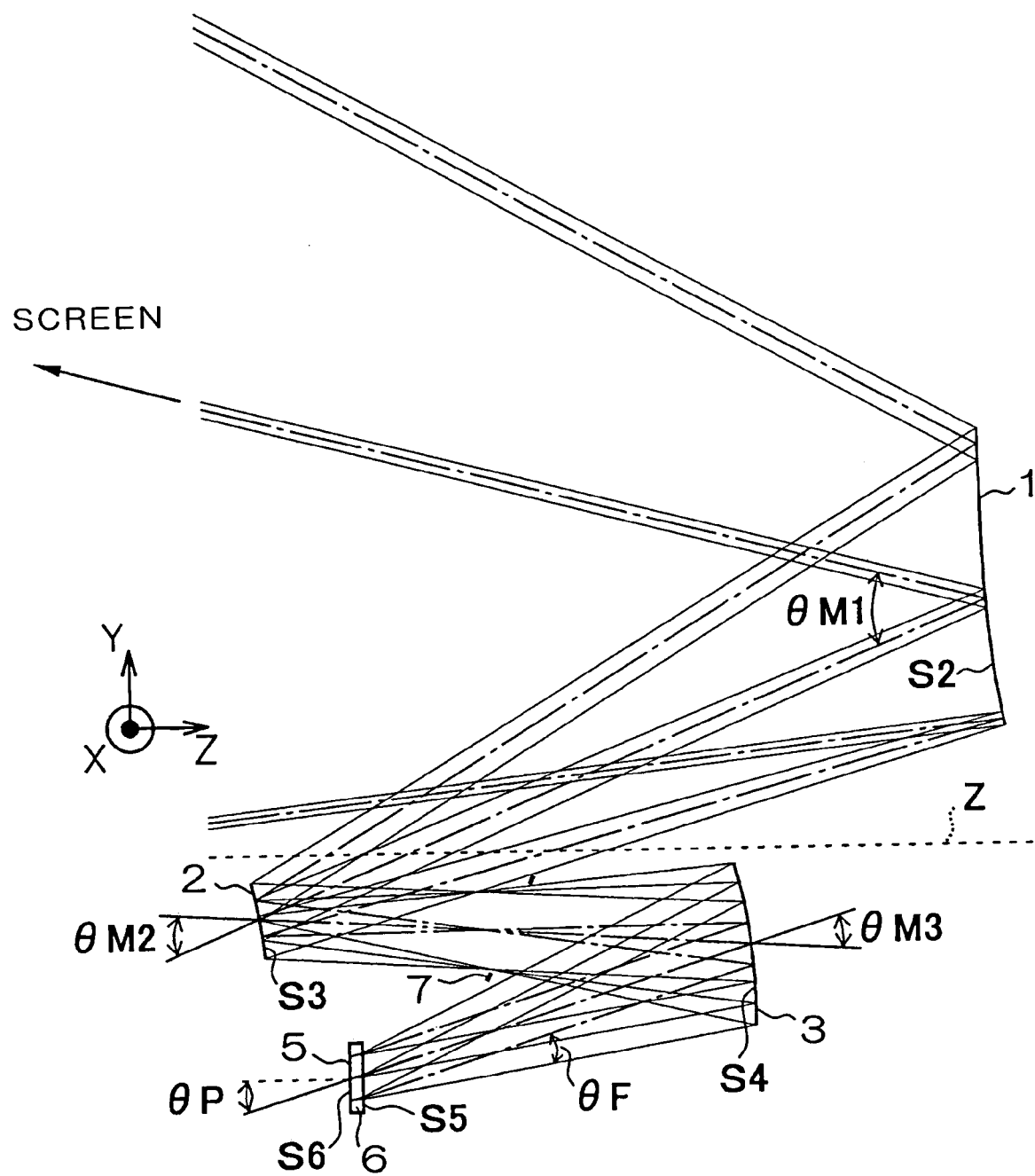

Embodiments of a reflection optical system according to the present invention and a projection display apparatus using the reflection optical system will be described below with reference to the drawings. FIGS. 1A and 1B are YZ plane sectional views showing the configuration of the reflection optical system according to example 1 of the present invention, and first the embodiment of the present invention will be described using the figure as a representative. This reflection optical system is used as a projection optical system of a projection display apparatus, and FIG. 1A shows an entire section from a reduction side image surface to an enlargement side image surface, and FIG. 1B shows a part A as a main part of FIG. 1A under magnification.

This projection display apparatus applies a luminous flux from a light source (not shown) to a light valve 5 via an illumination optical section (not shown), and projects the luminous flux optically modulated by the light valve 5 and carrying image information onto a screen 4 under magnification by the reflection optical system. The screen 4 is so situated as to substantially coincide with the enlargement side image surface of the reflection optical system, and the light valve 5 is so situated as to substantially coincide with the reduction side image surface of the reflection optical system. A cover glass 6 (parallel plane plate) is placed on the light emission side of the light valve 5.

The reflection optical system according to the present invention is configured such that only one symmetry plane exists in this reflection optical system, and in FIGS. 1A and 1B, this symmetry plane is a cross section of the sheet. Namely, this reflection optical system is substantially plane-symmetric with respect to the sheet (symmetry plane) of FIGS. 1A and 1B. This symmetry plane is an YZ plane, in which a direction along which the reduction side image surface extends is a Y direction and a direction orthogonally crossing the Y direction is a Z direction. In FIGS. 1A and 1B, the Z axis is shown by a dotted line Z.

Here, the reflection optical system of the present invention is a reflection optical system placed between the enlargement side image surface and the reduction side image surface and forming no intermediate image between these two image surfaces, wherein among optical surfaces constituting the reflection optical system, curved surfaces are only three reflection surfaces of a first mirror 1, a second mirror 2 and a third mirror 3 in the order from the side of the enlargement side image surface. It is a matter of option to place a plane member such as the cover glass 6 between the reduction side image surface and the enlargement side image surface.

Since among optical surfaces constituting the reflection optical system, curved surfaces are only three reflection surfaces of first to third mirrors 1 to 3, and a curved surface by an optical glass is not used, this reflection optical system is free of occurrence of a chromatic aberration and has a good optical performance. In addition, the reflection optical system is a cost-effective optical system because it is comprised of a small number of mirrors, i.e. three mirrors.

The reflection optical system is configured to meet the following conditional expressions (1) and (2):

$$\theta L < 20 \text{ degrees} \tag{1}$$

$$25 \text{ degrees} < \theta UL < 55 \text{ degrees} \tag{2}$$

where

θL: minimum angle which a light beam of pupil center forms with respect to the enlargement side image surface; and θUL: difference between maximum and minimum angles which a light beam of pupil center forms with respect to the enlargement side image surface.

The "light beam of pupil center" is a light beam passing through the center of a reduction side pupil, and can be said to correspond to a main light beam in a general optical system. The light beam of pupil center is shown by a chain line in FIGS. 1A and 1B and subsequent FIGS. 6 to 10 and FIGS. 12 to 18A and 18B. Namely, in the specification, if lines substantially bisecting angularly sharp angles formed by projecting a reflection optical system effective luminous flux from each position of the reduction side image surface onto a plane (the sheet of each drawing described above (YZ plane)) vertical to the reduction side image surface and including the center of the reduction side image surface and the center of the enlargement side image surface substantially intersect in this plane, the "light beam of pupil center" represents each light beam passing the substantially intersecting position and each position of the reduction side image surface, and if lines substantially bisecting angularly the sharp angles are mutually substantially parallel in this plane, the "light beam of pupil center" represents each light beam passing through each position of the reduction side image surface and parallel to the substantially parallel lines.

In this example, the angle θL specified in the conditional expression (1) is as shown in FIGS. 1A and 1B, but the maximum angle θU which provides a base for calculation of the angle difference θUL specified in the conditional expression (2) and which the light beam of pupil center forms with respect to the enlargement side image surface cannot be shown in FIGS. 1A and 1B, and therefore a point U' and an angle θU' on the symmetry plane are shown for the sake of convenience. The maximum angle θU is an angle which the light beam of pupil center forms with respect to the enlargement side image surface at a position of the point U' maximally parallel-displaced to the front or rear of the sheet along the edge of the enlargement side image surface. The angle θL and the angle difference θUL may be considered as absolute values irrespective of the directivity of each angle.

Figure 2:
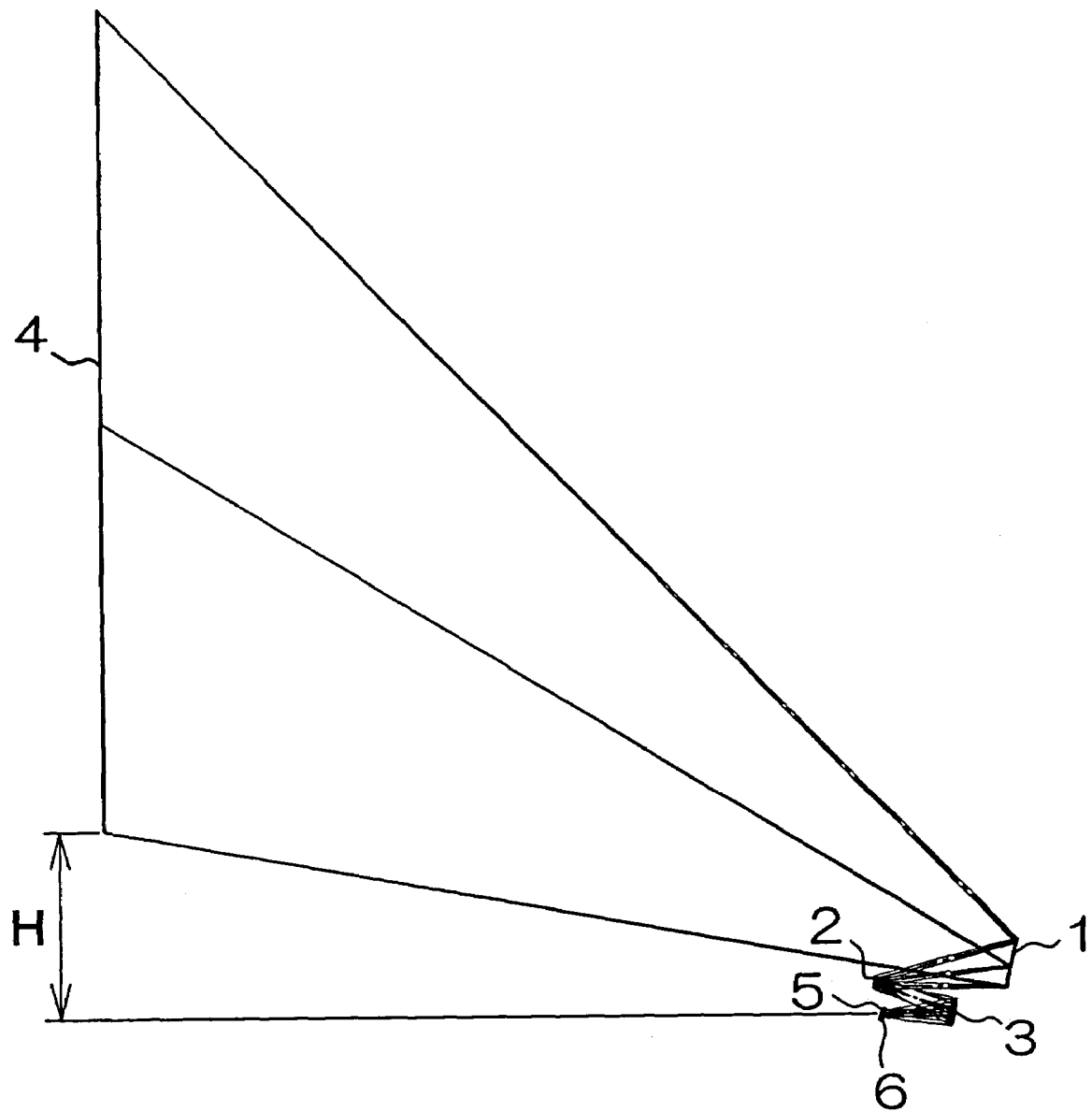
FIG. 2 is a view in which the reflection optical system of FIG. 1 is rotated.

If the angle θL increases to cross the upper limit specified in the conditional expression (1), it is not preferable because the difference between the enlargement side image surface and the position of the reflection optical system increases in up-and-down direction on the sheet. For explaining the difference, FIG. 2 shows a view in which the reflection optical system of FIG. 1A is rotated so that the enlargement side image surface (screen 4) extends in the up-and-down direction on the sheet. Here, H represents a distance from an edge of the enlargement side image surface nearest to the reflection optical system to the center position of the reduction side image surface (light valve 5) in the direction along which the enlargement side image surface extends. If H, i.e. a difference between the enlargement side image surface and the position of the reflection optical system in the height direction, increases, upsizing of the apparatus is incurred and limitations on placement positions become severer, which is not preferable. In recent years, for the rear projection type growing in demand, the projection optical system and other components are placed in a housing such as, for example, a TV box, and therefore particularly a demand for compactness has been strong and compactness in the height direction has become important.

Figure 3:
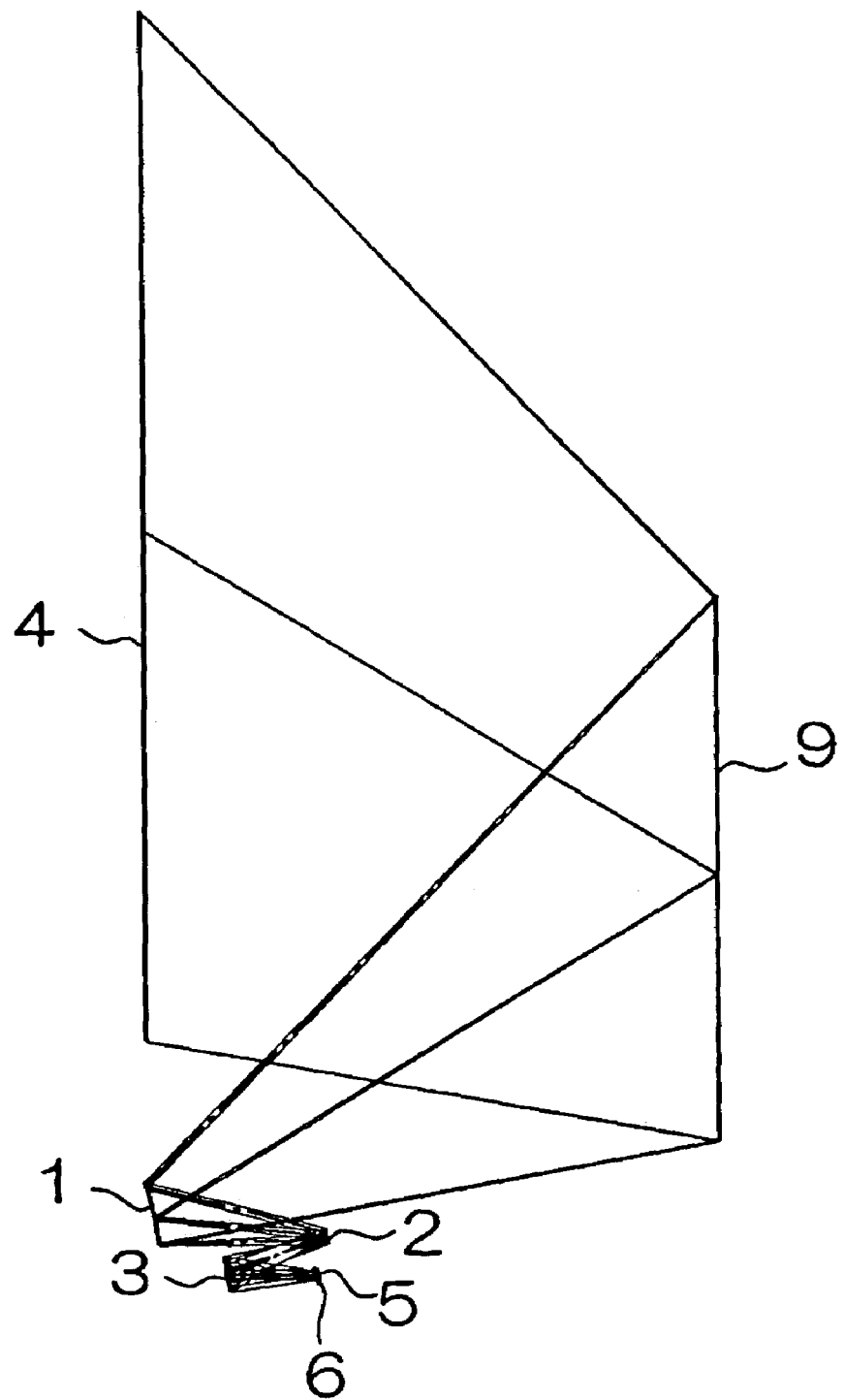
FIG. 3 is a view in which plane mirrors are placed in the reflection optical system of FIG. 2.

The conditional expression (2) specifies the angle difference θUL which is a difference between maximum and minimum angles which the light beam of pupil center forms with respect to the enlargement side image surface. This corresponds to, so to speak, an angle of view on the enlargement side, and if the angle of view decreases and the angle difference θUL crosses the lower limit, it is required to increase the distance between the enlargement side image position and the reflection optical system when the magnification is to be increased, and therefore upsizing of the apparatus is incurred and limitations on placement positions become severer, which is not preferable. FIG. 3 shows a configuration in which a plane mirror 8 is placed between the screen 4 and the first mirror 1 in the view of the reflection optical system shown in FIG. 2. The thickness in the left-and-right direction on the sheet can be reduced by such a plane mirror, but if the angle difference θUL crosses the lower limit, it is required to increase the distance between the screen 4 and the plane mirror 8 when the magnification is to be increased.

The wide angle is desired, but if the angle difference θUL crosses the upper limit, members that are placed in a light path are increased for not only the curved mirror but also the plane mirror, resulting in upsizing of the optical system. Thus, if the upper limit and the lower limit in the conditional expression (2) are crossed, the optical system and the apparatus are upsized, and upsizing of a housing is incurred for the rear projection type.

Further, it is preferable that the reflection optical system is configured to meet the following conditional expressions (3) to (5) in the symmetry plane described above:

$$20 \text{ degrees} < \theta M1 < 55 \text{ degrees} \quad (3)$$

$$15 \text{ degrees} < \theta M2 < 50 \text{ degrees} \quad (4)$$

$$8 \text{ degrees} < \theta M3 < 30 \text{ degrees} \quad (5)$$

where $\theta M1$: deviation angle of the light beam of pupil center passing through the center of the reduction side image surface in the first mirror;

$\theta M2$: deviation angle of the light beam of pupil center passing through the center of the reduction side image surface in the second mirror; and $\theta M3$: deviation angle of the light beam of pupil center passing through the center of the reduction side image surface in the third mirror.

As shown in FIG. 1B, angles $\theta M1$ to $\theta M3$ are angles which the light beam of pupil center passing through the center of the reduction side image surface forms in reflection at the first to third mirrors 1 to 3, respectively ($\theta M2$ and $\theta M3$ represent vertical opposite angles for ease of viewing). Each angle may be considered as an absolute value irrespective of the directivity.

If the deviation angle decreases to cross the lower limits in the conditional expressions (3) to (5), it becomes difficult to place members such as mirrors and light valves without hindering the travel of the luminous flux and preventing interference between members. If the deviation angle increases to cross the upper limits, the mirrors are upsized and the entire optical system is upsized.

Further, it is preferable that the reflection optical system of the present invention is configured to meet the following conditional expressions (6) to (8):

$$\theta L < 15 \text{ degrees} \quad (6)$$

$$30 \text{ degrees} < \theta UL \quad (7)$$

$$7.5 \text{ degrees} < |\theta F| \quad (8)$$

where $\theta F$: reduction side pupil divergent angle.

The conditional expressions (6) and (7) further specify the ranges of the conditional expressions (1) and (2), and by meeting these conditional expressions, the above-mentioned action effects can be made further effective.

As shown in FIG. 1B, the reduction side pupil divergent angle $\theta F$ specified in the conditional expression (8) is a luminous flux divergent angle of a pupil outermost light beam (outermost marginal light beam) passing through any point on the reduction side image surface, with respect to the light beam of pupil center passing through this point. For using the optical system in, for example, the projection optical system, it is preferably a bright optical system, but if the lower limit is crossed, the optical system becomes darker and thus is impractical.

Further, it is preferable that in the reflection optical system, the enlargement side image surface and the reduction side image surface are non-parallel to each other. In FIG. 1, the screen 4 and the light valve 5 are placed non-parallel to each other. Such a configuration allows a distortion aberration to be well corrected, thus making it possible to improve a resolution performance. The parallel/non-parallel relation between the enlargement side image surface and the reduction side image surface is a relation where a surface, such as a plane mirror, which only deflects a luminous flux but does not converge or diverges it, is excluded. Even if the enlargement side image surface and the reduction side image surface appears to be parallel to each other at first glance as a result of placement of a plane mirror or the like in the reflection optical system, the reflection optical system is considered as one aspect of the reflection optical system of the present invention.

In the reflection optical system of the present invention, focal operations by the following two systems are effective.

In the focus operation by the first system, the first mirror 1 is shifted alone, and the second mirror 2 and the third mirror 3 are shifted integrally, such that the shift trails of the three mirrors form straight lines respectively.

In the focus operation by the second system, the first mirror 1 is shifted alone, and the second mirror 2 and the third mirror 3 are fixed to the reduction side image surface. At this time, the shift trail of the first mirror 1 preferably forms a straight line.

The focus operation is also required in the reflection optical system because there may be cases where the positional relation between the enlargement side image surface and the reduction side image surface changes particularly in the projection optical system. Since a member is not shifted on an optical axis unlike an image optical system in a coaxial system, the level of difficulty of design is high, and no specific proposal for the focus system has been made, but according to the focus operations by the abovementioned two systems, focusing can be performed without degrading an optical performance. A selection can be appropriately made on which system is used according to the example of configuration, and if the number of moving members is large, ideal placement is possible as there are many variables, while if the number of moving members is small and the members are shifted linearly, there are further advantages such as simplification of a shifting mechanism.

For example, the second system is employed in the reflection optical system of FIG. 1, and the focus operation is performed in a state in which the first mirror 1 is shifted from its state on the sheet to the lower right direction on the sheet (first focus state) or to the upper left direction on the sheet (second focus state), and the second mirror 2 and the third mirror 3 are fixed to the reduction side image surface. The actual shift direction and shift amount of the mirror 1 are based on example 1 described later.

It is preferable that the reflection optical system of the present invention is configured so that the reduction side pupil position is any one of the following two positions.

The first reduction side pupil position is set at an infinite distance. For example, if a projection optical system is used, some light valve 5 has a characteristic in which a difference in angle of incidence to the light valve incurs unevenness in illumination on a projection screen, and the first position is useful as a configuration adapting to such a light valve 5. If the reduction side pupil position is at an infinite distance, angles which the light beam of pupil center forms with respect to the normal line of the reduction side image surface are mutually substantially equal at each point on the reduction side image surface. In the reflection optical system of FIG. 1, the reduction side pupil position is set in this way, and the angle $\theta P$ (vertical opposite angle is shown for ease of viewing) which the light beam of pupil center forms with respect to the normal line of the reduction side image surface is shown. Since the reduction side pupil position is set at an infinite distance, light beams of pupil center are all travel mutually in parallel toward the third mirror 3 of the reflection optical system from each point not only within the sheet but also on the reduction side image surface.

If the reduction side pupil position is set in this way, it is preferable that the curved surface of the mirror 3 is set so that light beams of pupil center from points on the reduction side image surface intersect between the second mirror 2 and the third mirror 3, and a fixed diaphragm or iris diaphragm for controlling the luminous flux diameter is placed near such a position. In the reflection optical system of FIG. 1, a diaphragm 7 is placed near this position so that the luminous flux diameter can be efficiently controlled.

The second reduction side pupil position is set near the third mirror 3. Such a configuration allows downsizing of the third mirror 3. Example 8 described later has such a configuration. If the reduction side pupil position is set in this way, light beams of pupil center from points on the reduction side image surface intersect near the third mirror 3, and it is preferable that a fixed diaphragm or iris diaphragm for controlling the luminous flux diameter is placed near such a position so that the luminous flux diameter can be efficiently controlled.

In the reflection optical system of the present invention, among optical surfaces constituting the reflection optical system, curved surfaces are only three reflection surfaces of the first mirror 1, the second mirror 2 and the third mirror 3 in the order from the enlargement side image surface side, but it is a matter of option to place a plane member between the reduction side image surface and the enlargement side image surface. For example, even if a light transmission member both the surfaces of which are plane, such as the cover glass 6, a light reflection member the reflection surface of which is plane, such as the plane mirror 8 shown in FIG. 3, or the like is placed, advantages of the present invention are not impaired.

Specific examples of the reflection optical system according to the present invention will be described below.

Reflection optical systems according to examples 2 to 10 are used as a projection optical system of the projection display apparatus as in example 1, but for figures showing the configuration of these reflection optical systems, a general view corresponding to FIG. 1A is omitted, and only an enlarged view of main parts corresponding to FIG. 1B is presented. In the enlarged view of main parts of examples 2 to 10, members having action effects same as those in example 1 are given same symbols and the descriptions thereof are not presented.

In reflection optical systems according to examples 1 to 10, values representing a length such as, for example, a radius of curvature of the surface of each member, a distance between surfaces in the Z direction and a shift amount in the Y direction are normalized with the length of an effective area in the X direction on the reduction side image surface set to 1.0.

In examples 1 to 10 below, curved surfaces of the first mirror 1, the second mirror 2 and the third mirror are all free curved surfaces. The shape of the free curved surface is expressed by the following free curved surface shape expression.

$$Z = \frac{\rho^2/R}{1+\sqrt{1-K(\rho^2/R^2)}} + A_4\rho^4 + A_6\rho^6 + A_8\rho^8 + A_{10}\rho^{10} + A_{12}\rho^{12} + \sum\sum C(i,j)X^iY^j$$

where

X, Y, Z: coordinates where the plane apex is the origin $\rho^2$: $X^2+Y^2$

R: radius of curvature

K: eccentricity $A_{2n}$: Z axis symmetric aspherical coefficient (n=2 to 6)

C(i,j): Z axis asymmetric aspherical coefficient (i+j=k, k=1 to 10)

In the free curved surface, the degree of freedom of design for the surface shape is high, and therefore the degree of freedom for setting the direction of deflection of the light beam is high. Aberrations such as a distortion aberration can be well corrected by using the free curved surface. In examples 1 to 10 below, the free curved surface is configured to have one symmetry plane (substantially coincident with the sheet face). The free curved surface of plane-symmetric has an advantage that the level of difficulty in production and evaluation is low.

EXAMPLE 1

The configuration of the reflection optical system according to example 1 is shown in FIGS. 1A and 1B.

The radius of curvature of the surface of each member of the reflection optical system of example 1, the distance between surfaces of each member in the Z direction (air gap between members and central thickness of each member), and the refracting index Nd and Abbe number vd in the d line of each member are shown in Table 1-1 (described later). Surfaces with * shown on the left to the surface number are eccentric surfaces. The shift amount in the Y direction and the amount of rotation about the X axis are shown in Table 1-2 (described later) as eccentricity data of these eccentric surfaces. In this reflection optical system, the enlargement side image surface is rotated with respect to an X axis as a pivot (hereinafter referred to simply as "rotated about the X axis"), and the enlargement side image surface and the reduction side image surface are non-parallel.

The distance between surfaces in the Z direction and the shift amount in the Y direction are shown in Table 1-3 (described later) as data concerning the shift position of the moving member where the focus operation is performed in this example. In this example, two focus positions of a focus 1 and a focus 2 are set. The focus operation in this example is based on the second system described above. The shift trail of the first mirror 1 forms a straight line.

In the table of the radius of curvature and the like, the table of eccentric surface data and the table of focus shift data, the digit of the surface number sequentially increases from the enlargement side image surface side with the enlargement side image surface denoted by the surface number S1, and the surface number S6 denotes the reduction side image surface (the same holds true for tables in examples 2 to 10 below).

The reduction side pupil position (distance from the reduction side image surface in the Z direction) in this example, the reduction side pupil central angle (angle θp which the light beam of pupil center forms with respect to the normal line of the reduction side image surface) and the reduction side pupil divergent angle (θF) are shown in Table 1-4 (described later). The reduction side pupil position in this example is at an infinite distance, and is the above-mentioned first position. This reflection optical system is configured so that light beams of pupil center from points on the reduction side image surface intersect between the second mirror 2 and the third mirror 3, and the diaphragm 7 is placed near such a position.

The lengths of the effective area of the reduction side image surface in the X direction and the Y direction in this example are shown in Table 1-5 (described later).

Further, the eccentricity K for free curved surfaces of the first mirror 1, the second mirror 2 and the third mirror 3, 4-order, 6-order, 8-order, 10-order and 12-order Z axis-symmetric aspherical coefficients $A_4$ to $A_{12}$, and Z axis-asymmetric aspherical coefficients of $C(i,j)$ are shown in Table 2 (described later).

In the reflection optical system according to this example, values corresponding to the conditional expressions (1) to (8) are those shown in Table 21 (described later). This reflection optical system meets all the conditional expressions (1) to (8).

Figure 4:
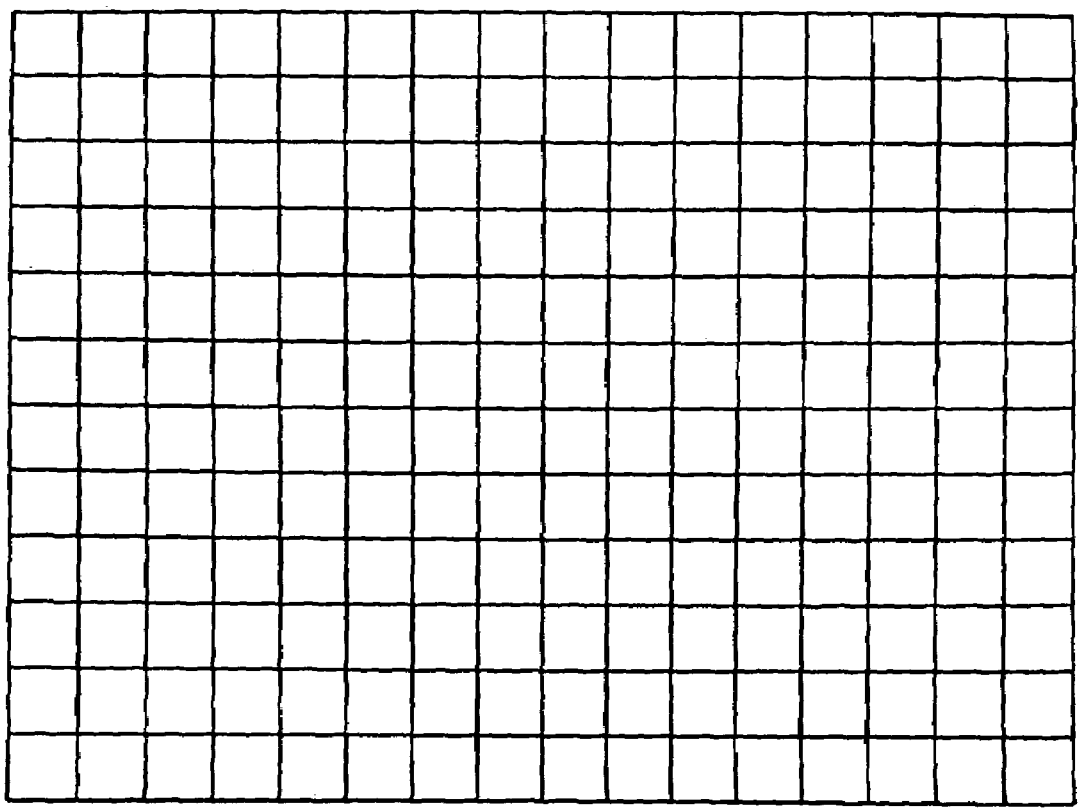
FIG. 4 is a view of a projection distortion in an enlargement side image surface of the reflection optical system according to example 1.
Figure 5:
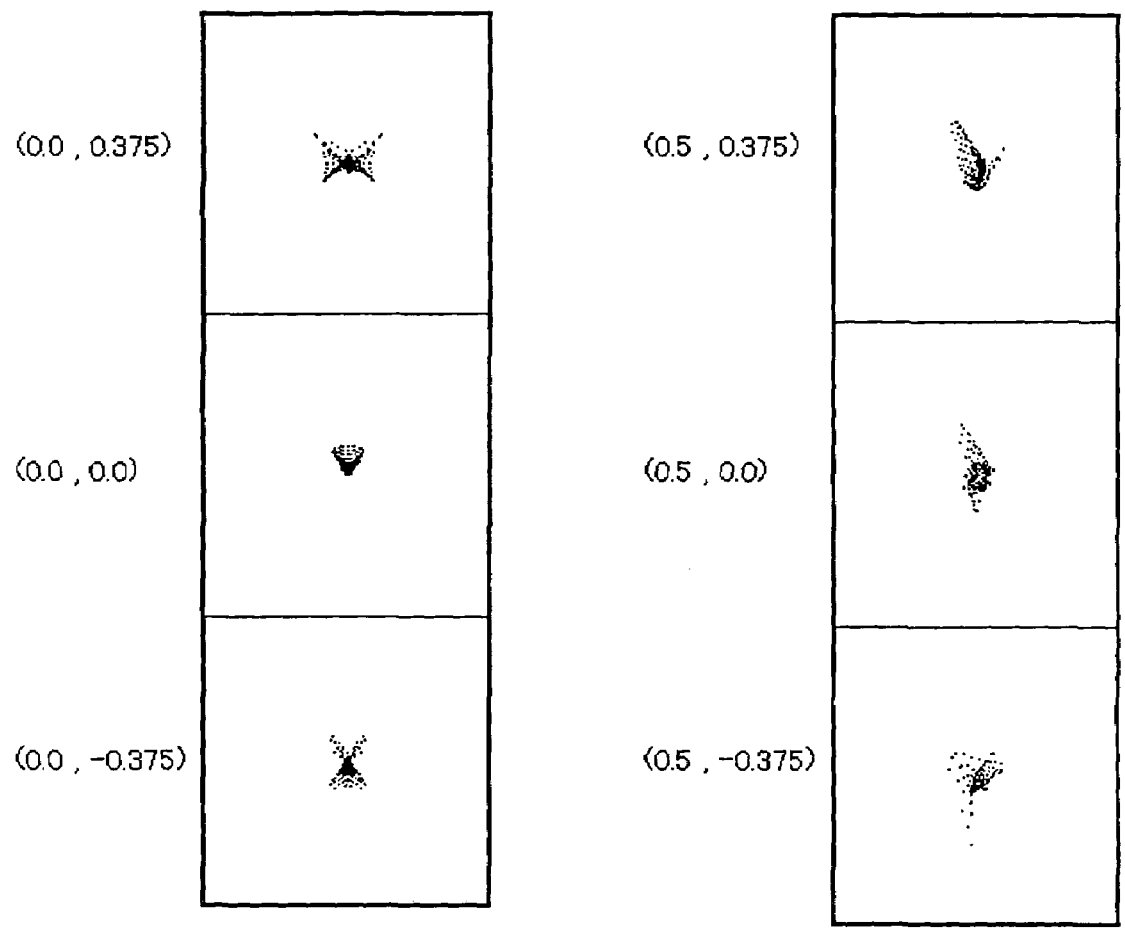
FIG. 5 is a spot diagram in a reduction side image surface of the reflection optical system according to example 1.

FIGS. 4 and 5 show an image performance of the reflection optical system according to example 1. FIG. 4 shows a projection distortion in the enlargement side image surface corresponding to quadrate meshes in the reduction side image surface. In this example, the reduction side image surface and the enlargement side image surface have an aspect ratio of 4:3. FIG. 5 is a spot diagram in the reduction side image surface. Spot shapes at (x, y) positions numerically expressed on the left are shown with the center of the reduction side image surface set to x=0.0, y=0.0. As shown in FIGS. 4 and 5, this reflection optical system is a high-performance reflection optical system allowing aberrations to be well corrected.

EXAMPLE 2

Figure 6:
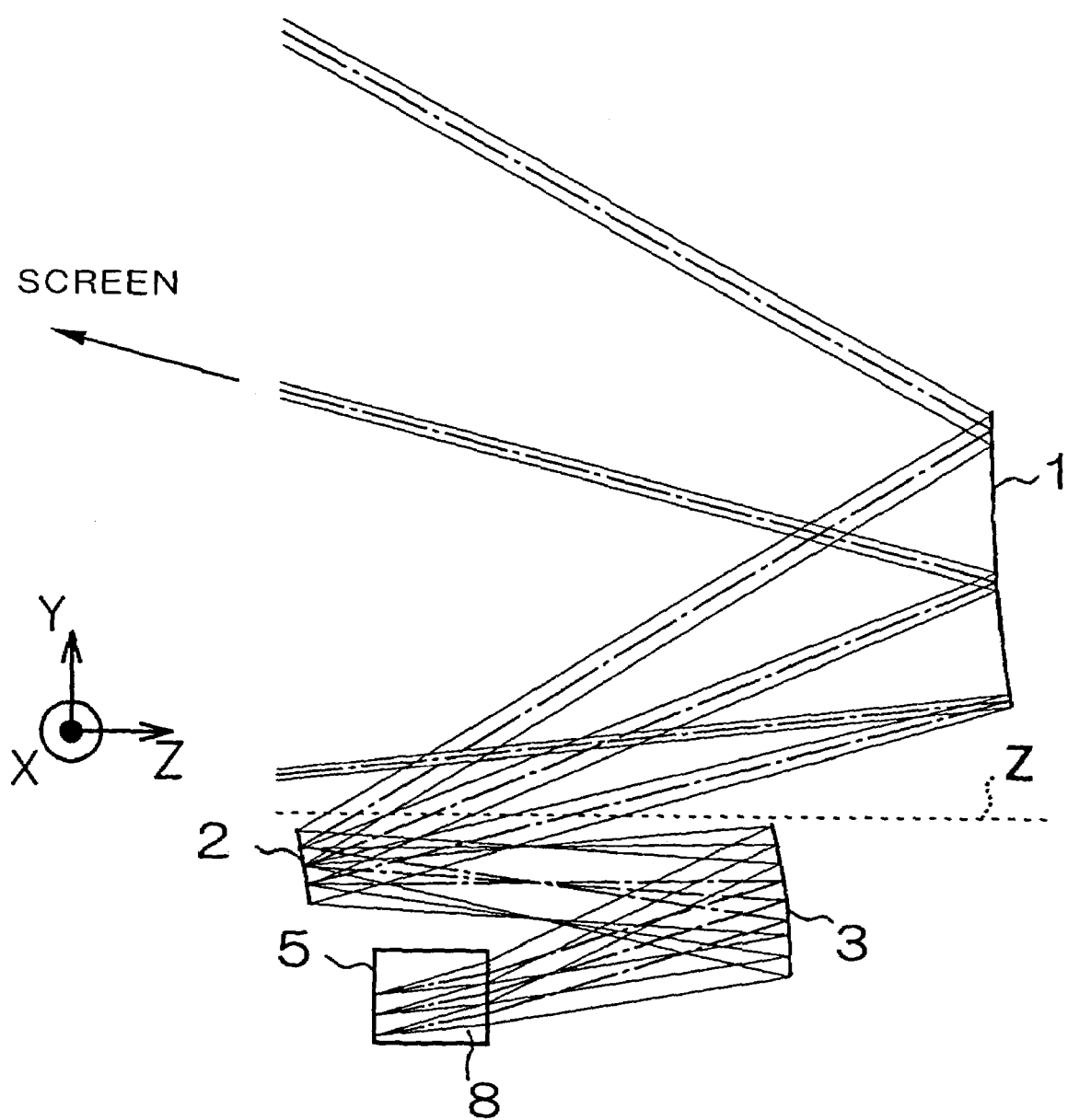
FIG. 6 shows the configuration of the reflection optical system according to example 2.

An enlarged view of main parts is shown in FIG. 6 as the configuration of the reflection optical system according to example 2.

The configuration of this reflection optical system is substantially same as that of example 1, but in FIG. 6, a prism section 8 is shown instead of the cover glass, on the light exit side of the reduction side image surface. Thus, in the reflection optical system of the present invention, a plane member can be placed between the reduction side image surface and the enlargement side image surface. For example, if a cross dichroic prism for color combining or the like is placed as described later, the cover glass and the cross dichroic prism placed on the light exit side of the light valve 5 placed on the reduction side image surface correspond to the prism section 8.

The focus operation of this example is based on the second system described above. The shift trail of the first mirror 1 forms a straight line. In this example, two focus shift positions of the focus 1 and the focus 2 are set.

The reduction side pupil position of this example is at an infinite distance, and is the above-mentioned first position. This reflection optical system is configured so that light beams of pupil center from points on the reduction side image surface intersect between the second mirror 2 and the third mirror 3, and a diaphragm is preferably placed at such a position.

In this reflection optical system, the enlargement side image surface is rotated about the X axis, and the enlargement side image surface and the reduction side image surface are non-parallel.

Data for items of example 2, which are same as those in Tables 1-1 to 1-5 of example 1, is shown in Tables 3-1 to 3-5 (described later).

Data regarding the free curved surface for items of example 2, which are same as those in Table 2 of example 1, is shown in Table 4 (described later).

In the reflection optical system according to this example, values corresponding to the conditional expressions (1) to (8) are those in Table 21 (described later). This reflection optical system meets all the conditional expressions (1) to (8).

The optical performance of this reflection optical system is so high that aberrations can be corrected substantially as well as in example 1, and the projection distortion in the enlargement side image surface corresponding to quadrate meshes in the reduction side image surface and the spot shape in the reduction side image surface show performances substantially equivalent to those shown in FIGS. 4 and 5.

EXAMPLE 3

Figure 7:
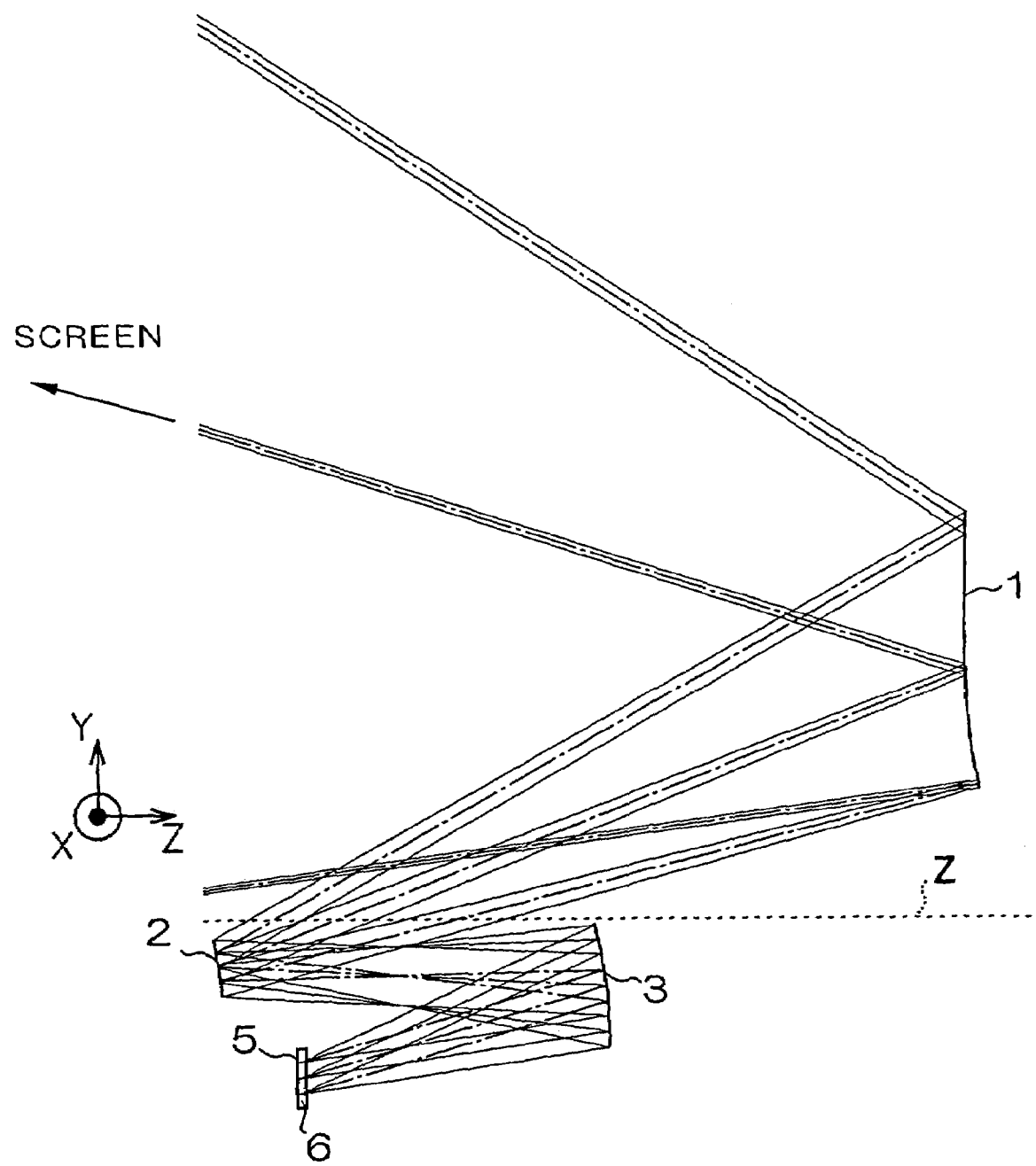
FIG. 7 shows the configuration of the reflection optical system according to example 3.

An enlarged view of main parts is shown in FIG. 7 as the configuration of the reflection optical system according to example 3.

The configuration of this reflection optical system is substantially same as that of example 1.

The focus operation of this example is based on the second system described above. The shift trail of the first mirror 1 forms a straight line. In this example, two focus shift positions of the focus 1 and the focus 2 are set.

The reduction side pupil position of this example is at an infinite distance, and is the above-mentioned first position. This reflection optical system is configured so that light beams of pupil center from points on the reduction side image surface intersect between the second mirror 2 and the third mirror 3, and a diaphragm is preferably placed at such a position.

In this reflection optical system, the enlargement side image surface is rotated about the X axis, and the enlargement side image surface and the reduction side image surface are non-parallel.

Data for items of example 3, which are same as those in Tables 1-1 to 1-5 of example 1, is shown in Tables 5-1 to 5-5 (described later).

Data for the free curved surface for items of example 3, which are same as those in Table 2 of example 1, is shown in Table 6 (described later).

In the reflection optical system according to this example, values corresponding to the conditional expressions (1) to (8) are those in Table 21 (described later). This reflection optical system meets all the conditional expressions (1) to (8).

The optical performance of this reflection optical system is so high that aberrations can be corrected substantially as well as in example 1, and the projection distortion in the enlargement side image surface corresponding to quadrate meshes in the reduction side image surface and the spot shape in the reduction side image surface show performances substantially equivalent to those shown in FIGS. 4 and 5.

EXAMPLE 4

Figure 8:
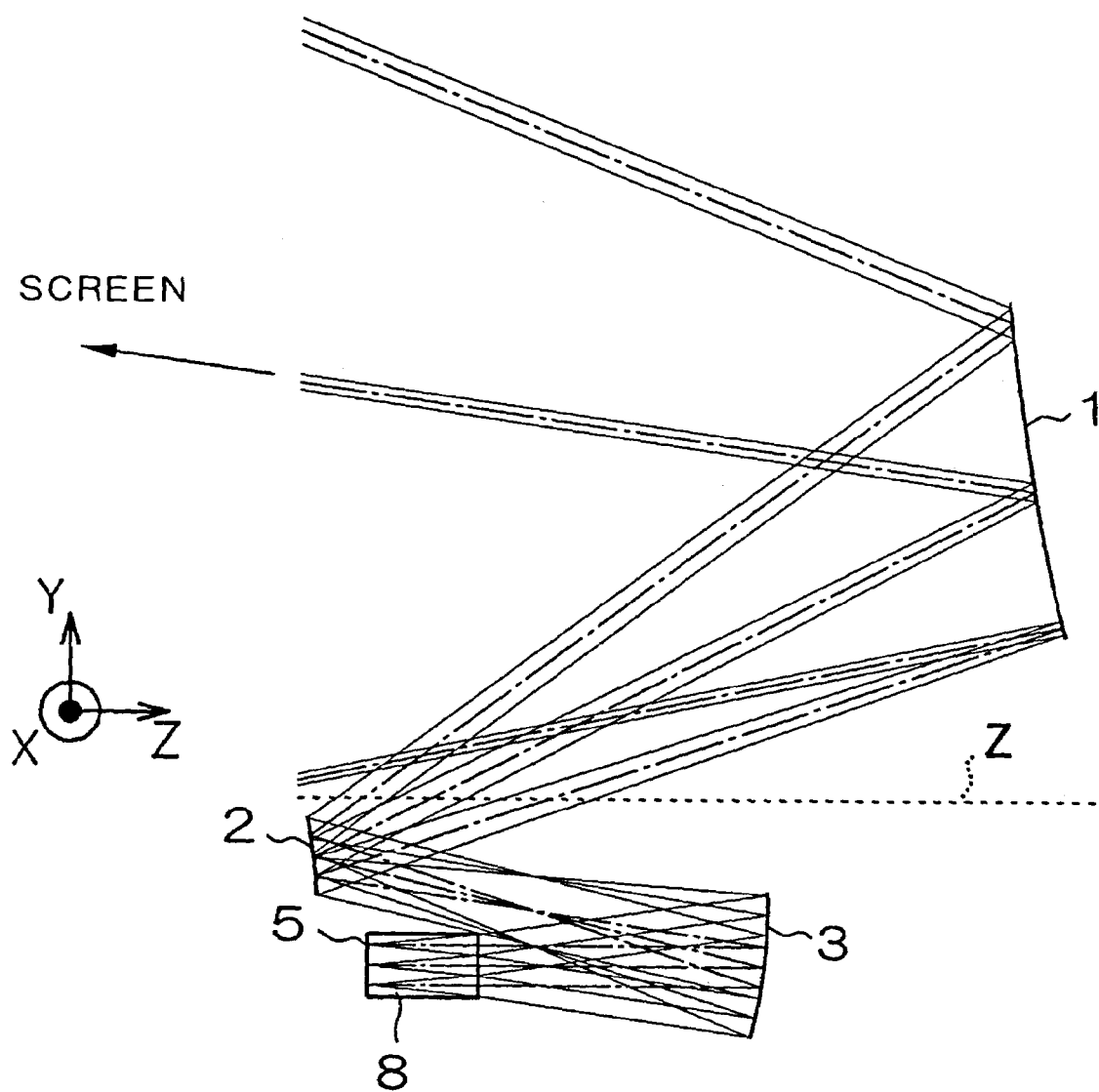
FIG. 8 shows the configuration of the reflection optical system according to example 4.

An enlarged view of main parts is shown in FIG. 8 as the configuration of the reflection optical system according to example 4.

The configuration of this reflection optical system is substantially same as that of example 1, but in FIG. 8, the prism section 8 is shown instead of the cover glass, on the light exit side of the reduction side image surface.

The focus operation of this example is based on the second system described above. The shift trail of the first mirror 1 forms a straight line. In this example, two focus shift positions of the focus 1 and the focus 2 are set.

The reduction side pupil position of this example is at an infinite distance, and is the above-mentioned first position. This reflection optical system is configured so that light beams of pupil center from points on the reduction side image surface intersect between the second mirror 2 and the third mirror 3, and a diaphragm is preferably placed at such a position.

In this reflection optical system, the enlargement side image surface is rotated about the X axis, and the enlargement side image surface and the reduction side image surface are non-parallel.

Data for items of example 4, which are same as those in Tables 1-1 to 1-5 of example 1, is shown in Tables 7-1 to 7-5 (described later).

Data for the free curved surface for items of example 4, which are same as those in Table 2 of example 1, is shown in Table 8 (described later).

In the reflection optical system according to this example, values corresponding to the conditional expressions (1) to (8) are those in Table 21 (described later). This reflection optical system meets all the conditional expressions (1) to (8).

The optical performance of this reflection optical system is so high that aberrations can be corrected substantially as well as in example 1, and the projection distortion in the enlargement side image surface corresponding to quadrate meshes in the reduction side image surface and the spot shape in the reduction side image surface show performances substantially equivalent to those shown in FIGS. 4 and 5.

EXAMPLE 5

Figure 9:
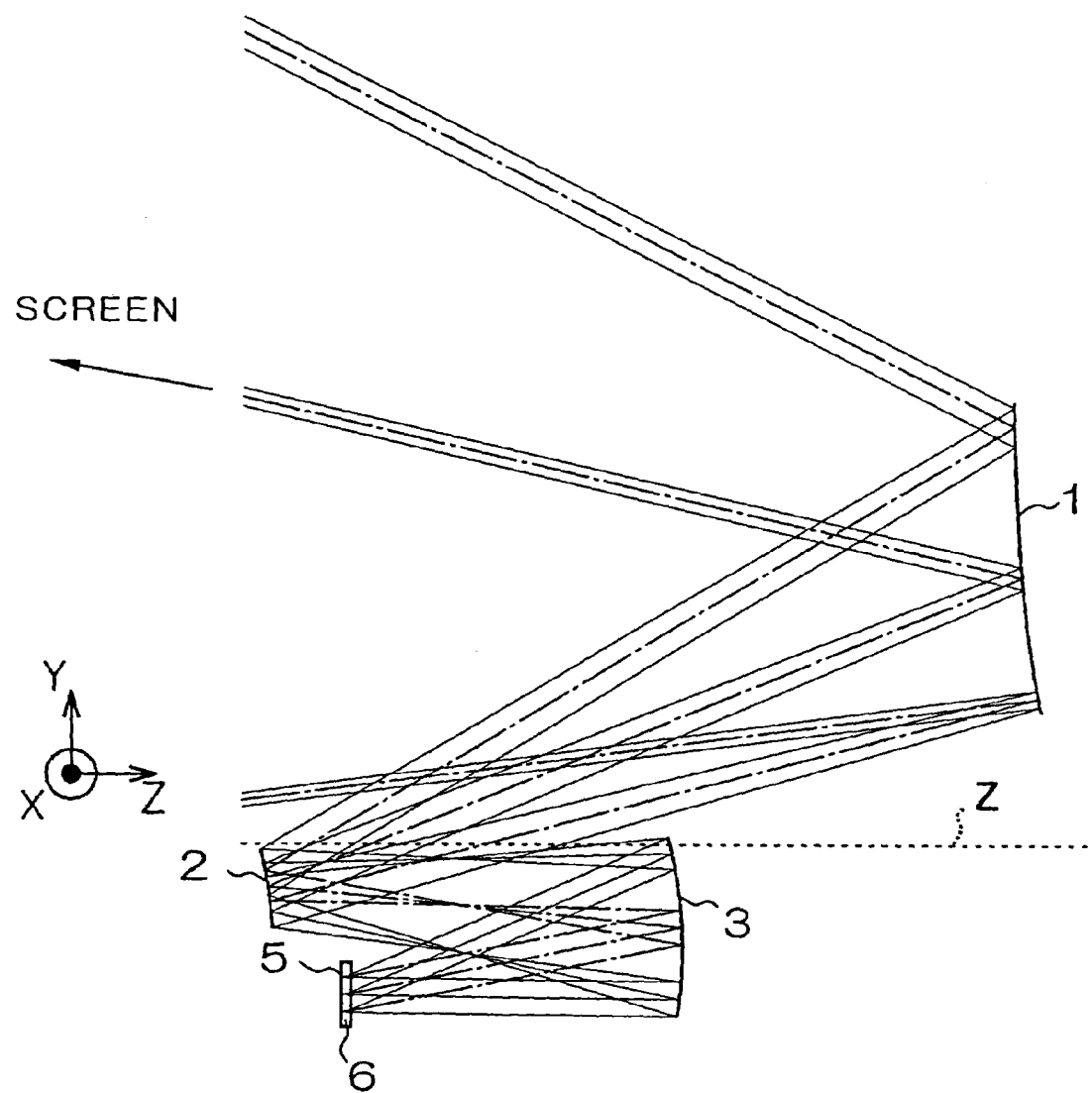
FIG. 9 shows the configuration of the reflection optical system according to example 5.

An enlarged view of main parts is shown in FIG. 9 as the configuration of the reflection optical system according to example 5.

The configuration of this reflection optical system is substantially same as that of example 1.

The focus operation of this example is based on the second system described above. The shift trail of the first mirror 1 forms a straight line. In this example, two focus shift positions of the focus 1 and the focus 2 are set.

The reduction side pupil position of this example is at an infinite distance, and is the above-mentioned first position. This reflection optical system is configured so that light beams of pupil center from points on the reduction side image surface intersect between the second mirror 2 and the third mirror 3, and a diaphragm is preferably placed at such a position.

In this reflection optical system, the enlargement side image surface is rotated about the X axis, and the enlargement side image surface and the reduction side image surface are non-parallel.

Data for items of example 5, which are same as those in Tables 1-1 to 1-5 of example 1, is shown in Tables 9-1 to 9-5 (described later).

Data for the free curved surface for items of example 5, which are same as those in Table 2 of example 1, is shown in Table 10 (described later).

In the reflection optical system according to this example, values corresponding to the conditional expressions (1) to (8) are those in Table 21 (described later). This reflection optical system meets all the conditional expressions (1) to (8).

The optical performance of this reflection optical system is so high that aberrations can be corrected substantially as well as in example 1, and the projection distortion in the enlargement side image surface corresponding to quadrate meshes in the reduction side image surface and the spot shape in the reduction side image surface show performances substantially equivalent to those shown in FIGS. 4 and 5.

EXAMPLE 6

Figure 10:
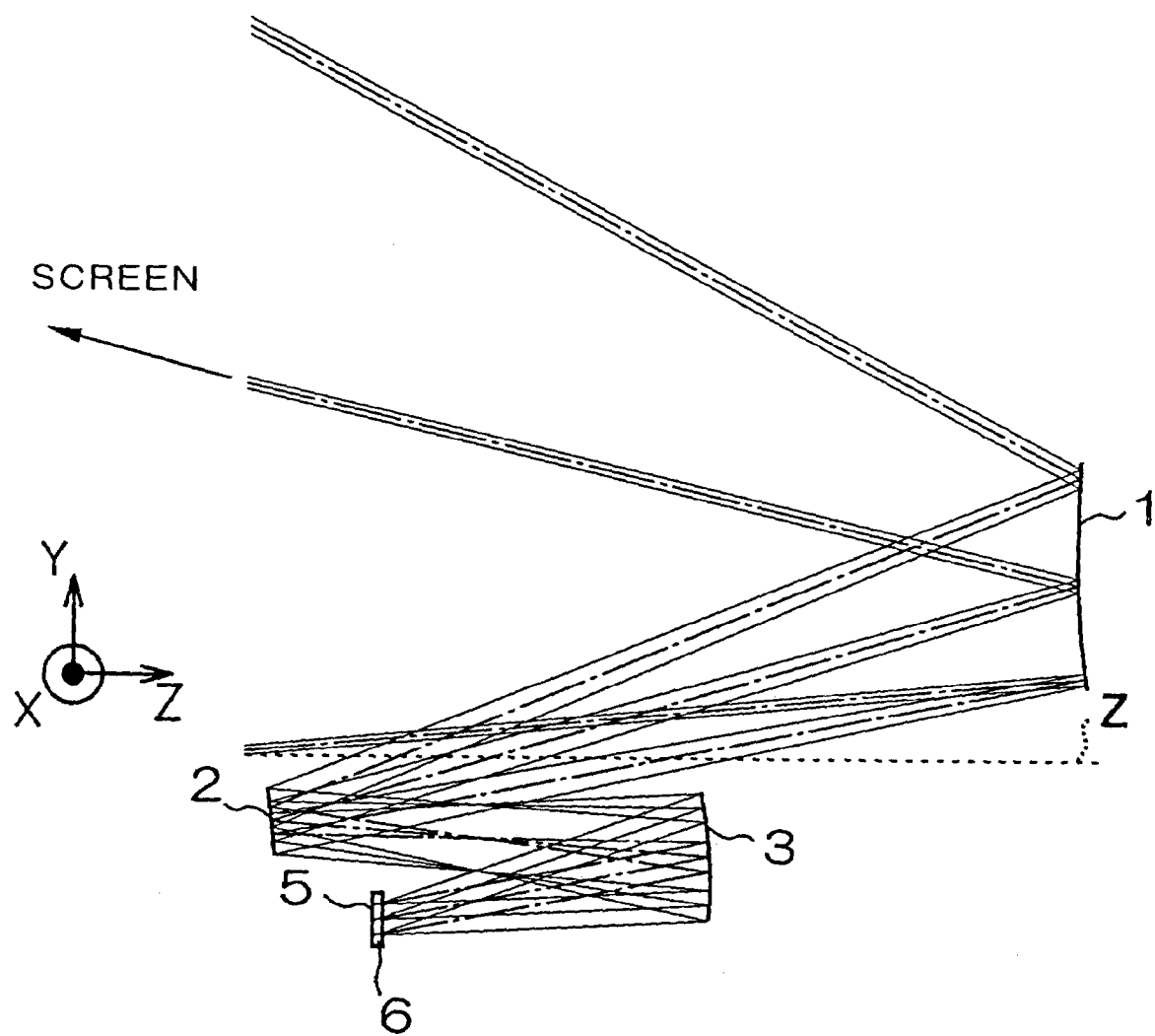
FIG. 10 shows the configuration of the reflection optical system according to example 6.

An enlarged view of main parts is shown in FIG. 10 as the configuration of the reflection optical system according to example 6.

The configuration of this reflection optical system is substantially same as that of example 1, but the reduction side effective area of the light valve 5 has a size with an aspect ratio of 16:9. The size of a screen (not shown) corresponds to the size of the reduction side effective area of the light valve 5.

The focus operation of this example is based on the second system described above. The shift trail of the first mirror 1 forms a straight line. In this example, two focus shift positions of the focus 1 and the focus 2 are set.

The reduction side pupil position of this example is at an infinite distance, and is the above-mentioned first position. This reflection optical system is configured so that light beams of pupil center from points on the reduction side image surface intersect between the second mirror 2 and the third mirror 3, and a diaphragm is preferably placed at such a position.

In this reflection optical system, the enlargement side image surface is rotated about the X axis, and the enlargement side image surface and the reduction side image surface are non-parallel.

Data for items of example 6, which are same as those in Tables 1-1 to 1-5 of example 1, is shown in Tables 11-1 to 11-5 (described later).

Data for the free curved surface for items of example 6, which are same as those in Table 2 of example 1, is shown in Table 12 (described later).

In the reflection optical system according to this example, values corresponding to the conditional expressions (1) to (8) are those in Table 21 (described later). This reflection optical system meets all the conditional expressions (1) to (8).

Figure 11:
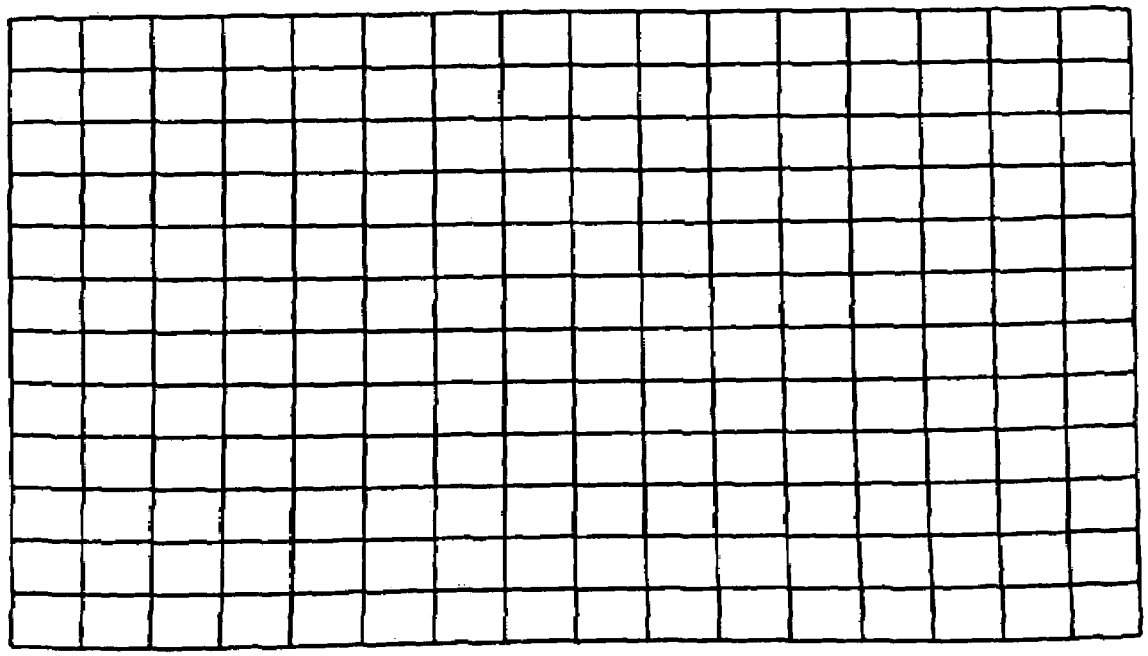
FIG. 11 is a view of a projection distortion in the enlargement side image surface of the reflection optical system according to example 6.

The optical performance of this reflection optical system is so high that aberrations can be corrected substantially as well as in example 1. FIG. 11 shows a projection distortion in the enlargement side image surface corresponding to meshes obtained by dividing the effective area on the reduction side image surface of the reflection optical system according to example 6 into 16 parts in the X direction and 12 parts in the Y direction. In this example, the reduction side image surface and the enlargement side image surface have an aspect ratio of 16:9, but according to the present invention, the distortion aberration can be well corrected irrespective of the aspect ratio. The spot shape in the reduction side image surface shows a performance substantially equivalent to that shown in FIG. 5.

EXAMPLE 7

Figure 12:
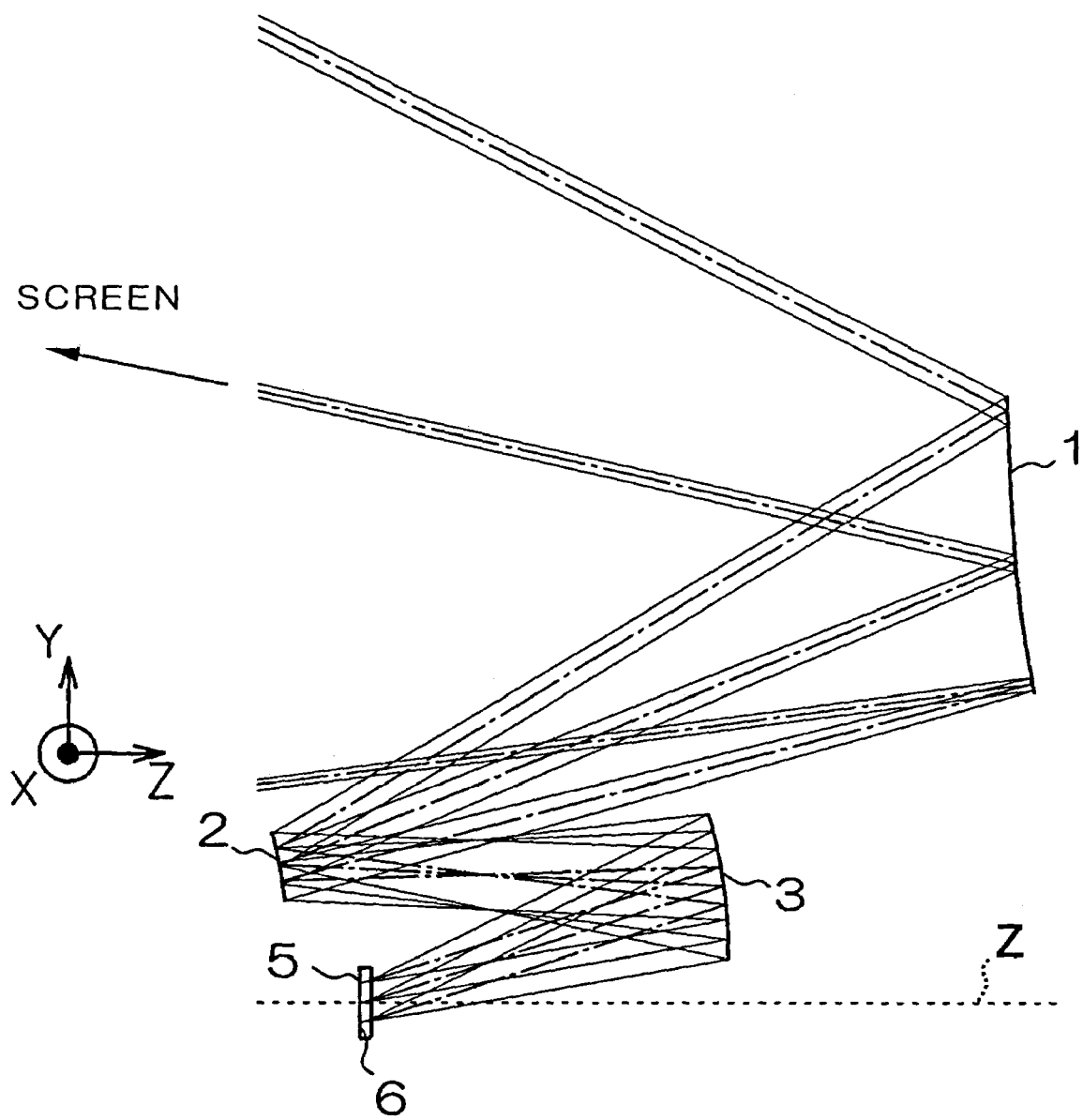
FIG. 12 shows the configuration of the reflection optical system according to example 7.

An enlarged view of main parts is shown in FIG. 12 as the configuration of the reflection optical system according to example 7.

The configuration of this reflection optical system is substantially same as that of example 1.

The focus operation of this example is based on the second system described above. The shift trail of the first mirror 1 forms a straight line. In this example, two focus shift positions of the focus 1 and the focus 2 are set.

The reduction side pupil position of this example is at an infinite distance, and is the above-mentioned first position. This reflection optical system is configured so that light beams of pupil center from points on the reduction side image surface intersect between the second mirror 2 and the third mirror 3, and a diaphragm is preferably placed at such a position.

In this reflection optical system, the enlargement side image surface is rotated about the X axis, and the enlargement side image surface and the reduction side image surface are non-parallel.

Data for items of example 7, which are same as those in Tables 1-1 to 1-5 of example 1, is shown in Tables 13-1 to 13-5 (described later).

Data for the free curved surface for items of example 7, which are same as those in Table 2 of example 1, is shown in Table 14 (described later).

In the reflection optical system according to this example, values corresponding to the conditional expressions (1) to (8) are those in Table 21 (described later). This reflection optical system meets all the conditional expressions (1) to (8).

The optical performance of this reflection optical system is so high that aberrations can be corrected substantially as well as in example 1, and the projection distortion in the enlargement side image surface corresponding to quadrate meshes in the reduction side image surface and the spot shape in the reduction side image surface show performances substantially equivalent to those shown in FIGS. 4 and 5.

EXAMPLE 8

Figure 13:
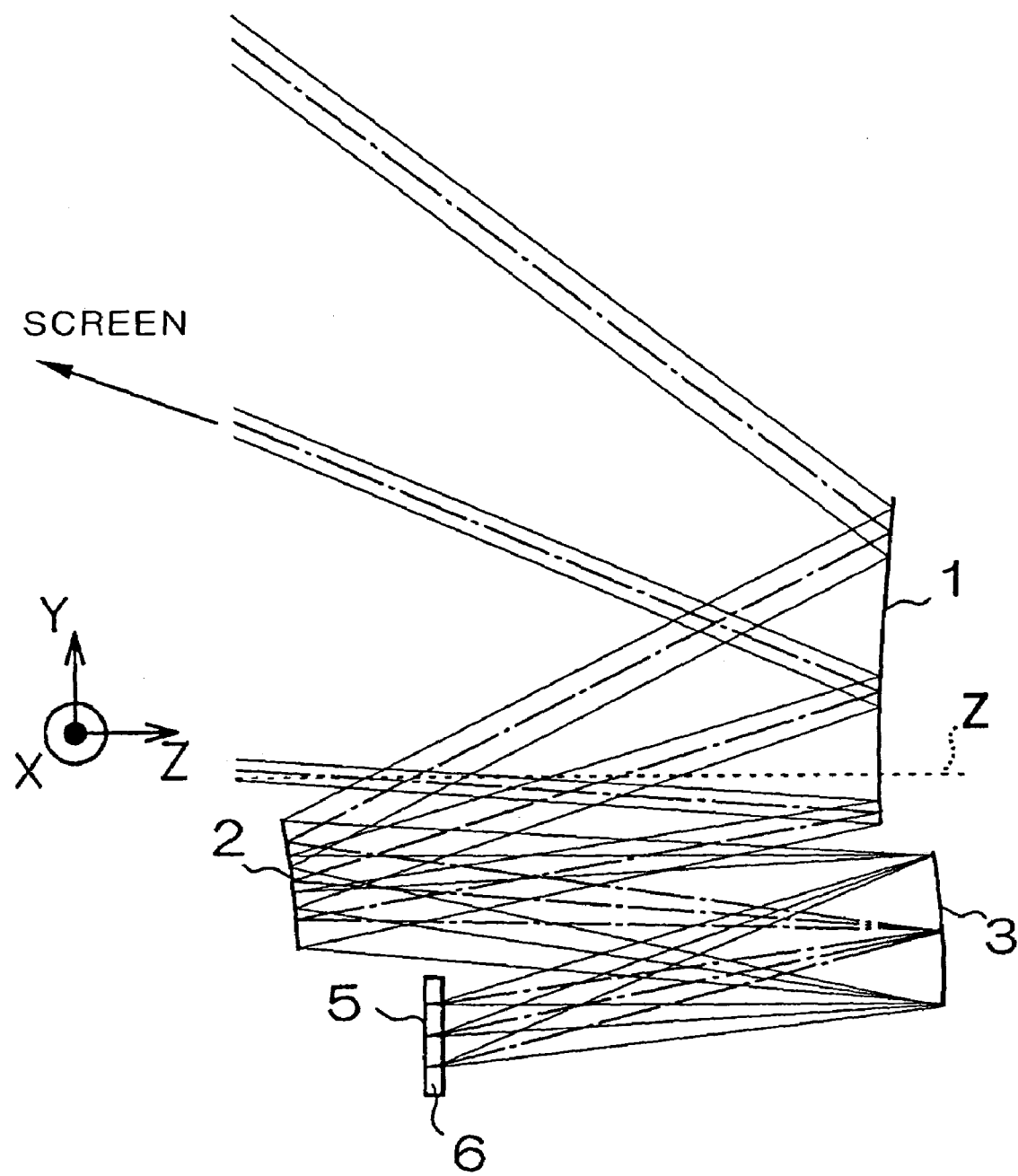
FIG. 13 shows the configuration of the reflection optical system according to example 8.

An enlarged view of main parts is shown in FIG. 13 as the configuration of the reflection optical system according to example 8.

The configuration of this reflection optical system is substantially same as that of example 1, but in this reflection optical system, the reduction side pupil position is near to the position of the third mirror 3, and is the above-mentioned second position. It is preferable that the diaphragm is placed near the third mirror 3.

The focus operation of this example is based on the second system described above. The shift trail of the first mirror 1 forms a straight line. In this example, two focus shift positions of the focus 1 and the focus 2 are set.

In this reflection optical system, the enlargement side image surface is rotated about the X axis, and the enlargement side image surface and the reduction side image surface are non-parallel.

Data for items of example 8, which are same as those in Tables 1-1 to 1-5 of example 1, is shown in Tables 15-1 to 15-5 (described later). However, in this reflection optical system, the reduction side pupil is at a finite distance, and therefore the distance of the reduction side pupil position from the reduction side image surface in the Z direction and the distance from the reduction side image surface center in the Y direction, and the radius of the reduction side pupil are shown in Table 15-4 as data thereof.

Data for the free curved surface for items of example 8, which are same as those in Table 2 of example 1, is shown in Table 16 (described later).

In the reflection optical system according to this example, values corresponding to the conditional expressions (1) to (8) are those in Table 21 (described later). This reflection optical system meets all the conditional expressions (1) to (8).

The optical performance of this reflection optical system is so high that aberrations can be corrected substantially as well as in example 1, and the projection distortion in the enlargement side image surface corresponding to quadrate meshes in the reduction side image surface and the spot shape in the reduction side image surface show performances substantially equivalent to those shown in FIGS. 4 and 5.

EXAMPLE 9

Figure 14:
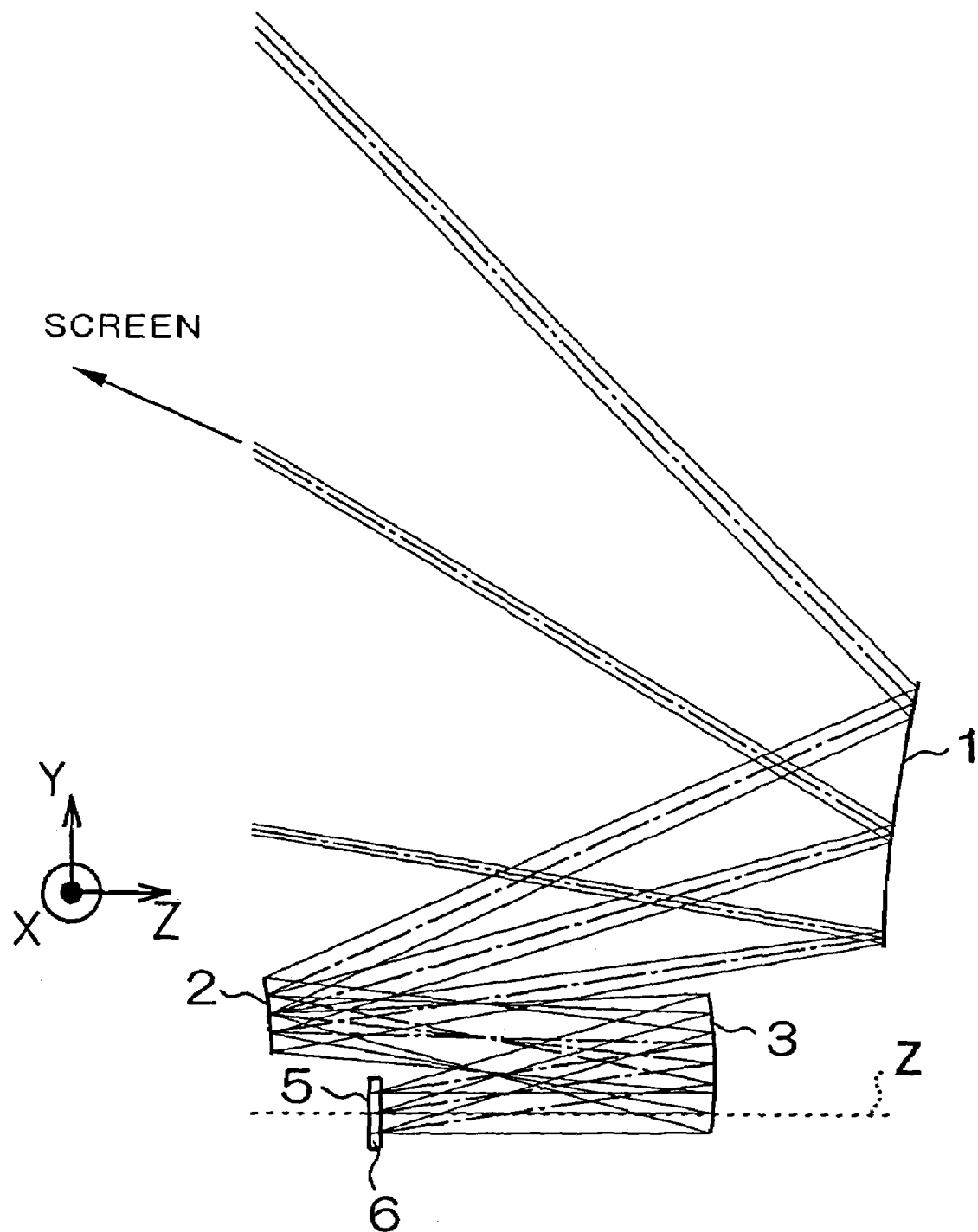
FIG. 14 shows the configuration of the reflection optical system according to example 9.

An enlarged view of main parts is shown in FIG. 14 as the configuration of the reflection optical system according to example 9.

The configuration of this reflection optical system is substantially same as that of example 1, but the focus operation of this example is based on the first system described above. Namely, the first mirror 1 is shifted alone, the second mirror 2 and the third mirror 3 are shifted integrally, and shift trails of these three mirrors each form a straight line. The actual shift directions and shift amounts of the mirrors 1 to 3 are based on the description of Table 17-3 (described later). In this example, two focus shift positions of the focus 1 and the focus 2 are set.

The reduction side pupil position of this example is at an infinite distance, and is the above-mentioned first position. This reflection optical system is configured so that light beams of pupil center from points on the reduction side image surface intersect between the second mirror 2 and the third mirror 3, and a diaphragm is preferably placed at such a position.

Data for items of example 9, which are same as those in Tables 1-1 to 1-5 of example 1, is shown in Tables 17-1 to 17-5 (described later).

Data for the free curved surface for items of example 9, which are same as those in Table 2 of example 1, is shown in Table 18 (described later).

In the reflection optical system according to this example, values corresponding to the conditional expressions (1) to (8) are those in Table 21 (described later). This reflection optical system meets all the conditional expressions (1) to (8).

The optical performance of this reflection optical system is so high that aberrations can be corrected substantially as well as in example 1, and the projection distortion in the enlargement side image surface corresponding to quadrate meshes in the reduction side image surface and the spot shape in the reduction side image surface show performances substantially equivalent to those shown in FIGS. 4 and 5.

EXAMPLE 10

Figure 15:
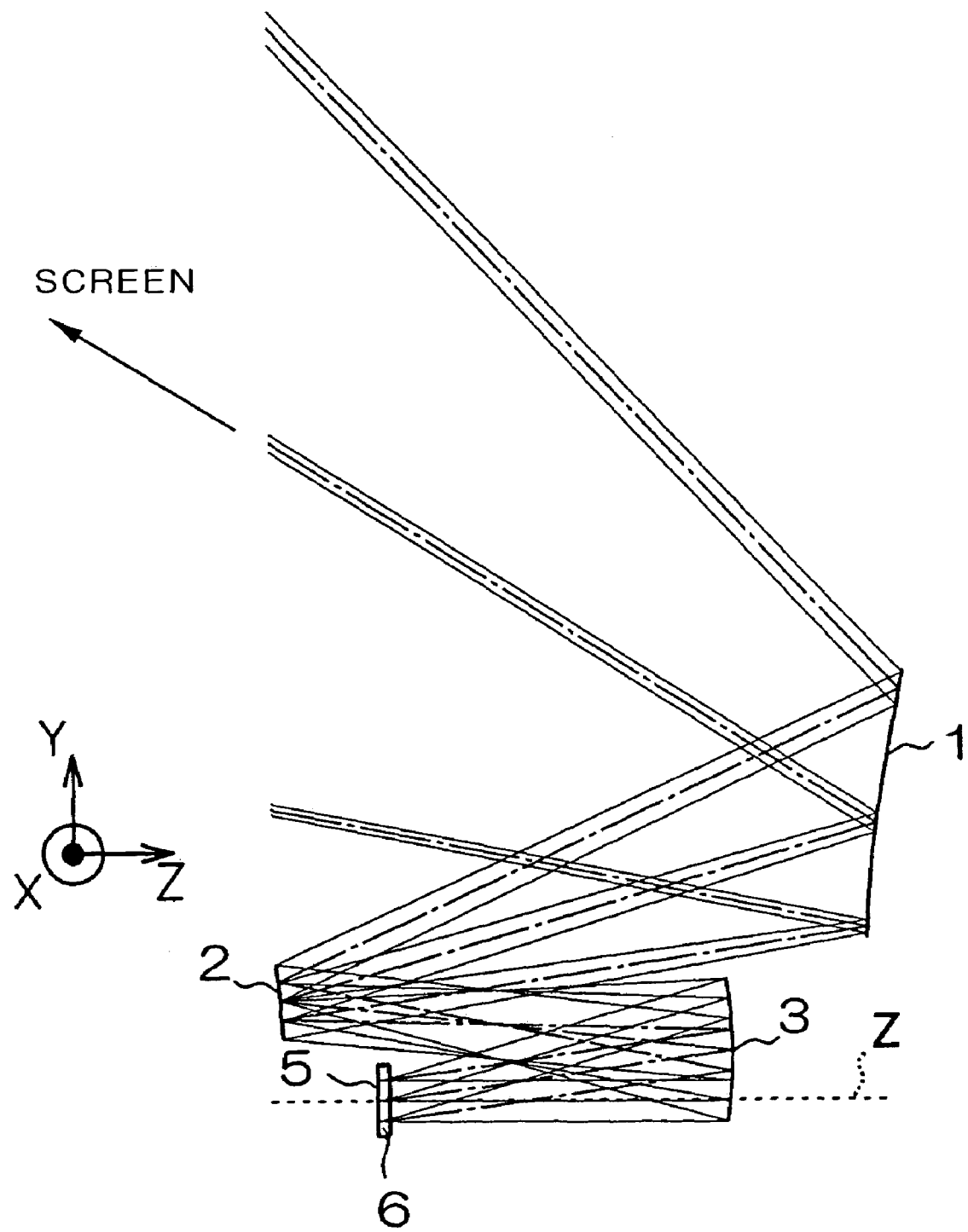
FIG. 15 shows the configuration of the reflection optical system according to example 10.

An enlarged view of main parts is shown in FIG. 15 as the configuration of the reflection optical system according to example 10.

The configuration of this reflection optical system is substantially same as that of example 1, but in the reflection optical system of this example, no focus operation is performed.

The reduction side pupil position of this example is at an infinite distance, and is the above-mentioned first position. This reflection optical system is configured so that light beams of pupil center from points on the reduction side image surface intersect between the second mirror 2 and the third mirror 3, and a diaphragm is preferably placed at such a position.

Data for items of example 10, which are same as those in Tables 1-1 to 1-5 of example 1, is shown in Tables 19-1 to 19-5 (described later). However, because no focus operation is performed in this reflection optical system, Table 19-3 for focus shift data is omitted.

Data for the free curved surface for items of example 10, which are same as those in Table 2 of example 1, is shown in Table 20 (described later).

In the reflection optical system according to this example, values corresponding to the conditional expressions (1) to (8) are those in Table 21 (described later). This reflection optical system meets all the conditional expressions (1) to (8).

The optical performance of this reflection optical system is so high that aberrations can be corrected substantially as well as in example 1, and the projection distortion in the enlargement side image surface corresponding to quadrate meshes in the reduction side image surface and the spot shape in the reduction side image surface show performances substantially equivalent to those shown in FIGS. 4 and 5.

A light valve and a color combining optical system which are suitable when the reflection optical system of the present invention is used as projection optical system of a projection display apparatus will now be described.

Figure 16:
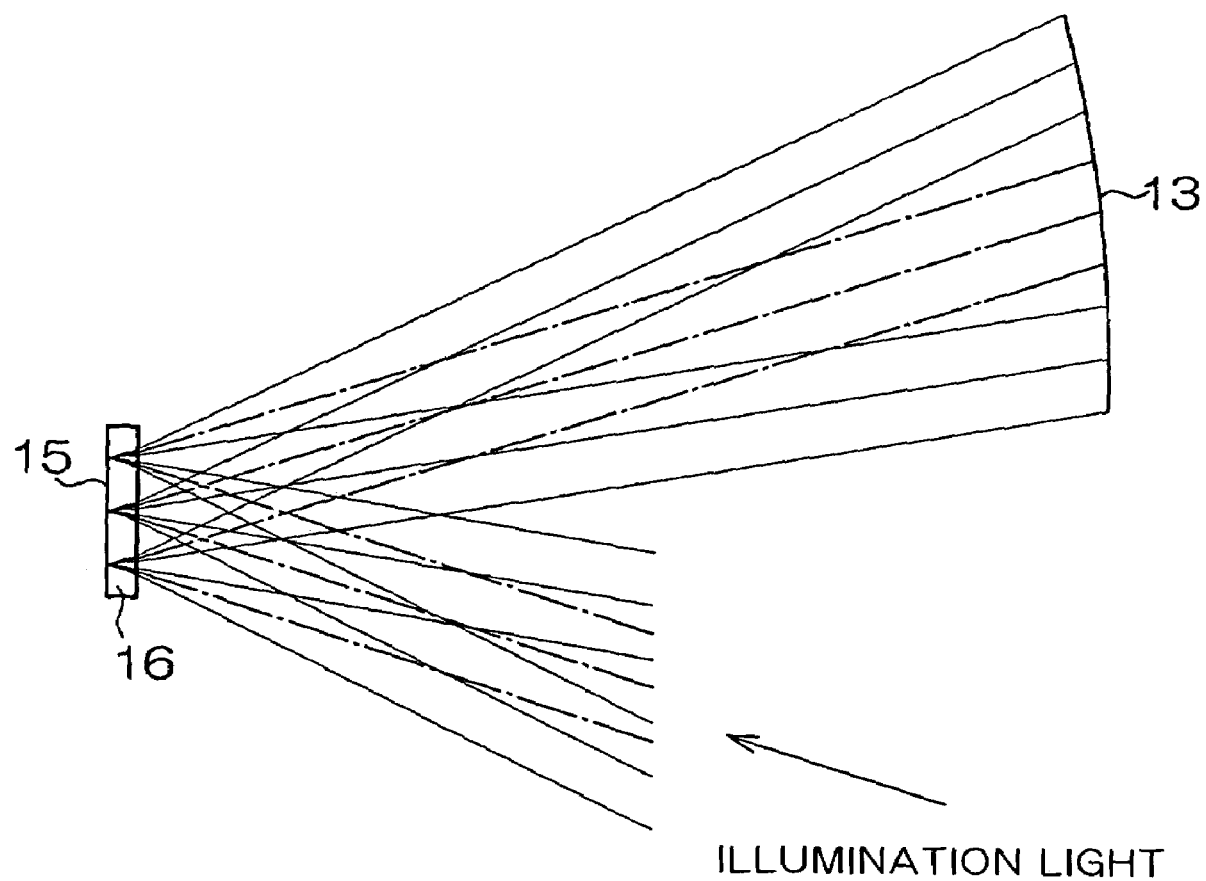
FIG. 16 is a view of a light path near a light valve of a single plate projection display apparatus using a reflection light valve.

FIG. 16 is a view of a light beam near a light valve when a reflection-type light valve 15 is used. The figure shows a situation in which illumination light is made to enter in an oblique direction with respect to the light valve 15, and reflected at the light valve 15, and projection light carrying image information is made to enter a third mirror 13 of the reflection optical system of the present invention. For the reflection-type light valve 15, for example, a micro mirror element having formed on a substantially plane surface a large number of micro mirrors capable of changing a gradient, such as a digital micro-mirror device made by Texas Instruments Co., Ltd. is known. A reflection-type liquid crystal display element (LCOS) is also known as a reflection-type light valve. A parallel plane plate composed of a cover glass 16, deflecting plate or the like may be placed on the light exit side of the light valve 15 if required. Even in the case of a single plate projection display apparatus having one light valve, a color image can be projected by, for example, applying illumination light chromatically separated in time sequence, and displaying image information on the light valve 15 in correspondence to respective color components alternately in time sequence.

Figure 17A:
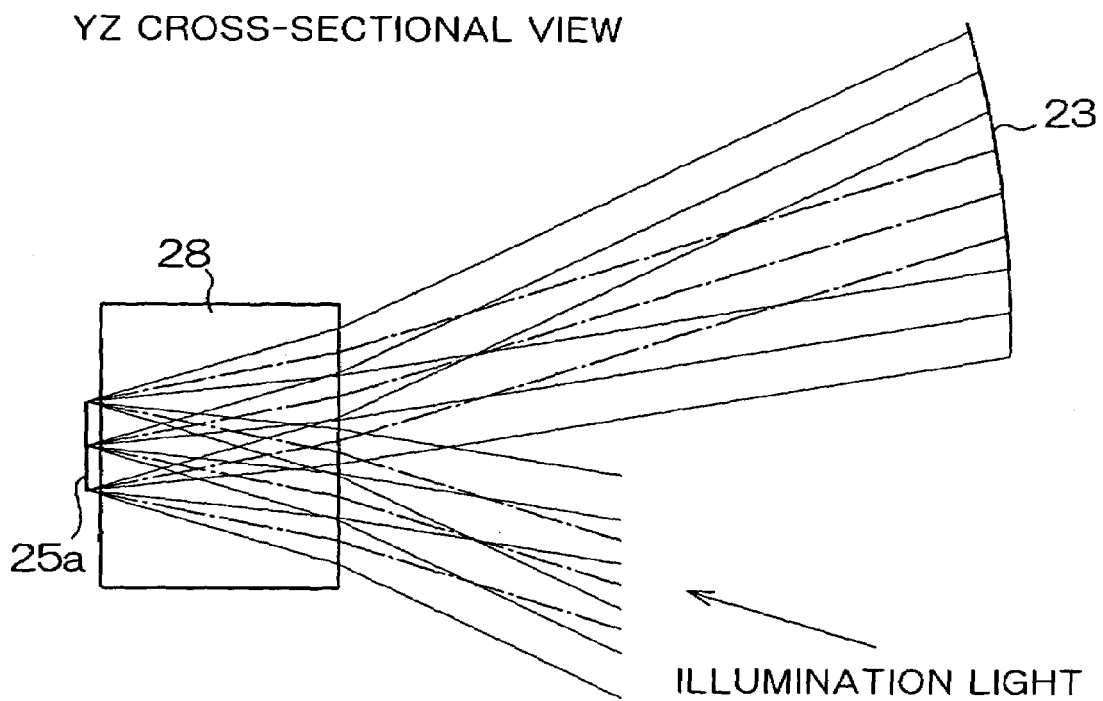
FIGS. 17A and 17B are views of the light path near the light valve of a three-plate projection display apparatus using the reflection light valve.
Figure 17B:
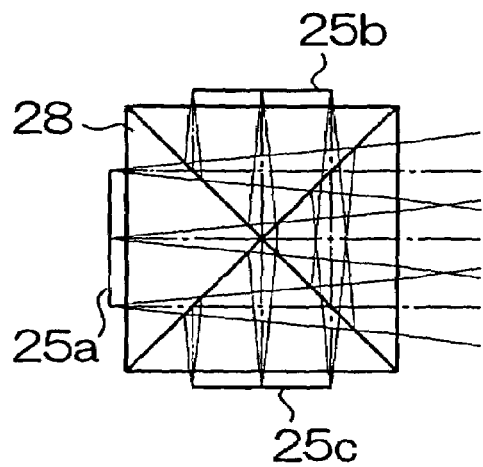

FIGS. 17A and 17B are views of the light beam near the light valve of a three-plate projection display apparatus using three reflection-type light valves 25a to 25c. The light valves 25a to 25c are each irradiated with light of one of mutually different colors of three primary colors, and the light valves 25a to 25c are controlled based on image information corresponding to color component, whereby projection light carrying image information corresponding to each color component is reflected at each light valve 25a to 25c. The projection light of these three colors is made to enter a cross dichroic prism 28 in mutually different directions, combined in the cross dichroic prism 28, and made to exit. In FIGS. 17A and 17B, the cover glass or the like and the deflecting plate are omitted. The view of the YZ cross-section of FIG. 17A shows a light path to a third mirror 23, and the view of the XZ cross-section of FIG. 17B shows a situation of combining at the cross dichroic prism 28.

Figure 18A:
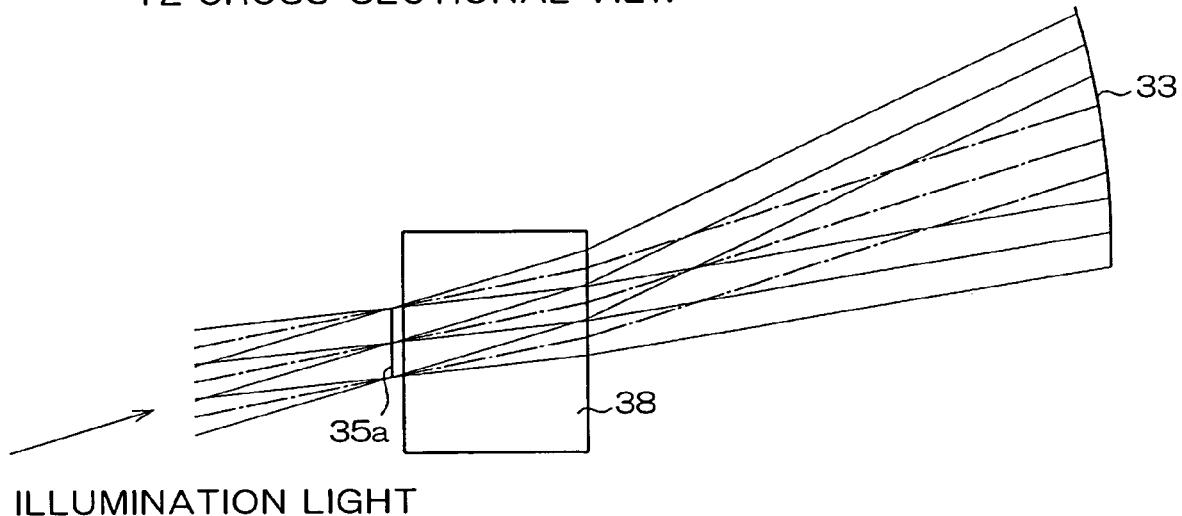
FIGS. 18A and 18B are views of the light path near the light valve of the three-plate projection display apparatus using a transmission light valve.
Figure 18B:
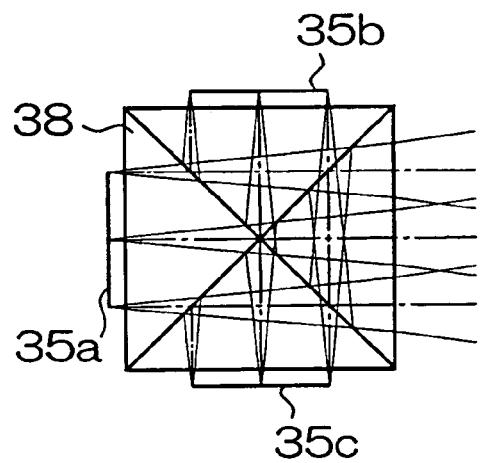

FIGS. 18A and 18B are views of the light beam near the light valve of a three-plate projection display apparatus using three transmission-type light valves 35a to 35c. For such transmission-type light valves 35a to 35c, for example, a transmission-type liquid crystal display element is known. The light valves 35a to 35c are each irradiated with light of one of mutually different colors of three primary colors, and the light valves 35a to 35c are controlled based on image information corresponding to color component, whereby projection light carrying image information corresponding to each color component is transmitted at each light valve 35a to 35c. The projection light of these three colors is made to enter a cross dichroic prism 38 in mutually different directions, combined in the cross dichroic prism 38, and made to exit. In FIGS. 18A and 18B, the cover glass or the like and the deflecting plate are omitted. The view of the YZ cross-section of FIG. 18A shows a light path to a third mirror 33, and the view of the XZ cross-section of FIG. 18B shows a situation of combining at the cross dichroic prism 38.

If the projection optical system of the reflection optical system of the present invention is used as shown in FIGS. 17 and 18, a color combining optical system such as, for example, the cross dichroic prism 28, 38 may be placed between the third mirror 23, 33 and the reduction side image surface (light valves 25a to 25c, 35a to 35c).

The color combining optical system is not limited to the cross dichroic prism, and for example a PBS can be used, but in such a color combining optical system, each color component transmits through a glass member in any case, and therefore a chromatic aberration may occur. Thus, for sustaining the advantage of no chromatic aberration in the reflection optical system of the present invention, at least one color correcting means for correcting a chromatic aberration occurring in the color combining optical system is preferably placed between the color combining optical system and the reduction side image surface. As an example of color correcting means, there is a method in which the prism shape is set so that the optical path length within the glass member for some color component is different from that for other color component, or a thin lens having little refractive power is placed near the reduction side image surface for some color component. In this case, there may be cases where among optical surfaces constituting the reflection optical system, curved surfaces are not just three reflection surfaces of first to third mirrors in a light path for some chromatic light, but as long as curved surfaces are only three reflection surfaces of first to third mirrors in at least one light path, the reflection optical system is included in the present invention.

The reflection optical system according to the present invention and the projection display apparatus using the reflection optical system are not limited to those described above, but various changes in aspect can be made. For example, the shape of the curved surface of the mirror and the placement position can be appropriately set.

According to the reflection optical system of the present invention, the reflection optical system is formed with mainly three curved-surface mirrors, whereby a reflection optical system having less aberrations and particularly being free of chromatic aberration, and being cost-effective can be obtained, and further the angular relation between the light beam of pupil center and the enlargement side image surface is adapted to meet predetermined conditional expressions, whereby a compact layout in which the enlargement side image surface and the position of the optical system are close to each other in the height direction can be achieved while keeping a wide angle.

Further, in the reflection optical system of the present invention, a demand for brightness is satisfied and a specific proposal for the focus system having a reduced performance degradation is made, thus making it possible to obtain a reflection optical system suitable as a projection optical system and a projection display apparatus using the same.

Table 1<Example 1>

TABLE 1-1

| Surface number | Radius of curvature | Distance in Z direction | Nd | νd |
|---|---|---|---|---|
| *S1 | ∞ | 92.9241 | | |
| *S2 | 22.2831 | −13.1522 | (mirror) | |
| *S3 | −11.5143 | 7.9270 | (mirror) | |
| *S4 | −8.8939 | −6.2930 | (mirror) | |
| S5 | ∞ | −0.2142 | 1.48749 | 70.2 |
| *S6 | ∞ | | | |

*Eccentric surface

TABLE 1-2

Eccentricity data

| Surface number | Shift in Y direction | Rotation about X axis |
|---|---|---|
| S1 | 0.0000 | 16.7014 |
| S2 | 0.4577 | −8.0644 |
| S3 | −1.5891 | 2.4355 |
| S4 | 0.2112 | 3.1507 |
| S6 | −3.8362 | 0.0000 |

TABLE 1-3

| Surface number | Distance in Z direction | Shift in Y direction |
|---|---|---|
| Focus 1 | | |
| S1 | 59.7363 | 0.0000 |
| S2 | −13.4117 | 0.4453 |
| Focus 2 | | |
| S1 | 192.5189 | 0.0000 |
| S2 | −12.8804 | 0.4707 |

TABLE 1-4

| | |
|---|---|
| Reduction side pupil position | ∞ |
| Reduction side pupil central angle | 17.651 |
| Reduction side pupil divergent angle | ±8.213 |

TABLE 1-5

Reduction side effective area

| | |
|---|---|
| X direction | ±0.50000 |
| Y direction | ±0.37500 |

TABLE 2

<Example 1> Aspherical data

Surface number S2

| | |
|---|---|
| K | 1.00001 |
| $A_4$ | $-1.20796 \times 10^{-4}$ |
| $A_6$ | $-5.60279 \times 10^{-7}$ |
| $A_8$ | $-1.60252 \times 10^{-8}$ |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $-5.17458 \times 10^{-1}$ | $1.53943 \times 10^{-2}$ | 0.00000 | $4.06306 \times 10^{-2}$ |
| C(3, 1) | C(2, 2) | C(1, 3) | C(0, 4) | C(5, 0) |
| 0.00000 | $-3.65643 \times 10^{-4}$ | 0.00000 | $-1.86908 \times 10^{-4}$ | 0.00000 |
| C(6, 0) | C(5, 1) | C(4, 2) | C(3, 3) | C(2, 4) |
| $7.71175 \times 10^{-7}$ | 0.00000 | $-9.33578 \times 10^{-6}$ | 0.00000 | $9.25476 \times 10^{-6}$ |
| C(4, 3) | C(3, 4) | C(2, 5) | C(1, 6) | C(0, 7) |
| $6.15765 \times 10^{-7}$ | 0.00000 | $-1.35710 \times 10^{-6}$ | 0.00000 | $-1.01930 \times 10^{-7}$ |
| C(3, 5) | C(2, 6) | C(1, 7) | C(0, 8) | C(9, 0) |
| 0.00000 | $1.26144 \times 10^{-7}$ | 0.00000 | $1.11045 \times 10^{-8}$ | 0.00000 |
| C(3, 6) | C(2, 7) | C(1, 8) | C(0, 9) | C(10, 0) |
| 0.00000 | $-1.56538 \times 10^{-9}$ | 0.00000 | $1.67920 \times 10^{-9}$ | $-2.03959 \times 10^{-8}$ |
| C(4, 6) | C(3, 7) | C(2, 8) | C(1, 9) | C(0, 10) |
| $1.87924 \times 10^{-10}$ | 0.00000 | $7.60218 \times 10^{-11}$ | 0.00000 | $-9.61382 \times 10^{-11}$ |

| C(3, 0) | C(2, 1) | C(1, 2) | C(0, 3) | C(4, 0) |
|---|---|---|---|---|
| 0.00000 | $-2.27046 \times 10^{-3}$ | 0.00000 | $-3.34297 \times 10^{-3}$ | $-2.70582 \times 10^{-4}$ |
| C(4, 1) | C(3, 2) | C(2, 3) | C(1, 4) | C(0, 5) |
| $1.07471 \times 10^{-4}$ | 0.00000 | $5.66489 \times 10^{-5}$ | 0.00000 | $4.24577 \times 10^{-5}$ |
| C(1, 5) | C(0, 6) | C(7, 0) | C(6, 1) | C(5, 2) |
| 0.00000 | $-1.47444 \times 10^{-7}$ | 0.00000 | $-1.83857 \times 10^{-6}$ | 0.00000 |
| C(8, 0) | C(7, 1) | C(6, 2) | C(5, 3) | C(4, 4) |
| $5.18631 \times 10^{-7}$ | 0.00000 | $2.66094 \times 10^{-7}$ | 0.00000 | $8.72386 \times 10^{-8}$ |
| C(8, 1) | C(7, 2) | C(6, 3) | C(5, 4) | C(4, 5) |
| $1.68961 \times 10^{-8}$ | 0.00000 | $-3.79196 \times 10^{-8}$ | 0.00000 | $-1.92326 \times 10^{-10}$ |
| C(9, 1) | C(8, 2) | C(7, 3) | C(6, 4) | C(5, 5) |
| 0.00000 | $4.59398 \times 10^{-9}$ | 0.00000 | $1.20841 \times 10^{-9}$ | 0.00000 |

Surface number S3

| | |
|---|---|
| K | $8.71964 \times 10^{-1}$ |
| $A_4$ | $-2.27890 \times 10^{-3}$ |
| $A_6$ | $2.31907 \times 10^{-4}$ |
| $A_8$ | $-1.81463 \times 10^{-4}$ |

TABLE 2-continued

<Example 1> Aspherical data

| | | | | |
|---|---|---|---|---|
| $A_{10}$ | | $-4.55219 \times 10^{-6}$ | | |
| $A_{12}$ | | $1.33557 \times 10^{-6}$ | | |

| C(1, 0) | C(0, 1) | C(2, 0) | C(1, 1) | C(0, 2) |
|---|---|---|---|---|
| 0.00000 | $-8.05226 \times 10^{-2}$ | $-3.94615 \times 10^{-3}$ | 0.00000 | $6.79378 \times 10^{-3}$ |
| C(3, 1) | C(2, 2) | C(1, 3) | C(0, 4) | C(5, 0) |
| 0.00000 | $-5.04923 \times 10^{-4}$ | 0.00000 | $9.07192 \times 10^{-4}$ | 0.00000 |
| C(6, 0) | C(5, 1) | C(4, 2) | C(3, 3) | C(2, 4) |
| $9.73483 \times 10^{-5}$ | 0.00000 | $1.08751 \times 10^{-3}$ | 0.00000 | $1.83409 \times 10^{-3}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-5.85055 \times 10^{-3}$ | 0.00000 | $-5.51822 \times 10^{-3}$ | $-1.17799 \times 10^{-4}$ |
| C(4, 1) | C(3, 2) | C(2, 3) | C(1, 4) | C(0, 5) |
| $-1.21633 \times 10^{-3}$ | 0.00000 | $-3.10943 \times 10^{-3}$ | 0.00000 | $-1.96964 \times 10^{-3}$ |
| C(1, 5) | C(0, 6) | C(7, 0) | C(6, 1) | C(5, 2) |
| 0.00000 | $6.37918 \times 10^{-4}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| | | |
|---|---|---|
| K | | 1.00962 |
| $A_4$ | | $-1.69506 \times 10^{-4}$ |
| $A_6$ | | $-5.22381 \times 10^{-6}$ |
| $A_8$ | | $5.47530 \times 10^{-7}$ |
| $A_{10}$ | | $-3.31924 \times 10^{-8}$ |
| $A_{12}$ | | $9.02649 \times 10^{-10}$ |

| C(1, 0) | C(0, 1) | C(2, 0) | C(1, 1) | C(0, 2) |
|---|---|---|---|---|
| 0.00000 | $-2.77972 \times 10^{-1}$ | $-1.64433 \times 10^{-3}$ | 0.00000 | $-4.13154 \times 10^{-3}$ |
| C(3, 1) | C(2, 2) | C(1, 3) | C(0, 4) | C(5, 0) |
| 0.00000 | $3.12079 \times 10^{-4}$ | 0.00000 | $1.02400 \times 10^{-4}$ | 0.00000 |
| C(6, 0) | C(5, 1) | C(4, 2) | C(3, 3) | C(2, 4) |
| $6.69611 \times 10^{-8}$ | 0.00000 | $-5.95412 \times 10^{-6}$ | 0.00000 | $-3.40535 \times 10^{-6}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-1.77402 \times 10^{-3}$ | 0.00000 | $-1.91579 \times 10^{-3}$ | $1.46315 \times 10^{-4}$ |
| C(4, 1) | C(3, 2) | C(2, 3) | C(1, 4) | C(0, 5) |
| $-4.19769 \times 10^{-5}$ | 0.00000 | $-4.74511 \times 10^{-5}$ | 0.00000 | $-2.69087 \times 10^{-5}$ |
| C(1, 5) | C(0, 6) | C(7, 0) | C(6, 1) | C(5, 2) |
| 0.00000 | $-1.33037 \times 10^{-6}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Table 3<Example 2>

TABLE 3-1

| Surface number | Radius of curvature | Distance in Z direction | Nd | vd |
|---|---|---|---|---|
| *S1 | ∞ | 93.4513 | | |
| *S2 | 23.2445 | −13.2031 | (mirror) | |
| *S3 | −11.6158 | 8.3135 | (mirror) | |
| *S4 | −8.8969 | −5.0505 | (mirror) | |
| S5 | ∞ | −2.0702 | 1.51633 | 64.1 |
| *S6 | ∞ | | | |

*Eccentric surface

TABLE 3-2

Eccentricity data

| Surface number | Shift in Y direction | Rotation about X axis |
|---|---|---|
| S1 | 0.0000 | 16.7021 |
| S2 | 0.4468 | −7.5051 |
| S3 | −1.5477 | 2.3837 |
| S4 | 0.2067 | 3.1465 |
| S6 | −3.6809 | 0.0000 |

TABLE 3-3

| Surface number | Distance in Z direction | Shift in Y direction |
|---|---|---|
| Focus 1 | | |
| S1 | 59.9029 | 0.0000 |
| S2 | −13.5126 | 0.4383 |
| Focus 2 | | |
| S1 | 193.5390 | 0.0000 |
| S2 | −12.8936 | 0.4553 |

TABLE 3-4

| | |
|---|---|
| Reduction side pupil position | ∞ |
| Reduction side pupil central angle | 17.700 |
| Reduction side pupil divergent angle | ±8.213 |

TABLE 3-5

Reduction side effective area

| | |
|---|---|
| X direction | ±0.50000 |
| Y direction | ±0.37500 |

TABLE 4

<Example 2> Aspherical data

Surface number S2

| | |
|---|---|
| K | 1.00001 |
| $A_4$ | $-1.20796 \times 10^{-4}$ |
| $A_6$ | $-5.60279 \times 10^{-7}$ |
| $A_8$ | $-1.60252 \times 10^{-8}$ |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $-4.98022 \times 10^{-1}$ | $1.37405 \times 10^{-2}$ | 0.00000 | $3.76319 \times 10^{-2}$ |
| C(3, 1) | C(2, 2) | C(1, 3) | C(0, 4) | C(5, 0) |
| 0.00000 | $-3.47419 \times 10^{-4}$ | 0.00000 | $-1.73925 \times 10^{-4}$ | 0.00000 |
| C(6, 0) | C(5, 1) | C(4, 2) | C(3, 3) | C(2, 4) |
| $1.64925 \times 10^{-7}$ | 0.00000 | $-8.89319 \times 10^{-6}$ | 0.00000 | $9.09773 \times 10^{-6}$ |
| C(4, 3) | C(3, 4) | C(2, 5) | C(1, 6) | C(0, 7) |
| $6.59661 \times 10^{-7}$ | 0.00000 | $-1.36009 \times 10^{-6}$ | 0.00000 | $-1.11510 \times 10^{-7}$ |
| C(3, 5) | C(2, 6) | C(1, 7) | C(0, 8) | C(9, 0) |
| 0.00000 | $1.26056 \times 10^{-7}$ | 0.00000 | $1.04813 \times 10^{-8}$ | 0.00000 |
| C(3, 6) | C(2, 7) | C(1, 8) | C(0, 9) | C(10, 0) |
| 0.00000 | $-1.47638 \times 10^{-9}$ | 0.00000 | $1.70224 \times 10^{-9}$ | $-1.73570 \times 10^{-8}$ |
| C(4, 6) | C(3, 7) | C(2, 8) | C(1, 9) | C(0, 10) |
| $2.02034 \times 10^{-11}$ | 0.00000 | $1.07705 \times 10^{-10}$ | 0.00000 | $-8.28677 \times 10^{-11}$ |

| C(3, 0) | C(2, 1) | C(1, 2) | C(0, 3) | C(4, 0) |
|---|---|---|---|---|
| 0.00000 | $-1.83218 \times 10^{-3}$ | 0.00000 | $-3.09988 \times 10^{-3}$ | $-2.21279 \times 10^{-4}$ |
| C(4, 1) | C(3, 2) | C(2, 3) | C(1, 4) | C(0, 5) |
| $9.55801 \times 10^{-5}$ | 0.00000 | $5.29928 \times 10^{-5}$ | 0.00000 | $4.25681 \times 10^{-5}$ |
| C(1, 5) | C(0, 6) | C(7, 0) | C(6, 1) | C(5, 2) |
| 0.00000 | $-2.16766 \times 10^{-7}$ | 0.00000 | $-1.94831 \times 10^{-6}$ | 0.00000 |
| C(8, 0) | C(7, 1) | C(6, 2) | C(5, 3) | C(4, 4) |
| $5.09923 \times 10^{-7}$ | 0.00000 | $3.14446 \times 10^{-7}$ | 0.00000 | $9.25500 \times 10^{-8}$ |
| C(8, 1) | C(7, 2) | C(6, 3) | C(5, 4) | C(4, 5) |
| $9.61489 \times 10^{-9}$ | 0.00000 | $-3.51641 \times 10^{-8}$ | 0.00000 | $-1.87961 \times 10^{-10}$ |
| C(9, 1) | C(8, 2) | C(7, 3) | C(6, 4) | C(5, 5) |
| 0.00000 | $3.71537 \times 10^{-9}$ | 0.00000 | $9.58707 \times 10^{-10}$ | 0.00000 |

Surface number S3

| | |
|---|---|
| K | $8.71964 \times 10^{-1}$ |
| $A_4$ | $-2.06060 \times 10^{-3}$ |
| $A_6$ | $3.77206 \times 10^{-4}$ |
| $A_8$ | $-2.69912 \times 10^{-4}$ |

TABLE 4-continued

<Example 2> Aspherical data

| | | | | |
|---|---|---|---|---|
| | $A_{10}$ | | $2.21870 \times 10^{-5}$ | |
| | $A_{12}$ | | $1.33557 \times 10^{-6}$ | |

| C(1, 0) | C(0, 1) | C(2, 0) | C(1, 1) | C(0, 2) |
|---|---|---|---|---|
| 0.00000 | $-8.08720 \times 10^{-2}$ | $-3.11226 \times 10^{-3}$ | 0.00000 | $6.77531 \times 10^{-3}$ |
| C(3, 1) | C(2, 2) | C(1, 3) | C(0, 4) | C(5, 0) |
| 0.00000 | $-6.24993 \times 10^{-4}$ | 0.00000 | $1.23646 \times 10^{-3}$ | 0.00000 |
| C(6, 0) | C(5, 1) | C(4, 2) | C(3, 3) | C(2, 4) |
| $1.93578 \times 10^{-4}$ | 0.00000 | $1.64932 \times 10^{-3}$ | 0.00000 | $1.88519 \times 10^{-3}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-4.33085 \times 10^{-3}$ | 0.00000 | $-4.72333 \times 10^{-3}$ | $-8.66524 \times 10^{-5}$ |
| C(4, 1) | C(3, 2) | C(2, 3) | C(1, 4) | C(0, 5) |
| $-1.61792 \times 10^{-3}$ | 0.00000 | $-2.88853 \times 10^{-3}$ | 0.00000 | $-2.19149 \times 10^{-3}$ |
| C(1, 5) | C(0, 6) | C(7, 0) | C(6, 1) | C(5, 2) |
| 0.00000 | $8.30595 \times 10^{-4}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| | |
|---|---|
| K | 1.00962 |
| $A_4$ | $-1.69097 \times 10^{-4}$ |
| $A_6$ | $-5.44842 \times 10^{-6}$ |
| $A_8$ | $5.62792 \times 10^{-7}$ |
| $A_{10}$ | $-3.27558 \times 10^{-8}$ |
| $A_{12}$ | $9.02649 \times 10^{-10}$ |

| C(1, 0) | C(0, 1) | C(2, 0) | C(1, 1) | C(0, 2) |
|---|---|---|---|---|
| 0.00000 | $-2.66867 \times 10^{-1}$ | $-1.39530 \times 10^{-3}$ | 0.00000 | $-4.34020 \times 10^{-3}$ |
| C(3, 1) | C(2, 2) | C(1, 3) | C(0, 4) | C(5, 0) |
| 0.00000 | $2.82859 \times 10^{-4}$ | 0.00000 | $1.04950 \times 10^{-4}$ | 0.00000 |
| C(6, 0) | C(5, 1) | C(4, 2) | C(3, 3) | C(2, 4) |
| $-7.04443 \times 10^{-7}$ | 0.00000 | $-8.00946 \times 10^{-6}$ | 0.00000 | $-4.18980 \times 10^{-6}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-1.85334 \times 10^{-3}$ | 0.00000 | $-1.95741 \times 10^{-3}$ | $1.35401 \times 10^{-4}$ |
| C(4, 1) | C(3, 2) | C(2, 3) | C(1, 4) | C(0, 5) |
| $-4.95302 \times 10^{-5}$ | 0.00000 | $-5.21903 \times 10^{-5}$ | 0.00000 | $-2.59626 \times 10^{-5}$ |
| C(1, 5) | C(0, 6) | C(7, 0) | C(6, 1) | C(5, 2) |
| 0.00000 | $-1.59338 \times 10^{-6}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Table 5<Example 3>

TABLE 5-1

| Surface number | Radius of curvature | Distance in Z direction | Nd | νd |
|---|---|---|---|---|
| *S1 | ∞ | 72.4554 | | |
| *S2 | 25.9624 | −17.9219 | (mirror) | |
| *S3 | −12.1461 | 8.6223 | (mirror) | |
| *S4 | −9.1061 | −6.6579 | (mirror) | |
| S5 | ∞ | −0.2142 | 1.48749 | 70.2 |
| *S6 | ∞ | | | |

*Eccentric surface

TABLE 5-2

Eccentricity data

| Surface number | Shift in Y direction | Rotation about X axis |
|---|---|---|
| S1 | 0.0000 | 16.9676 |
| S2 | 2.4284 | −0.8460 |
| S3 | −1.7611 | 0.7104 |
| S4 | 0.2144 | 1.1360 |
| S6 | −3.7480 | 0.0000 |

TABLE 5-3

| Surface number | Distance in Z direction | Shift in Y direction |
|---|---|---|
| | Focus 1 | |
| S1 | 45.9506 | 0.0000 |
| S2 | −18.2846 | 2.3350 |
| | Focus 2 | |
| S1 | 152.4752 | 0.0000 |
| S2 | −17.5837 | 2.5156 |

TABLE 5-4

| Reduction side pupil position | ∞ |
|---|---|
| Reduction side pupil central angle | 16.667 |
| Reduction side pupil divergent angle | ±8.213 |

TABLE 5-5

Reduction side effective area

| X direction | ±0.50000 |
|---|---|
| Y direction | ±0.37500 |

TABLE 6

<Example 3> Aspherical data

Surface number S2

| K | 1.00001 |
|---|---|
| $A_4$ | $-1.20796 \times 10^{-4}$ |
| $A_6$ | $-5.60279 \times 10^{-7}$ |
| $A_8$ | $-1.60252 \times 10^{-8}$ |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $-2.70760 \times 10^{-1}$ | $1.90816 \times 10^{-2}$ | 0.00000 | $2.71212 \times 10^{-2}$ |
| C(3, 1) | C(2, 2) | C(1, 3) | C(0, 4) | C(5, 0) |
| 0.00000 | $-1.54120 \times 10^{-4}$ | 0.00000 | $-1.62200 \times 10^{-4}$ | 0.00000 |
| C(6, 0) | C(5, 1) | C(4, 2) | C(3, 3) | C(2, 4) |
| $-2.31470 \times 10^{-6}$ | 0.00000 | $-3.77967 \times 10^{-6}$ | 0.00000 | $1.11721 \times 10^{-5}$ |
| C(4, 3) | C(3, 4) | C(2, 5) | C(1, 6) | C(0, 7) |
| $-7.03078 \times 10^{-8}$ | 0.00000 | $-1.33752 \times 10^{-6}$ | 0.00000 | $-1.42927 \times 10^{-7}$ |
| C(3, 5) | C(2, 6) | C(1, 7) | C(0, 8) | C(9, 0) |
| 0.00000 | $1.13756 \times 10^{-7}$ | 0.00000 | $1.43089 \times 10^{-8}$ | 0.00000 |
| C(3, 6) | C(2, 7) | C(1, 8) | C(0, 9) | C(10, 0) |
| 0.00000 | $-1.05482 \times 10^{-9}$ | 0.00000 | $2.47894 \times 10^{-9}$ | $-5.76155 \times 10^{-9}$ |
| C(4, 6) | C(3, 7) | C(2, 8) | C(1, 9) | C(0, 10) |
| $-7.32731 \times 10^{-10}$ | 0.00000 | $1.33151 \times 10^{-10}$ | 0.00000 | $-1.47550 \times 10^{-10}$ |

| C(3, 0) | C(2, 1) | C(1, 2) | C(0, 3) | C(4, 0) |
|---|---|---|---|---|
| 0.00000 | $-2.10569 \times 10^{-3}$ | 0.00000 | $-2.10580 \times 10^{-3}$ | $-1.31439 \times 10^{-4}$ |
| C(4, 1) | C(3, 2) | C(2, 3) | C(1, 4) | C(0, 5) |
| $6.51987 \times 10^{-5}$ | 0.00000 | $2.14342 \times 10^{-5}$ | 0.00000 | $4.24898 \times 10^{-5}$ |
| C(1, 5) | C(0, 6) | C(7, 0) | C(6, 1) | C(5, 2) |
| 0.00000 | $-6.64046 \times 10^{-7}$ | 0.00000 | $-1.32082 \times 10^{-6}$ | 0.00000 |
| C(8, 0) | C(7, 1) | C(6, 2) | C(5, 3) | C(4, 4) |
| $3.18434 \times 10^{-7}$ | 0.00000 | $4.54064 \times 10^{-7}$ | 0.00000 | $1.30266 \times 10^{-7}$ |
| C(8, 1) | C(7, 2) | C(6, 3) | C(5, 4) | C(4, 5) |
| $-3.84371 \times 10^{-9}$ | 0.00000 | $-6.39171 \times 10^{-8}$ | 0.00000 | $6.46147 \times 10^{-9}$ |
| C(9, 1) | C(8, 2) | C(7, 3) | C(6, 4) | C(5, 5) |
| 0.00000 | $1.37681 \times 10^{-9}$ | 0.00000 | $3.15481 \times 10^{-9}$ | 0.00000 |

Surface number S3

| K | $8.71964 \times 10^{-1}$ |
|---|---|
| $A_4$ | $-1.44872 \times 10^{-3}$ |
| $A_6$ | $6.09259 \times 10^{-4}$ |
| $A_8$ | $-2.24580 \times 10^{-4}$ |

TABLE 6-continued

<Example 3> Aspherical data

| | | | | |
|---|---|---|---|---|
| | $A_{10}$ | | $1.25507 \times 10^{-5}$ | |
| | $A_{12}$ | | $1.33557 \times 10^{-6}$ | |

| C(1, 0) | C(0, 1) | C(2, 0) | C(1, 1) | C(0, 2) |
|---|---|---|---|---|
| 0.00000 | $-9.97914 \times 10^{-2}$ | $1.26324 \times 10^{-3}$ | 0.00000 | $6.09589 \times 10^{-3}$ |
| C(3, 1) | C(2, 2) | C(1, 3) | C(0, 4) | C(5, 0) |
| 0.00000 | $-9.72290 \times 10^{-5}$ | 0.00000 | $2.02885 \times 10^{-3}$ | 0.00000 |
| C(6, 0) | C(5, 1) | C(4, 2) | C(3, 3) | C(2, 4) |
| $-8.90215 \times 10^{-6}$ | 0.00000 | $1.10538 \times 10^{-3}$ | 0.00000 | $1.80284 \times 10^{-3}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-3.08333 \times 10^{-3}$ | 0.00000 | $-4.27334 \times 10^{-3}$ | $-2.79473 \times 10^{-4}$ |
| C(4, 1) | C(3, 2) | C(2, 3) | C(1, 4) | C(0, 5) |
| $-1.88520 \times 10^{-3}$ | 0.00000 | $-4.50421 \times 10^{-3}$ | 0.00000 | $-3.14293 \times 10^{-3}$ |
| C(1, 5) | C(0, 6) | C(7, 0) | C(6, 1) | C(5, 2) |
| 0.00000 | $8.47934 \times 10^{-4}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| | | |
|---|---|---|
| K | | 1.00962 |
| $A_4$ | | $-1.68061 \times 10^{-4}$ |
| $A_6$ | | $-6.58550 \times 10^{-6}$ |
| $A_8$ | | $6.39495 \times 10^{-7}$ |
| $A_{10}$ | | $-3.50888 \times 10^{-8}$ |
| $A_{12}$ | | $9.02649 \times 10^{-10}$ |

| C(1, 0) | C(0, 1) | C(2, 0) | C(1, 1) | C(0, 2) |
|---|---|---|---|---|
| 0.00000 | $-2.96751 \times 10^{-1}$ | $6.70910 \times 10^{-4}$ | 0.00000 | $-2.95938 \times 10^{-3}$ |
| C(3, 1) | C(2, 2) | C(1, 3) | C(0, 4) | C(5, 0) |
| 0.00000 | $2.77506 \times 10^{-4}$ | 0.00000 | $1.06107 \times 10^{-4}$ | 0.00000 |
| C(6, 0) | C(5, 1) | C(4, 2) | C(3, 3) | C(2, 4) |
| $4.14098 \times 10^{-7}$ | 0.00000 | $-7.67738 \times 10^{-6}$ | 0.00000 | $-9.42657 \times 10^{-6}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-1.69226 \times 10^{-3}$ | 0.00000 | $-1.80696 \times 10^{-3}$ | $1.69365 \times 10^{-4}$ |
| C(4, 1) | C(3, 2) | C(2, 3) | C(1, 4) | C(0, 5) |
| $-4.85241 \times 10^{-5}$ | 0.00000 | $-8.52163 \times 10^{-5}$ | 0.00000 | $-3.59673 \times 10^{-5}$ |
| C(1, 5) | C(0, 6) | C(7, 0) | C(6, 1) | C(5, 2) |
| 0.00000 | $-2.86064 \times 10^{-6}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Table 7<Example 4>

TABLE 7-1

| Surface number | Radius of curvature | Distance in Z direction | Nd | νd |
|---|---|---|---|---|
| *S1 | ∞ | 99.7437 | | |
| *S2 | 25.0821 | −14.8717 | (mirror) | |
| *S3 | −11.2689 | 8.2892 | (mirror) | |
| *S4 | −8.8908 | −5.2927 | (mirror) | |
| S5 | ∞ | −2.0702 | 1.51633 | 64.1 |
| *S6 | ∞ | | | |

*Eccentric surface

TABLE 7-2

Eccentricity data

| Surface number | Shift in Y direction | Rotation about X axis |
|---|---|---|
| S1 | 0.0000 | 23.2712 |
| S2 | 0.4584 | −7.4391 |
| S3 | −1.8408 | −0.8878 |
| S4 | −1.0219 | −5.2702 |
| S6 | −3.1289 | 0.0000 |

TABLE 7-3

| Surface number | Distance in Z direction | Shift in Y direction |
|---|---|---|
| Focus 1 | | |
| S1 | 63.7326 | 0.0000 |
| S2 | −15.2988 | 0.4572 |
| Focus 2 | | |
| S1 | 208.3006 | 0.0000 |
| S2 | −14.4446 | 0.4595 |

TABLE 7-4

| | |
|---|---|
| Reduction side pupil position | ∞ |
| Reduction side pupil central angle | 0.000 |
| Reduction side pupil divergent angle | ±8.213 |

TABLE 7-5

Reduction side effective area

| | |
|---|---|
| X direction | ±0.50000 |
| Y direction | ±0.37500 |

TABLE 8

<Example 4> Aspherical data

Surface number S2

| | |
|---|---|
| K | 1.00001 |
| $A_4$ | $-1.20796 \times 10^{-4}$ |
| $A_6$ | $-5.60279 \times 10^{-7}$ |
| $A_8$ | $-1.60252 \times 10^{-8}$ |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $-6.56961 \times 10^{-1}$ | $1.02123 \times 10^{-2}$ | 0.00000 | $3.57041 \times 10^{-2}$ |
| C(3, 1) | C(2, 2) | C(1, 3) | C(0, 4) | C(5, 0) |
| 0.00000 | $-3.33552 \times 10^{-4}$ | 0.00000 | $-2.08430 \times 10^{-4}$ | 0.00000 |
| C(6, 0) | C(5, 1) | C(4, 2) | C(3, 3) | C(2, 4) |
| $2.39815 \times 10^{-6}$ | 0.00000 | $-7.49215 \times 10^{-6}$ | 0.00000 | $1.00565 \times 10^{-5}$ |
| C(4, 3) | C(3, 4) | C(2, 5) | C(1, 6) | C(0, 7) |
| $4.24900 \times 10^{-7}$ | 0.00000 | $-1.16912 \times 10^{-6}$ | 0.00000 | $-1.08052 \times 10^{-7}$ |
| C(3, 5) | C(2, 6) | C(1, 7) | C(0, 8) | C(9, 0) |
| 0.00000 | $1.29226 \times 10^{-7}$ | 0.00000 | $1.08803 \times 10^{-8}$ | 0.00000 |
| C(3, 6) | C(2, 7) | C(1, 8) | C(0, 9) | C(10, 0) |
| 0.00000 | $-2.41783 \times 10^{-9}$ | 0.00000 | $1.74033 \times 10^{-9}$ | $-8.24019 \times 10^{-9}$ |
| C(4, 6) | C(3, 7) | C(2, 8) | C(1, 9) | C(0, 10) |
| $-3.44382 \times 10^{-11}$ | 0.00000 | $7.14395 \times 10^{-11}$ | 0.00000 | $-7.71452 \times 10^{-11}$ |

| C(3, 0) | C(2, 1) | C(1, 2) | C(0, 3) | C(4, 0) |
|---|---|---|---|---|
| 0.00000 | $-1.86629 \times 10^{-4}$ | 0.00000 | $-1.92482 \times 10^{-3}$ | $-2.11554 \times 10^{-4}$ |
| C(4, 1) | C(3, 2) | C(2, 3) | C(1, 4) | C(0, 5) |
| $8.67757 \times 10^{-5}$ | 0.00000 | $2.26906 \times 10^{-5}$ | 0.00000 | $3.99024 \times 10^{-5}$ |
| C(1, 5) | C(0, 6) | C(7, 0) | C(6, 1) | C(5, 2) |
| 0.00000 | $-2.64185 \times 10^{-7}$ | 0.00000 | $-2.33831 \times 10^{-6}$ | 0.00000 |
| C(8, 0) | C(7, 1) | C(6, 2) | C(5, 3) | C(4, 4) |
| $3.31964 \times 10^{-7}$ | 0.00000 | $4.60742 \times 10^{-7}$ | 0.00000 | $9.37973 \times 10^{-8}$ |
| C(8, 1) | C(7, 2) | C(6, 3) | C(5, 4) | C(4, 5) |
| $-1.42156 \times 10^{-8}$ | 0.00000 | $-3.50045 \times 10^{-8}$ | 0.00000 | $8.38562 \times 10^{-10}$ |
| C(9, 1) | C(8, 2) | C(7, 3) | C(6, 4) | C(5, 5) |
| 0.00000 | $3.05213 \times 10^{-9}$ | 0.00000 | $6.44125 \times 10^{-10}$ | 0.00000 |

Surface number S3

| | |
|---|---|
| K | $8.71964 \times 10^{-1}$ |
| $A_4$ | $-1.38483 \times 10^{-3}$ |
| $A_6$ | $3.61313 \times 10^{-4}$ |
| $A_8$ | $-1.73945 \times 10^{-4}$ |

TABLE 8-continued

<Example 4> Aspherical data

| | | | | |
|---|---|---|---|---|
| | $A_{10}$ | | $9.66625 \times 10^{-6}$ | |
| | $A_{12}$ | | $1.33557 \times 10^{-6}$ | |

| C(1, 0) | C(0, 1) | C(2, 0) | C(1, 1) | C(0, 2) |
|---|---|---|---|---|
| 0.00000 | $-7.60813 \times 10^{-2}$ | $-3.82043 \times 10^{-3}$ | 0.00000 | $4.74698 \times 10^{-3}$ |
| C(3, 1) | C(2, 2) | C(1, 3) | C(0, 4) | C(5, 0) |
| 0.00000 | $-5.62742 \times 10^{-4}$ | 0.00000 | $2.55618 \times 10^{-3}$ | 0.00000 |
| C(6, 0) | C(5, 1) | C(4, 2) | C(3, 3) | C(2, 4) |
| $1.06332 \times 10^{-4}$ | 0.00000 | $1.68093 \times 10^{-3}$ | 0.00000 | $2.06252 \times 10^{-3}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $2.78708 \times 10^{-4}$ | 0.00000 | $-1.84249 \times 10^{-3}$ | $-5.19731 \times 10^{-4}$ |
| C(4, 1) | C(3, 2) | C(2, 3) | C(1, 4) | C(0, 5) |
| $-1.88913 \times 10^{-3}$ | 0.00000 | $-3.49555 \times 10^{-3}$ | 0.00000 | $-2.97416 \times 10^{-3}$ |
| C(1, 5) | C(0, 6) | C(7, 0) | C(6, 1) | C(5, 2) |
| 0.00000 | $1.02494 \times 10^{-3}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| | | |
|---|---|---|
| K | | 1.00962 |
| $A_4$ | | $-1.77238 \times 10^{-4}$ |
| $A_6$ | | $-5.78158 \times 10^{-6}$ |
| $A_8$ | | $6.51505 \times 10^{-7}$ |
| $A_{10}$ | | $-3.70581 \times 10^{-8}$ |
| $A_{12}$ | | $9.02649 \times 10^{-10}$ |

| C(1, 0) | C(0, 1) | C(2, 0) | C(1, 1) | C(0, 2) |
|---|---|---|---|---|
| 0.00000 | $-2.14474 \times 10^{-1}$ | $-1.85811 \times 10^{-3}$ | 0.00000 | $-3.92783 \times 10^{-3}$ |
| C(3, 1) | C(2, 2) | C(1, 3) | C(0, 4) | C(5, 0) |
| 0.00000 | $4.73065 \times 10^{-4}$ | 0.00000 | $8.47450 \times 10^{-5}$ | 0.00000 |
| C(6, 0) | C(5, 1) | C(4, 2) | C(3, 3) | C(2, 4) |
| $-2.37692 \times 10^{-6}$ | 0.00000 | $-9.85283 \times 10^{-6}$ | 0.00000 | $-5.52195 \times 10^{-7}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-1.09553 \times 10^{-3}$ | 0.00000 | $-1.58282 \times 10^{-3}$ | $1.41400 \times 10^{-4}$ |
| C(4, 1) | C(3, 2) | C(2, 3) | C(1, 4) | C(0, 5) |
| $-4.69724 \times 10^{-5}$ | 0.00000 | $7.92217 \times 10^{-7}$ | 0.00000 | $-2.87125 \times 10^{-5}$ |
| C(1, 5) | C(0, 6) | C(7, 0) | C(6, 1) | C(5, 2) |
| 0.00000 | $-2.19283 \times 10^{-6}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Table 9<Example 5>

TABLE 9-1

| Surface number | Radius of curvature | Distance in Z direction | Nd | vd |
|---|---|---|---|---|
| *S1 | ∞ | 92.7760 | | |
| *S2 | 36.0681 | −16.5565 | (mirror) | |
| *S3 | −12.0104 | 8.6895 | (mirror) | |
| *S4 | −9.1950 | −6.9636 | (mirror) | |
| S5 | ∞ | −0.2142 | 1.48749 | 70.2 |
| *S6 | ∞ | | | |

*Eccentric surface

TABLE 9-2

Eccentricity data

| Surface number | Shift in Y direction | Rotation about X axis |
|---|---|---|
| S1 | 0.0000 | 19.0624 |
| S2 | 2.8799 | 2.3246 |
| S3 | −1.4841 | 0.7673 |
| S4 | −0.3230 | −1.8976 |
| S6 | −3.2676 | 0.0000 |

TABLE 9-3

| Surface number | Distance in Z direction | Shift in Y direction |
|---|---|---|
| Focus 1 | | |
| S1 | 59.1785 | 0.0000 |
| S2 | −16.9229 | 2.8134 |
| Focus 2 | | |
| S1 | 194.4275 | 0.0000 |
| S2 | −16.1807 | 2.9482 |

TABLE 9-4

| | |
|---|---|
| Reduction side pupil position | ∞ |
| Reduction side pupil central angle | 11.472 |
| Reduction side pupil divergent angle | ±12.025 |

TABLE 9-5

Reduction side effective area

| | |
|---|---|
| X direction | ±0.50000 |
| Y direction | ±0.37500 |

TABLE 10

<Example 5> Aspherical data

Surface number S2

| | |
|---|---|
| K | 1.00001 |
| $A_4$ | $-1.20796 \times 10^{-4}$ |
| $A_6$ | $-5.60279 \times 10^{-7}$ |
| $A_8$ | $-1.60252 \times 10^{-8}$ |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $-1.76117 \times 10^{-1}$ | $1.52140 \times 10^{-2}$ | 0.00000 | $1.56493 \times 10^{-2}$ |
| C(3, 1) | C(2, 2) | C(1, 3) | C(0, 4) | C(5, 0) |
| 0.00000 | $6.67996 \times 10^{-5}$ | 0.00000 | $-1.56139 \times 10^{-4}$ | 0.00000 |
| C(6, 0) | C(5, 1) | C(4, 2) | C(3, 3) | C(2, 4) |
| $-4.68532 \times 10^{-6}$ | 0.00000 | $1.81831 \times 10^{-7}$ | 0.00000 | $1.52253 \times 10^{-5}$ |
| C(4, 3) | C(3, 4) | C(2, 5) | C(1, 6) | C(0, 7) |
| $-1.69261 \times 10^{-7}$ | 0.00000 | $-1.34310 \times 10^{-6}$ | 0.00000 | $-3.10953 \times 10^{-7}$ |
| C(3, 5) | C(2, 6) | C(1, 7) | C(0, 8) | C(9, 0) |
| 0.00000 | $7.77790 \times 10^{-8}$ | 0.00000 | $2.26593 \times 10^{-8}$ | 0.00000 |
| C(3, 6) | C(2, 7) | C(1, 8) | C(0, 9) | C(10, 0) |
| 0.00000 | $-1.58903 \times 10^{-10}$ | 0.00000 | $6.73133 \times 10^{-9}$ | $-4.79936 \times 10^{-9}$ |
| C(4, 6) | C(3, 7) | C(2, 8) | C(1, 9) | C(0, 10) |
| $-1.21959 \times 10^{-9}$ | 0.00000 | $3.39581 \times 10^{-10}$ | 0.00000 | $-4.97676 \times 10^{-10}$ |

| C(3, 0) | C(2, 1) | C(1, 2) | C(0, 3) | C(4, 0) |
|---|---|---|---|---|
| 0.00000 | $-1.45081 \times 10^{-3}$ | 0.00000 | $-1.08660 \times 10^{-3}$ | $4.00268 \times 10^{-5}$ |
| C(4, 1) | C(3, 2) | C(2, 3) | C(1, 4) | C(0, 5) |
| $1.24894 \times 10^{-5}$ | 0.00000 | $-2.63195 \times 10^{-5}$ | 0.00000 | $4.88419 \times 10^{-5}$ |
| C(1, 5) | C(0, 6) | C(7, 0) | C(6, 1) | C(5, 2) |
| 0.00000 | $-1.59717 \times 10^{-6}$ | 0.00000 | $-7.43024 \times 10^{-8}$ | 0.00000 |
| C(8, 0) | C(7, 1) | C(6, 2) | C(5, 3) | C(4, 4) |
| $3.07424 \times 10^{-7}$ | 0.00000 | $4.48293 \times 10^{-7}$ | 0.00000 | $1.64473 \times 10^{-7}$ |
| C(8, 1) | C(7, 2) | C(6, 3) | C(5, 4) | C(4, 5) |
| $-2.24241 \times 10^{-8}$ | 0.00000 | $-8.87382 \times 10^{-8}$ | 0.00000 | $6.57128 \times 10^{-9}$ |
| C(9, 1) | C(8, 2) | C(7, 3) | C(6, 4) | C(5, 5) |
| 0.00000 | $2.29448 \times 10^{-9}$ | 0.00000 | $5.24981 \times 10^{-9}$ | 0.00000 |

Surface number S3

| | |
|---|---|
| K | $8.71964 \times 10^{-1}$ |
| $A_4$ | $-2.12122 \times 10^{-3}$ |
| $A_6$ | $-4.75530 \times 10^{-4}$ |
| $A_8$ | $-4.68162 \times 10^{-5}$ |

TABLE 10-continued

<Example 5> Aspherical data

| | | | | |
|---|---|---|---|---|
| | $A_{10}$ | $-2.52595 \times 10^{-6}$ | | |
| | $A_{12}$ | $1.33557 \times 10^{-6}$ | | |

| C(1, 0) | C(0, 1) | C(2, 0) | C(1, 1) | C(0, 2) |
|---|---|---|---|---|
| 0.00000 | $-8.92832 \times 10^{-2}$ | $3.08120 \times 10^{-3}$ | 0.00000 | $3.11585 \times 10^{-3}$ |
| C(3, 1) | C(2, 2) | C(1, 3) | C(0, 4) | C(5, 0) |
| 0.00000 | $1.15942 \times 10^{-3}$ | 0.00000 | $7.94758 \times 10^{-4}$ | 0.00000 |
| C(6, 0) | C(5, 1) | C(4, 2) | C(3, 3) | C(2, 4) |
| $5.72746 \times 10^{-4}$ | 0.00000 | $1.79864 \times 10^{-3}$ | 0.00000 | $1.85360 \times 10^{-3}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-3.19300 \times 10^{-3}$ | 0.00000 | $-3.27807 \times 10^{-3}$ | $7.58894 \times 10^{-4}$ |
| C(4, 1) | C(3, 2) | C(2, 3) | C(1, 4) | C(0, 5) |
| $-4.18194 \times 10^{-4}$ | 0.00000 | $-8.66593 \times 10^{-4}$ | 0.00000 | $-5.60352 \times 10^{-4}$ |
| C(1, 5) | C(0, 6) | C(7, 0) | C(6, 1) | C(5, 2) |
| 0.00000 | $6.09309 \times 10^{-4}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| | | |
|---|---|---|
| K | 1.00962 | |
| $A_4$ | $-1.69127 \times 10^{-4}$ | |
| $A_6$ | $-5.52920 \times 10^{-6}$ | |
| $A_8$ | $5.76080 \times 10^{-7}$ | |
| $A_{10}$ | $-3.46065 \times 10^{-8}$ | |
| $A_{12}$ | $9.02649 \times 10^{-10}$ | |

| C(1, 0) | C(0, 1) | C(2, 0) | C(1, 1) | C(0, 2) |
|---|---|---|---|---|
| 0.00000 | $-2.42166 \times 10^{-1}$ | $9.61121 \times 10^{-4}$ | 0.00000 | $-1.85837 \times 10^{-3}$ |
| C(3, 1) | C(2, 2) | C(1, 3) | C(0, 4) | C(5, 0) |
| 0.00000 | $2.88022 \times 10^{-4}$ | 0.00000 | $1.05597 \times 10^{-4}$ | 0.00000 |
| C(6, 0) | C(5, 1) | C(4, 2) | C(3, 3) | C(2, 4) |
| $8.88124 \times 10^{-7}$ | 0.00000 | $-1.69471 \times 10^{-6}$ | 0.00000 | $-4.01301 \times 10^{-6}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-1.40601 \times 10^{-3}$ | 0.00000 | $-1.49090 \times 10^{-3}$ | $1.74837 \times 10^{-4}$ |
| C(4, 1) | C(3, 2) | C(2, 3) | C(1, 4) | C(0, 5) |
| $-2.69693 \times 10^{-5}$ | 0.00000 | $-5.69682 \times 10^{-5}$ | 0.00000 | $-2.92010 \times 10^{-5}$ |
| C(1, 5) | C(0, 6) | C(7, 0) | C(6, 1) | C(5, 2) |
| 0.00000 | $-1.72189 \times 10^{-6}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Table 11<Example 6>

TABLE 11-1

| Surface number | Radius of curvature | Distance in Z direction | Nd | vd |
|---|---|---|---|---|
| *S1 | ∞ | 83.4046 | | |
| *S2 | 22.2586 | −15.2266 | (mirror) | |
| *S3 | −11.4094 | 7.7333 | (mirror) | |
| *S4 | −8.2019 | −5.7267 | (mirror) | |
| S5 | ∞ | −0.1953 | 1.48749 | 70.2 |
| *S6 | ∞ | | | |

*Eccentric surface

TABLE 11-2

Eccentricity data

| Surface number | Shift in Y direction | Rotation about X axis |
|---|---|---|
| S1 | 0.0000 | 7.9686 |
| S2 | 0.4165 | −15.7333 |
| S3 | −1.5367 | 1.4426 |
| S4 | 0.0967 | 2.0875 |
| S6 | −3.0436 | 0.0000 |

TABLE 11-3

| Surface number | Distance in Z direction | Shift in Y direction |
|---|---|---|
| Focus 1 | | |
| S1 | 52.9373 | 0.0000 |
| S2 | −15.5791 | 0.4158 |
| Focus 2 | | |
| S1 | 174.1536 | 0.0000 |
| S2 | −14.9382 | 0.4171 |

TABLE 11-4

| | |
|---|---|
| Reduction side pupil position | ∞ |
| Reduction side pupil central angle | 11.054 |
| Reduction side pupil divergent angle | ±8.213 |

TABLE 11-5

Reduction side effective area

| | |
|---|---|
| X direction | ±0.50000 |
| Y direction | ±0.28125 |

TABLE 12

<Example 6> Aspherical data

Surface number S2

| | |
|---|---|
| K | 1.00001 |
| $A_4$ | $-1.59246 \times 10^{-4}$ |
| $A_6$ | $-8.88035 \times 10^{-7}$ |
| $A_8$ | $-3.05379 \times 10^{-8}$ |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $-5.63980 \times 10^{-1}$ | $1.16604 \times 10^{-2}$ | 0.00000 | $3.84334 \times 10^{-2}$ |
| C(3, 1) | C(2, 2) | C(1, 3) | C(0, 4) | C(5, 0) |
| 0.00000 | $-6.53676 \times 10^{-5}$ | 0.00000 | $-2.27038 \times 10^{-4}$ | 0.00000 |
| C(6, 0) | C(5, 1) | C(4, 2) | C(3, 3) | C(2, 4) |
| $-3.42645 \times 10^{-6}$ | 0.00000 | $-1.28779 \times 10^{-5}$ | 0.00000 | $1.07175 \times 10^{-5}$ |
| C(4, 3) | C(3, 4) | C(2, 5) | C(1, 6) | C(0, 7) |
| $1.97746 \times 10^{-8}$ | 0.00000 | $-2.20928 \times 10^{-6}$ | 0.00000 | $-2.51563 \times 10^{-7}$ |
| C(3, 5) | C(2, 6) | C(1, 7) | C(0, 8) | C(9, 0) |
| 0.00000 | $3.18765 \times 10^{-7}$ | 0.00000 | $1.83400 \times 10^{-8}$ | 0.00000 |
| C(3, 6) | C(2, 7) | C(1, 8) | C(0, 9) | C(10, 0) |
| 0.00000 | $3.24753 \times 10^{-9}$ | 0.00000 | $4.78542 \times 10^{-9}$ | $-1.10263 \times 10^{-8}$ |
| C(4, 6) | C(3, 7) | C(2, 8) | C(1, 9) | C(0, 10) |
| $1.28721 \times 10^{-9}$ | 0.00000 | $-2.06704 \times 10^{-9}$ | 0.00000 | $-9.81501 \times 10^{-11}$ |

| C(3, 0) | C(2, 1) | C(1, 2) | C(0, 3) | C(4, 0) |
|---|---|---|---|---|
| 0.00000 | $-2.86693 \times 10^{-3}$ | 0.00000 | $-2.86795 \times 10^{-3}$ | $-2.03755 \times 10^{-4}$ |
| C(4, 1) | C(3, 2) | C(2, 3) | C(1, 4) | C(0, 5) |
| $1.47892 \times 10^{-4}$ | 0.00000 | $4.84401 \times 10^{-5}$ | 0.00000 | $6.02109 \times 10^{-5}$ |
| C(1, 5) | C(0, 6) | C(7, 0) | C(6, 1) | C(5, 2) |
| 0.00000 | $-6.78706 \times 10^{-7}$ | 0.00000 | $-2.88566 \times 10^{-6}$ | 0.00000 |
| C(8, 0) | C(7, 1) | C(6, 2) | C(5, 3) | C(4, 4) |
| $5.90830 \times 10^{-7}$ | 0.00000 | $8.25264 \times 10^{-7}$ | 0.00000 | $1.39242 \times 10^{-7}$ |
| C(8, 1) | C(7, 2) | C(6, 3) | C(5, 4) | C(4, 5) |
| $-3.55162 \times 10^{-8}$ | 0.00000 | $-8.64732 \times 10^{-8}$ | 0.00000 | $1.87937 \times 10^{-8}$ |
| C(9, 1) | C(8, 2) | C(7, 3) | C(6, 4) | C(5, 5) |
| 0.00000 | $8.79989 \times 10^{-9}$ | 0.00000 | $-1.09888 \times 10^{-10}$ | 0.00000 |

Surface number S3

| | |
|---|---|
| K | $8.71964 \times 10^{-1}$ |
| $A_4$ | $-2.76968 \times 10^{-3}$ |
| $A_6$ | $2.01351 \times 10^{-4}$ |
| $A_8$ | $-8.68954 \times 10^{-4}$ |

TABLE 12-continued

<Example 6> Aspherical data

| | | | | |
|---|---|---|---|---|
| | $A_{10}$ | $2.42576 \times 10^{-4}$ | | |
| | $A_{12}$ | $3.67894 \times 10^{-6}$ | | |

| C(1, 0) | C(0, 1) | C(2, 0) | C(1, 1) | C(0, 2) |
|---|---|---|---|---|
| 0.00000 | $-6.44440 \times 10^{-2}$ | $-4.18389 \times 10^{-3}$ | 0.00000 | $1.34758 \times 10^{-2}$ |
| C(3, 1) | C(2, 2) | C(1, 3) | C(0, 4) | C(5, 0) |
| 0.00000 | $8.17107 \times 10^{-4}$ | 0.00000 | $1.27355 \times 10^{-3}$ | 0.00000 |
| C(6, 0) | C(5, 1) | C(4, 2) | C(3, 3) | C(2, 4) |
| $5.44153 \times 10^{-4}$ | 0.00000 | $2.23788 \times 10^{-3}$ | 0.00000 | $3.28008 \times 10^{-3}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-4.46681 \times 10^{-3}$ | 0.00000 | $-3.27080 \times 10^{-3}$ | $-1.88422 \times 10^{-5}$ |
| C(4, 1) | C(3, 2) | C(2, 3) | C(1, 4) | C(0, 5) |
| $3.07268 \times 10^{-4}$ | 0.00000 | $-1.51053 \times 10^{-3}$ | 0.00000 | $-1.43518 \times 10^{-3}$ |
| C(1, 5) | C(0, 6) | C(7, 0) | C(6, 1) | C(5, 2) |
| 0.00000 | $1.39024 \times 10^{-3}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8.1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| | | |
|---|---|---|
| K | 1.00962 | |
| $A_4$ | $-2.29512 \times 10^{-4}$ | |
| $A_6$ | $-8.63334 \times 10^{-6}$ | |
| $A_8$ | $1.22050 \times 10^{-6}$ | |
| $A_{10}$ | $-8.47299 \times 10^{-8}$ | |
| $A_{12}$ | $2.48643 \times 10^{-9}$ | |

| C(1, 0) | C(0, 1) | C(2, 0) | C(1, 1) | C(0, 2) |
|---|---|---|---|---|
| 0.00000 | $-2.54020 \times 10^{-1}$ | $-1.37539 \times 10^{-3}$ | 0.00000 | $-2.73140 \times 10^{-3}$ |
| C(3, 1) | C(2, 2) | C(1, 3) | C(0, 4) | C(5, 0) |
| 0.00000 | $4.27135 \times 10^{-4}$ | 0.00000 | $1.20948 \times 10^{-4}$ | 0.00000 |
| C(6, 0) | C(5, 1) | C(4, 2) | C(3, 3) | C(2, 4) |
| $4.16951 \times 10^{-7}$ | 0.00000 | $-5.05714 \times 10^{-6}$ | 0.00000 | $-8.10316 \times 10^{-6}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-1.87787 \times 10^{-3}$ | 0.00000 | $-2.14739 \times 10^{-3}$ | $2.55131 \times 10^{-4}$ |
| C(4, 1) | C(3, 2) | C(2, 3) | C(1, 4) | C(0, 5) |
| $-1.70727 \times 10^{-5}$ | 0.00000 | $-7.12009 \times 10^{-5}$ | 0.00000 | $-3.92908 \times 10^{-5}$ |
| C(1, 5) | C(0, 6) | C(7, 0) | C(6, 1) | C(5, 2) |
| 0.00000 | $-2.50654 \times 10^{-6}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Table 13<Example 7>

TABLE 13-1

| Surface number | Radius of curvature | Distance in Z direction | Nd | vd |
|---|---|---|---|---|
| *S1 | ∞ | 96.3246 | | |
| *S2 | ∞ | −16.9372 | (mirror) | |
| S3 | ∞ | 8.3771 | (mirror) | |
| S4 | ∞ | −6.7160 | (mirror) | |
| S5 | ∞ | −0.2142 | 1.48749 | 70.2 |
| S6 | ∞ | | | |

*Eccentric surface

TABLE 13-2

Eccentricity data

| Surface number | Shift in Y direction | Rotation about X axis |
|---|---|---|
| S1 | 0.0000 | 17.9775 |
| S2 | 0.0000 | 0.0000 |

TABLE 13-3

| Surface number | Distance in Z direction | Shift in Y direction |
|---|---|---|
| Focus 1 | | |
| S1 | 62.4798 | 0.0000 |
| S2 | −17.2656 | −0.0369 |
| Focus 2 | | |
| S1 | 198.9538 | 0.0000 |
| S2 | −16.6242 | 0.0352 |

TABLE 13-4

| | |
|---|---|
| Reduction side pupil position | ∞ |
| Reduction side pupil central angle | 18.056 |
| Reduction side pupil divergent angle | ±8.213 |

TABLE 13-5

Reduction side effective area

| | |
|---|---|
| X direction | ±0.50000 |
| Y direction | ±0.37500 |

TABLE 14

<Example 7> Aspherical data

Surface number S2

| | |
|---|---|
| K | 1.00000 |
| $A_4$ | 0.00000 |
| $A_6$ | 0.00000 |
| $A_8$ | 0.00000 |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $-7.49308 \times 10^{-1}$ | $3.21212 \times 10^{-2}$ | 0.00000 | $5.38470 \times 10^{-2}$ |
| C(3, 1) | C(2, 2) | C(1, 3) | C(0, 4) | C(5, 0) |
| 0.00000 | $3.70675 \times 10^{-3}$ | 0.00000 | $5.77282 \times 10^{-4}$ | 0.00000 |
| C(6, 0) | C(5, 1) | C(4, 2) | C(3, 3) | C(2, 4) |
| $8.22473 \times 10^{-6}$ | 0.00000 | $3.39221 \times 10^{-4}$ | 0.00000 | $1.53355 \times 10^{-4}$ |
| C(4, 3) | C(3, 4) | C(2, 5) | C(1, 6) | C(0, 7) |
| $-5.48853 \times 10^{-5}$ | 0.00000 | $-1.24710 \times 10^{-5}$ | 0.00000 | $1.46426 \times 10^{-6}$ |
| C(3, 5) | C(2, 6) | C(1, 7) | C(0, 8) | C(9, 0) |
| 0.00000 | $6.04691 \times 10^{-7}$ | 0.00000 | $-1.02927 \times 10^{-7}$ | 0.00000 |
| C(3, 6) | C(2, 7) | C(1, 8) | C(0, 9) | C(10, 0) |
| 0.00000 | $-1.64378 \times 10^{-8}$ | 0.00000 | $3.50807 \times 10^{-9}$ | $-1.08920 \times 10^{-8}$ |
| C(4, 6) | C(3, 7) | C(2, 8) | C(1, 9) | C(0, 10) |
| $4.36052 \times 10^{-9}$ | 0.00000 | $1.93921 \times 10^{-10}$ | 0.00000 | $-4.86890 \times 10^{-11}$ |

| C(3, 0) | C(2, 1) | C(1, 2) | C(0, 3) | C(4, 0) |
|---|---|---|---|---|
| 0.00000 | $-4.39860 \times 10^{-3}$ | 0.00000 | $-2.70235 \times 10^{-3}$ | $1.12786 \times 10^{-3}$ |
| C(4, 1) | C(3, 2) | C(2, 3) | C(1, 4) | C(0, 5) |
| $-1.06675 \times 10^{-3}$ | 0.00000 | $-1.08489 \times 10^{-3}$ | 0.00000 | $-3.64820 \times 10^{-5}$ |
| C(1, 5) | C(0, 6) | C(7, 0) | C(6, 1) | C(5, 2) |
| 0.00000 | $-7.89101 \times 10^{-6}$ | 0.00000 | $-3.67480 \times 10^{-6}$ | 0.00000 |
| C(8, 0) | C(7, 1) | C(6, 2) | C(5, 3) | C(4, 4) |
| $2.86917 \times 10^{-7}$ | 0.00000 | $5.03596 \times 10^{-7}$ | 0.00000 | $4.88471 \times 10^{-6}$ |
| C(8, 1) | C(7, 2) | C(6, 3) | C(5, 4) | C(4, 5) |
| $-8.59971 \times 10^{-9}$ | 0.00000 | $-3.08541 \times 10^{-8}$ | 0.00000 | $-2.27574 \times 10^{-7}$ |
| C(9, 1) | C(8, 2) | C(7, 3) | C(6, 4) | C(5, 5) |
| 0.00000 | $1.98054 \times 10^{-9}$ | 0.00000 | $4.41526 \times 10^{-10}$ | 0.00000 |

Surface number S3

| | |
|---|---|
| K | 1.00000 |
| $A_4$ | 0.00000 |
| $A_6$ | 0.00000 |
| $A_8$ | 0.00000 |

TABLE 14-continued

<Example 7> Aspherical data

| | | |
|---|---|---|
| $A_{10}$ | 0.00000 | |
| $A_{12}$ | 0.00000 | |

| C(1, 0) | C(0, 1) | C(2, 0) | C(1, 1) | C(0, 2) |
|---|---|---|---|---|
| 0.00000 | $3.53733 \times 10^{-1}$ | $-9.22425 \times 10^{-2}$ | 0.00000 | $-3.92754 \times 10^{-1}$ |
| C(3, 1) | C(2, 2) | C(1, 3) | C(0, 4) | C(5, 0) |
| 0.00000 | $-5.19614 \times 10^{-2}$ | 0.00000 | $-6.28460 \times 10^{-2}$ | 0.00000 |
| C(6, 0) | C(5, 1) | C(4, 2) | C(3, 3) | C(2, 4) |
| $-1.13030 \times 10^{-4}$ | 0.00000 | $-4.29487 \times 10^{-4}$ | 0.00000 | $-1.53107 \times 10^{-3}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $8.62545 \times 10^{-2}$ | 0.00000 | $2.01134 \times 10^{-1}$ | $-2.55685 \times 10^{-3}$ |
| C(4, 1) | C(3, 2) | C(2, 3) | C(1, 4) | C(0, 5) |
| $1.31294 \times 10^{-3}$ | 0.00000 | $1.38407 \times 10^{-2}$ | 0.00000 | $1.04970 \times 10^{-2}$ |
| C(1, 5) | C(0, 6) | C(7, 0) | C(6, 1) | C(5, 2) |
| 0.00000 | $-7.64825 \times 10^{-4}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| | | |
|---|---|---|
| K | 1.00000 | |
| $A_4$ | 0.00000 | |
| $A_6$ | 0.00000 | |
| $A_8$ | 0.00000 | |
| $A_{10}$ | 0.00000 | |
| $A_{12}$ | 0.00000 | |

| C(1, 0) | C(0, 1) | C(2, 0) | C(1, 1) | C(0, 2) |
|---|---|---|---|---|
| 0.00000 | $1.04719 \times 10^{-1}$ | $-5.52060 \times 10^{-2}$ | 0.00000 | $-5.31180 \times 10^{-2}$ |
| C(3, 1) | C(2, 2) | C(1, 3) | C(0, 4) | C(5, 0) |
| 0.00000 | $-2.45831 \times 10^{-4}$ | 0.00000 | $2.41587 \times 10^{-4}$ | 0.00000 |
| C(6, 0) | C(5, 1) | C(4, 2) | C(3, 3) | C(2, 4) |
| $-2.28726 \times 10^{-6}$ | 0.00000 | $-6.80590 \times 10^{-6}$ | 0.00000 | $1.47700 \times 10^{-6}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $5.54574 \times 10^{-4}$ | 0.00000 | $-4.96906 \times 10^{-4}$ | $-1.99535 \times 10^{-4}$ |
| C(4, 1) | C(3, 2) | C(2, 3) | C(1, 4) | C(0, 5) |
| $2.35004 \times 10^{-5}$ | 0.00000 | $-2.62797 \times 10^{-5}$ | 0.00000 | $-7.08766 \times 10^{-5}$ |
| C(1, 5) | C(0, 6) | C(7, 0) | C(6, 1) | C(5, 2) |
| 0.00000 | $4.54121 \times 10^{-6}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Table 15<Example 8>

TABLE 15-1

| Surface number | Radius of curvature | Distance in Z direction | Nd | vd |
|---|---|---|---|---|
| *S1 | ∞ | 100.6871 | | |
| *S2 | 31.5519 | −6.9558 | (mirror) | |
| *S3 | −12.4076 | 7.1269 | (mirror) | |
| *S4 | −8.4669 | −5.3864 | (mirror) | |
| S5 | ∞ | −0.2142 | 1.48749 | 70.2 |
| *S6 | ∞ | | | |

*Eccentric surface

TABLE 15-2

Eccentricity data

| Surface number | Shift in Y direction | Rotation about X axis |
|---|---|---|
| S1 | 0.0000 | 6.7475 |
| S2 | 0.0159 | −0.5297 |
| S3 | −1.6517 | 0.3516 |
| S4 | 0.7142 | 6.5404 |
| S6 | −3.1054 | 0.0000 |

TABLE 15-3

| Surface number | Distance in Z direction | Shift in Y direction |
|---|---|---|
| | Focus 1 | |
| S1 | 66.1595 | 0.0000 |
| S2 | −7.1000 | 0.0090 |
| | Focus 2 | |
| S1 | 206.2738 | 0.0000 |
| S2 | −6.8072 | 0.0231 |

TABLE 15-4

| | |
|---|---|
| Reduction side pupil position | −6.4248 |
| Reduction side pupil central angle | 1.292 |
| Reduction side pupil divergent angle | 0.928 |

TABLE 15-5

Reduction side effective area

| | |
|---|---|
| X direction | ±0.50000 |
| Y direction | ±0.37500 |

TABLE 16

<Example 8> Aspherical data

Surface number S2

| | |
|---|---|
| K | 1.00001 |
| $A_4$ | $-1.20796 \times 10^{-4}$ |
| $A_6$ | $-5.60279 \times 10^{-7}$ |
| $A_8$ | $-1.60252 \times 10^{-8}$ |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $-2.13583 \times 10^{-2}$ | $2.58228 \times 10^{-2}$ | 0.00000 | $2.25933 \times 10^{-2}$ |
| C(3, 1) | C(2, 2) | C(1, 3) | C(0, 4) | C(5, 0) |
| 0.00000 | $-5.11645 \times 10^{-4}$ | 0.00000 | $1.32068 \times 10^{-6}$ | 0.00000 |
| C(6, 0) | C(5, 1) | C(4, 2) | C(3, 3) | C(2, 4) |
| $-4.04832 \times 10^{-5}$ | 0.00000 | $-5.29465 \times 10^{-6}$ | 0.00000 | $1.32763 \times 10^{-4}$ |
| C(4, 3) | C(3, 4) | C(2, 5) | C(1, 6) | C(0, 7) |
| $-1.94681 \times 10^{-5}$ | 0.00000 | $-4.43308 \times 10^{-5}$ | 0.00000 | $-1.24446 \times 10^{-6}$ |
| C(3, 5) | C(2, 6) | C(1, 7) | C(0, 8) | C(9, 0) |
| 0.00000 | $-3.70474 \times 10^{-7}$ | 0.00000 | $1.00090 \times 10^{-6}$ | 0.00000 |
| C(3, 6) | C(2, 7) | C(1, 8) | C(0, 9) | C(10, 0) |
| 0.00000 | $1.53688 \times 10^{-6}$ | 0.00000 | $2.83776 \times 10^{-7}$ | $-1.03636 \times 10^{-7}$ |
| C(4, 6) | C(3, 7) | C(2, 8) | C(1, 9) | C(0, 10) |
| $-2.05811 \times 10^{-7}$ | 0.00000 | $-1.09537 \times 10^{-7}$ | 0.00000 | $-7.41591 \times 10^{-8}$ |

| C(3, 0) | C(2, 1) | C(1, 2) | C(0, 3) | C(4, 0) |
|---|---|---|---|---|
| 0.00000 | $-5.99931 \times 10^{-3}$ | 0.00000 | $-5.43565 \times 10^{-3}$ | $-3.03517 \times 10^{-4}$ |
| C(4, 1) | C(3, 2) | C(2, 3) | C(1, 4) | C(0, 5) |
| $1.30095 \times 10^{-4}$ | 0.00000 | $1.18769 \times 10^{-4}$ | 0.00000 | $1.69084 \times 10^{-4}$ |
| C(1, 5) | C(0, 6) | C(7, 0) | C(6, 1) | C(5, 2) |
| 0.00000 | $-3.51074 \times 10^{-5}$ | 0.00000 | $1.50954 \times 10^{-5}$ | 0.00000 |
| C(8, 0) | C(7, 1) | C(6, 2) | C(5, 3) | C(4, 4) |
| $5.76885 \times 10^{-6}$ | 0.00000 | $6.99874 \times 10^{-6}$ | 0.00000 | $1.05557 \times 10^{-5}$ |
| C(8, 1) | C(7, 2) | C(6, 3) | C(5, 4) | C(4, 5) |
| $-2.45081 \times 10^{-6}$ | 0.00000 | $-5.49297 \times 10^{-6}$ | 0.00000 | $-5.97757 \times 10^{-7}$ |
| C(9, 1) | C(8, 2) | C(7, 3) | C(6, 4) | C(5, 5) |
| 0.00000 | $4.40025 \times 10^{-7}$ | 0.00000 | $7.67362 \times 10^{-7}$ | 0.00000 |

Surface number S3

| | |
|---|---|
| K | $8.71964 \times 10^{-1}$ |
| $A_4$ | $-2.91150 \times 10^{-3}$ |
| $A_6$ | $3.91769 \times 10^{-4}$ |
| $A_8$ | $-1.76388 \times 10^{-4}$ |

TABLE 16-continued

<Example 8> Aspherical data

| | | | | |
|---|---|---|---|---|
| $A_{10}$ | | $7.05106 \times 10^{-6}$ | | |
| $A_{12}$ | | $1.33557 \times 10^{-6}$ | | |

| C(1, 0) | C(0, 1) | C(2, 0) | C(1, 1) | C(0, 2) |
|---|---|---|---|---|
| 0.00000 | $-7.43546 \times 10^{-2}$ | $3.31592 \times 10^{-3}$ | 0.00000 | $5.63205 \times 10^{-3}$ |
| C(3, 1) | C(2, 2) | C(1, 3) | C(0, 4) | C(5, 0) |
| 0.00000 | $-1.88025 \times 10^{-4}$ | 0.00000 | $1.56660 \times 10^{-4}$ | 0.00000 |
| C(6, 0) | C(5, 1) | C(4, 2) | C(3, 3) | C(2, 4) |
| $6.99010 \times 10^{-6}$ | 0.00000 | $-2.01045 \times 10^{-4}$ | 0.00000 | $-5.01086 \times 10^{-4}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-6.73130 \times 10^{-3}$ | 0.00000 | $-6.58401 \times 10^{-3}$ | $8.39611 \times 10^{-5}$ |
| C(4, 1) | C(3, 2) | C(2, 3) | C(1, 4) | C(0, 5) |
| $-6.49784 \times 10^{-4}$ | 0.00000 | $-1.56177 \times 10^{-3}$ | 0.00000 | $-7.18150 \times 10^{-4}$ |
| C(1, 5) | C(0, 6) | C(7, 0) | C(6, 1) | C(5, 2) |
| 0.00000 | $-2.91855 \times 10^{-4}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| | |
|---|---|
| K | 1.00962 |
| $A_4$ | $-1.61910 \times 10^{-4}$ |
| $A_6$ | $-6.45764 \times 10^{-6}$ |
| $A_8$ | $8.02713 \times 10^{-7}$ |
| $A_{10}$ | $-4.13118 \times 10^{-8}$ |
| $A_{12}$ | $9.02649 \times 10^{-10}$ |

| C(1, 0) | C(0, 1) | C(2, 0) | C(1, 1) | C(0, 2) |
|---|---|---|---|---|
| 0.00000 | $-2.74697 \times 10^{-1}$ | $-4.78509 \times 10^{-3}$ | 0.00000 | $-8.54646 \times 10^{-3}$ |
| C(3, 1) | C(2, 2) | C(1, 3) | C(0, 4) | C(5, 0) |
| 0.00000 | $2.29392 \times 10^{-4}$ | 0.00000 | $1.16817 \times 10^{-4}$ | 0.00000 |
| C(6, 0) | C(5, 1) | C(4, 2) | C(3, 3) | C(2, 4) |
| $-7.24571 \times 10^{-6}$ | 0.00000 | $-1.94384 \times 10^{-5}$ | 0.00000 | $-1.00202 \times 10^{-5}$ |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-2.15940 \times 10^{-3}$ | 0.00000 | $-2.07617 \times 10^{-3}$ | $7.02362 \times 10^{-5}$ |
| C(4, 1) | C(3, 2) | C(2, 3) | C(1, 4) | C(0, 5) |
| $-8.90712 \times 10^{-5}$ | 0.00000 | $-6.72377 \times 10^{-5}$ | 0.00000 | $-2.40164 \times 10^{-5}$ |
| C(1, 5) | C(0, 6) | C(7, 0) | C(6, 1) | C(5, 2) |
| 0.00000 | $-2.59631 \times 10^{-6}$ | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Table 17<Example 9>

TABLE 17-1

| Surface number | Radius of curvature | Distance in Z direction | Nd | vd |
|---|---|---|---|---|
| S1 | ∞ | 70.4575 | | |
| *S2 | 24.7405 | −11.5623 | (mirror) | |
| *S3 | −12.3418 | 8.1533 | (mirror) | |
| *S4 | −8.7697 | −6.1347 | (mirror) | |
| S5 | ∞ | −0.2142 | 1.48749 | 70.2 |
| S6 | ∞ | | | |

*Eccentric surface

TABLE 17-2

Eccentricity data

| Surface number | Shift in Y direction | Rotation about X axis |
|---|---|---|
| S2 | 1.8613 | −11.3280 |
| S3 | 0.7176 | −1.2154 |
| S4 | 2.4584 | −2.5059 |

TABLE 17-3

| Surface number | Distance in Z direction | Shift in Y direction |
|---|---|---|
| Focus 1 | | |
| S1 | 45.3345 | 0.0000 |
| S2 | −11.5623 | 1.8443 |
| S3 | 8.1533 | 0.7445 |
| S4 | −6.1410 | 2.4852 |
| Focus 2 | | |
| S1 | 145.6856 | 0.0000 |
| S2 | −11.5623 | 1.9331 |
| S3 | 8.1533 | 0.6978 |
| S4 | −6.1300 | 2.4386 |

TABLE 17-4

| | |
|---|---|
| Reduction side pupil position | ∞ |
| Reduction side pupil central angle | 8.451 |
| Reduction side pupil divergent angle | ±8.213 |

TABLE 17-5

Reduction side effective area

| | |
|---|---|
| X direction | ±0.50000 |
| Y direction | ±0.37500 |

TABLE 18

<Example 9> Aspherical data

Surface number S2

| | |
|---|---|
| K | 1.00001 |
| $A_4$ | $-1.20796 \times 10^{-4}$ |
| $A_6$ | $-5.60279 \times 10^{-7}$ |
| $A_8$ | $-1.60252 \times 10^{-8}$ |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $-3.47279 \times 10^{-1}$ | $1.76255 \times 10^{-2}$ | 0.00000 | $3.95365 \times 10^{-2}$ |
| C(3, 1) | C(2, 2) | C(1, 3) | C(0, 4) | C(5, 0) |
| 0.00000 | $-4.68866 \times 10^{-4}$ | 0.00000 | $-2.42274 \times 10^{-4}$ | 0.00000 |
| C(6, 0) | C(5, 1) | C(4, 2) | C(3, 3) | C(2, 4) |
| $3.11012 \times 10^{-6}$ | 0.00000 | $-1.08037 \times 10^{-5}$ | 0.00000 | $6.67446 \times 10^{-6}$ |
| C(4, 3) | C(3, 4) | C(2, 5) | C(1, 6) | C(0, 7) |
| $8.52977 \times 10^{-7}$ | 0.00000 | $-1.57723 \times 10^{-6}$ | 0.00000 | $-3.56646 \times 10^{-8}$ |
| C(3, 5) | C(2, 6) | C(1, 7) | C(0, 8) | C(9, 0) |
| 0.00000 | $1.48805 \times 10^{-7}$ | 0.00000 | $6.89414 \times 10^{-9}$ | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-2.34383 \times 10^{-3}$ | 0.00000 | $-2.94852 \times 10^{-3}$ | $-3.88159 \times 10^{-4}$ |
| C(4, 1) | C(3, 2) | C(2, 3) | C(1, 4) | C(0, 5) |
| $1.29027 \times 10^{-4}$ | 0.00000 | $8.92097 \times 10^{-5}$ | 0.00000 | $4.18874 \times 10^{-5}$ |
| C(1, 5) | C(0, 6) | C(7, 0) | C(6, 1) | C(5, 2) |
| 0.00000 | $5.81530 \times 10^{-7}$ | 0.00000 | $-9.80687 \times 10^{-7}$ | 0.00000 |
| C(8, 0) | C(7, 1) | C(6, 2) | C(5, 3) | C(4, 4) |
| $1.12086 \times 10^{-7}$ | 0.00000 | $6.89912 \times 10^{-8}$ | 0.00000 | $6.65936 \times 10^{-8}$ |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

TABLE 18-continued

<Example 9> Aspherical data

Surface number S3

| | | |
|---|---|---|
| K | | $8.71964 \times 10^{-1}$ |
| $A_4$ | | $-2.16224 \times 10^{-3}$ |
| $A_6$ | | $-2.12137 \times 10^{-4}$ |
| $A_8$ | | $8.97038 \times 10^{-5}$ |
| $A_{10}$ | | $-1.83392 \times 10^{-5}$ |
| $A_{12}$ | | $1.33557 \times 10^{-6}$ |

| C(1, 0) | C(0, 1) | C(2, 0) | C(1, 1) | C(0, 2) |
|---|---|---|---|---|
| 0.00000 | $-4.39048 \times 10^{-2}$ | $-4.16234 \times 10^{-3}$ | 0.00000 | $1.17430 \times 10^{-2}$ |
| C(3, 1) | C(2, 2) | C(1, 3) | C(0, 4) | C(5, 0) |
| 0.00000 | $8.27236 \times 10^{-4}$ | 0.00000 | $7.79187 \times 10^{-4}$ | 0.00000 |
| C(6, 0) | C(5, 1) | C(4, 2) | C(3, 3) | C(2, 4) |
| 0.00000 | 0.00000 | 0.00000 | 0.00000 | 0.00000 |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $1.59240 \times 10^{-3}$ | 0.00000 | $1.52481 \times 10^{-3}$ | $-4.94905 \times 10^{-4}$ |
| C(4, 1) | C(3, 2) | C(2, 3) | C(1, 4) | C(0, 5) |
| $3.90231 \times 10^{-4}$ | 0.00000 | $-1.86057 \times 10^{-4}$ | 0.00000 | $-7.65520 \times 10^{-5}$ |
| C(1, 5) | C(0, 6) | C(7, 0) | C(6, 1) | C(5, 2) |
| 0.00000 | 0.00000 | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| | | |
|---|---|---|
| K | | 1.00962 |
| $A_4$ | | $-1.74679 \times 10^{-4}$ |
| $A_6$ | | $-4.01398 \times 10^{-6}$ |
| $A_8$ | | $3.52899 \times 10^{-7}$ |
| $A_{10}$ | | $-2.47797 \times 10^{-8}$ |
| $A_{12}$ | | $9.02649 \times 10^{-10}$ |

| C(1, 0) | C(0, 1) | C(2, 0) | C(1, 1) | C(0, 2) |
|---|---|---|---|---|
| 0.00000 | $-2.39896 \times 10^{-1}$ | $-3.26815 \times 10^{-3}$ | 0.00000 | $-4.60868 \times 10^{-3}$ |
| C(3, 1) | C(2, 2) | C(1, 3) | C(0, 4) | C(5, 0) |
| 0.00000 | $2.94631 \times 10^{-4}$ | 0.00000 | $9.74029 \times 10^{-5}$ | 0.00000 |
| C(6, 0) | C(5, 1) | C(4, 2) | C(3, 3) | C(2, 4) |
| 0.00000 | 0.00000 | 0.00000 | 0.00000 | 0.00000 |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-1.66177 \times 10^{-3}$ | 0.00000 | $-1.77328 \times 10^{-3}$ | $1.66497 \times 10^{-4}$ |
| C(4, 1) | C(3, 2) | C(2, 3) | C(1, 4) | C(0, 5) |
| $-6.07409 \times 10^{-6}$ | 0.00000 | $-3.35900 \times 10^{-5}$ | 0.00000 | $-2.20120 \times 10^{-5}$ |
| C(1, 5) | C(0, 6) | C(7, 0) | C(6, 1) | C(5, 2) |
| 0.00000 | 0.00000 | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Table 19<Example 10>

TABLE 19-1

| Surface number | Radius of curvature | Distance in Z direction | Nd | νd |
|---|---|---|---|---|
| S1 | ∞ | 70.4510 | | |
| *S2 | 26.3573 | −10.7108 | (mirror) | |
| *S3 | −11.7284 | 8.0952 | (mirror) | |
| *S4 | −8.8142 | −6.1860 | (mirror) | |
| S5 | ∞ | −0.2142 | 1.48749 | 70.2 |
| S6 | ∞ | | | |

*Eccentric surface

TABLE 19-2

Eccentricity data

| Surface number | Shift in Y direction | Rotation about X axis |
|---|---|---|
| S2 | 2.0803 | 11.7355 |
| S3 | 0.5521 | −0.9461 |
| S4 | 2.1043 | −2.7456 |

TABLE 19-4

| Reduction side pupil position | ∞ |
|---|---|
| Reduction side pupil central angle | 7.999 |
| Reduction side pupil divergent angle | ±8.213 |

TABLE 19-5

Reduction side effective area

| X direction | ±0.50000 |
|---|---|
| Y direction | ±0.37500 |

TABLE 20

<Example 10> Aspherical data

Surface number S2

| | |
|---|---|
| K | 1.00001 |
| $A_4$ | $-1.12203 \times 10^{-4}$ |
| $A_6$ | $3.20967 \times 10^{-7}$ |
| $A_8$ | $-6.24705 \times 10^{-10}$ |
| $A_{10}$ | 0.00000 |
| $A_{12}$ | 0.00000 |

| C(1, 0) | C(0, 1) | C(2, 0) | C(1, 1) | C(0, 2) |
|---|---|---|---|---|
| 0.00000 | $1.26646 \times 10^{-1}$ | $1.79148 \times 10^{-2}$ | 0.00000 | $3.56790 \times 10^{-2}$ |
| C(3, 1) | C(2, 2) | C(1, 3) | C(0, 4) | C(5, 0) |
| 0.00000 | $-4.27543 \times 10^{-4}$ | 0.00000 | $-2.34366 \times 10^{-4}$ | 0.00000 |
| C(6, 0) | C(5, 1) | C(4, 2) | C(3, 3) | C(2, 4) |
| $5.64777 \times 10^{-6}$ | 0.00000 | $-1.33777 \times 10^{-5}$ | 0.00000 | $5.27207 \times 10^{-6}$ |
| C(4, 3) | C(3, 4) | C(2, 5) | C(1, 6) | C(0, 7) |
| $6.53773 \times 10^{-7}$ | 0.00000 | $-8.23562 \times 10^{-7}$ | 0.00000 | $-4.33968 \times 10^{-8}$ |
| C(3, 5) | C(2, 6) | C(1, 7) | C(0, 8) | C(9, 0) |
| 0.00000 | $1.48643 \times 10^{-8}$ | 0.00000 | $-5.72079 \times 10^{-9}$ | 0.00000 |
| C(3, 6) | C(2, 7) | C(1, 8) | C(0, 9) | C(10, 0) |
| 0.00000 | $-6.10612 \times 10^{-25}$ | 0.00000 | $-6.10612 \times 10^{-25}$ | $-8.55364 \times 10^{-28}$ |
| C(4, 6) | C(3, 7) | C(2, 8) | C(1, 9) | C(0, 10) |
| $-8.55364 \times 10^{-28}$ | 0.00000 | $-8.55364 \times 10^{-28}$ | 0.00000 | $-8.55400 \times 10^{-28}$ |

| C(3, 0) | C(2, 1) | C(1, 2) | C(0, 3) | C(4, 0) |
|---|---|---|---|---|
| 0.00000 | $-2.43074 \times 10^{-3}$ | 0.00000 | $-2.58403 \times 10^{-3}$ | $-4.85478 \times 10^{-4}$ |
| C(4, 1) | C(3, 2) | C(2, 3) | C(1, 4) | C(0, 5) |
| $1.49378 \times 10^{-4}$ | 0.00000 | $5.79891 \times 10^{-5}$ | 0.00000 | $3.33690 \times 10^{-5}$ |
| C(1, 5) | C(0, 6) | C(7, 0) | C(6, 1) | C(5, 2) |
| 0.00000 | $4.02804 \times 10^{-8}$ | 0.00000 | $-1.61584 \times 10^{-6}$ | 0.00000 |
| C(8, 0) | C(7, 1) | C(6, 2) | C(5, 3) | C(4, 4) |
| $4.16265 \times 10^{-8}$ | 0.00000 | $4.58029 \times 10^{-8}$ | 0.00000 | $-1.50077 \times 10^{-8}$ |
| C(8, 1) | C(7, 2) | C(6, 3) | C(5, 4) | C(4, 5) |
| $-6.10612 \times 10^{-25}$ | 0.00000 | $-6.10612 \times 10^{-25}$ | 0.00000 | $-6.10612 \times 10^{-25}$ |
| C(9, 1) | C(8, 2) | C(7, 3) | C(6, 4) | C(5, 5) |
| 0.00000 | $-8.55364 \times 10^{-28}$ | 0.00000 | $-8.55364 \times 10^{-28}$ | 0.00000 |

Surface number S3

| | |
|---|---|
| K | $8.71964 \times 10^{-1}$ |
| $A_4$ | $-1.98693 \times 10^{-3}$ |
| $A_6$ | $-2.71487 \times 10^{-4}$ |
| $A_8$ | $1.10393 \times 10^{-4}$ |
| $A_{10}$ | $-1.97533 \times 10^{-5}$ |
| $A_{12}$ | $1.33557 \times 10^{-6}$ |

| C(1, 0) | C(0, 1) | C(2, 0) | C(1, 1) | C(0, 2) |
|---|---|---|---|---|
| 0.00000 | $-1.98364 \times 10^{-2}$ | $-5.94466 \times 10^{-3}$ | 0.00000 | $9.30778 \times 10^{-3}$ |

TABLE 20-continued

<Example 10> Aspherical data

| C(3, 1) | C(2, 2) | C(1, 3) | C(0, 4) | C(5, 0) |
|---|---|---|---|---|
| 0.00000 | $1.43497 \times 10^{-3}$ | 0.00000 | $6.90206 \times 10^{-4}$ | 0.00000 |
| C(6, 0) | C(5, 1) | C(4, 2) | C(3, 3) | C(2, 4) |
| 0.00000 | 0.00000 | 0.00000 | 0.00000 | 0.00000 |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $2.24822 \times 10^{-3}$ | 0.00000 | $3.45593 \times 10^{-3}$ | $-1.24240 \times 10^{-3}$ |
| C(4, 1) | C(3, 2) | C(2, 3) | C(1, 4) | C(0, 5) |
| $4.56941 \times 10^{-4}$ | 0.00000 | $-7.14623 \times 10^{-4}$ | 0.00000 | $-2.20280 \times 10^{-4}$ |
| C(1, 5) | C(0, 6) | C(7, 0) | C(6, 1) | C(5, 2) |
| 0.00000 | 0.00000 | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

Surface number S4

| K | 1.00962 |
|---|---|
| $A_4$ | $-1.61987 \times 10^{-4}$ |
| $A_6$ | $-3.76498 \times 10^{-6}$ |
| $A_8$ | $2.76777 \times 10^{-7}$ |
| $A_{10}$ | $-1.78827 \times 10^{-8}$ |
| $A_{12}$ | $9.02649 \times 10^{-10}$ |

| C(1, 0) | C(0, 1) | C(2, 0) | C(1, 1) | C(0, 2) |
|---|---|---|---|---|
| 0.00000 | $-2.02317 \times 10^{-1}$ | $-3.88509 \times 10^{-3}$ | 0.00000 | $-4.22741 \times 10^{-3}$ |
| C(3, 1) | C(2, 2) | C(1, 3) | C(0, 4) | C(5, 0) |
| 0.00000 | $2.50274 \times 10^{-4}$ | 0.00000 | $8.10240 \times 10^{-5}$ | 0.00000 |
| C(6, 0) | C(5, 1) | C(4, 2) | C(3, 3) | C(2, 4) |
| 0.00000 | 0.00000 | 0.00000 | 0.00000 | 0.00000 |
| C(4, 3) | C(3, 4) | C(2, 5) | C(1, 6) | C(0, 7) |
| 0.00000 | 0.00000 | 0.00000 | 0.00000 | 0.00000 |
| C(3, 5) | C(2, 6) | C(1, 7) | C(0, 8) | C(9, 0) |
| 0.00000 | 0.00000 | 0.00000 | 0.00000 | 0.00000 |
| C(3, 6) | C(2, 7) | C(1, 8) | C(0, 9) | C(10, 0) |
| 0.00000 | 0.00000 | 0.00000 | 0.00000 | 0.00000 |
| C(4, 6) | C(3, 7) | C(2, 8) | C(1, 9) | C(0, 10) |
| 0.00000 | 0.00000 | 0.00000 | 0.00000 | 0.00000 |

| C(3, 0) | C(2, 1) | C(1, 2) | C(0, 3) | C(4, 0) |
|---|---|---|---|---|
| 0.00000 | $-1.46793 \times 10^{-3}$ | 0.00000 | $-1.52795 \times 10^{-3}$ | $1.44247 \times 10^{-4}$ |
| C(4, 1) | C(3, 2) | C(2, 3) | C(1, 4) | C(0, 5) |
| $2.06284 \times 10^{-6}$ | 0.00000 | $-2.80226 \times 10^{-5}$ | 0.00000 | $-2.18010 \times 10^{-5}$ |
| C(1, 5) | C(0, 6) | C(7, 0) | C(6, 1) | C(5, 2) |
| 0.00000 | 0.00000 | 0.00000 | 0.00000 | 0.00000 |
| C(8, 0) | C(7, 1) | C(6, 2) | C(5, 3) | C(4, 4) |
| 0.00000 | 0.00000 | 0.00000 | 0.00000 | 0.00000 |
| C(8, 1) | C(7, 2) | C(6, 3) | C(5, 4) | C(4, 5) |
| 0.00000 | 0.00000 | 0.00000 | 0.00000 | 0.00000 |
| C(9, 1) | C(8, 2) | C(7, 3) | C(6, 4) | C(5, 5) |
| 0.00000 | 0.00000 | 0.00000 | 0.00000 | 0.00000 |

TABLE 21

| | θL | θUL | θM1 | θM2 | θM3 | θF |
|---|---|---|---|---|---|---|
| Example 1 | 10.2 | 39.1 | 37.4 | 26.8 | 21.6 | 8.2 |
| Example 2 | 10.4 | 38.8 | 37.6 | 26.6 | 21.3 | 8.2 |
| Example 3 | 9.4 | 44.7 | 39.5 | 24.6 | 19.7 | 8.2 |
| Example 4 | 11.6 | 37.1 | 35.6 | 40.8 | 13.5 | 8.2 |
| Example 5 | 11.6 | 37.9 | 35.6 | 28.1 | 17.0 | 12.0 |
| Example 6 | 2.6 | 40.6 | 30.2 | 21.2 | 15.4 | 8.2 |
| Example 7 | 10.4 | 38.3 | 35.4 | 25.2 | 20.7 | 8.2 |
| Example 8 | 10.9 | 36.5 | 40.9 | 22.4 | 16.1 | 8.2 |
| Example 9 | 9.5 | 39.7 | 47.6 | 22.6 | 14.5 | 8.2 |
| Example 10 | 11.5 | 38.4 | 48.9 | 23.0 | 14.5 | 8.2 |

What is claimed is:

1. A reflection optical system placed between two image surfaces one of which is an enlargement side image surface and the other of which is a reduction side image surface, and forming no intermediate image between the two image surfaces, said reflection optical system comprising:
   a first mirror;
   a second mirror; and
   a third mirror;
   wherein among optical surfaces of the reflection optical system, curved surfaces are only three reflection surfaces of the first mirror, the second mirror and the third mirror in the order from the side of said enlargement side image surface, and
   the following conditional expressions (1) and (2) are met:

$$\theta L < 20 \text{ degrees} \quad (1)$$

$$25 \text{ degrees} < \theta UL < 55 \text{ degrees} \quad (2)$$

where
   $\theta L$: minimum angle which a light beam passing through the center of a reduction side pupil forms with respect to the enlargement side image surface; and
   $\theta UL$: difference between maximum and minimum angles which a light beam passing through the center of a reduction side pupil forms with respect to the enlargement side image surface.

2. The reflection optical system according to claim 1, wherein only one symmetry plane exists, and the following conditional expressions (3) to (5) are met in this symmetry plane:

$$20 \text{ degrees} < \theta M1 < 55 \text{ degrees} \quad (3)$$

$$15 \text{ degrees} < \theta M2 < 50 \text{ degrees} \quad (4)$$

$$8 \text{ degrees} < \theta M3 < 30 \text{ degrees} \quad (5)$$

where
   $\theta M1$: deviation angle of the light beam of pupil center passing through the center of the reduction side image surface in the first mirror;
   $\theta M2$: deviation angle of the light beam of pupil center passing through the center of the reduction side image surface in the second mirror; and
   $\theta M3$: deviation angle of the light beam of pupil center passing through the center of the reduction side image surface in the third mirror.

3. The reflection optical system according to claim 1, wherein the following conditional expressions (6) to (8) are met:

$$\theta L < 15 \text{ degrees} \quad (6)$$

$$30 \text{ degrees} < \theta UL \quad (7)$$

$$7.5 \text{ degrees} < |\theta F| \quad (8)$$

where
   $\theta F$: reduction side pupil divergent angle.

4. The reflection optical system according to claim 1, wherein said enlargement side image surface and said reduction side image surface are non-parallel.

5. The reflection optical system according to claim 1, wherein a focus operation is adapted so that said first mirror is shifted alone, said second mirror and said third mirror are shifted integrally, and shift trails of the three mirrors form straight lines.

6. The reflection optical system according to claim 1, wherein a focus operation is adapted so that said first mirror is shifted alone, said second mirror and said third mirror are fixed to said reduction side image surface.

7. The reflection optical system according to claim 6, wherein in said focus operation, a shift trail of said first mirror forms a straight line.

8. The reflection optical system according to claim 1, wherein a reduction side pupil position is at an infinite distance, and angles which the light beam of pupil center form with respect to the normal line of the reduction side image surface at the points on said reduction side image surface are mutually substantially equal.

9. The reflection optical system according to claim 8, wherein a fixed diaphragm or adjustable diaphragm for controlling luminous flux diameter is placed between said second mirror and said third mirror.

10. The reflection optical system according to claim 1, wherein a reduction side pupil position is near said third mirror.

11. The reflection optical system according to claim 10, wherein a fixed diaphragm or adjustable diaphragm for controlling luminous flux diameter is placed near said third mirror.

12. The reflection optical system according to claim 1, wherein the reflection optical system is utilized as a projection optical system projecting under magnification an image displayed on said reduction side image surface onto said enlargement side image surface.

13. The reflection optical system according to claim 12, wherein a color combining optical system is placed between said third mirror and said reduction side image surface.

14. The reflection optical system according to claim 13, wherein said color combining optical system is a cross dichroic prism.

15. The reflection optical system according to claim 13, wherein said color combining optical system is a polarization beam splitter.

16. A projection display apparatus utilizing the reflection optical system comprising:
   a light source;
   a light valve placed on said reduction side image surface;
   an illumination optical section guiding a luminous flux from said light source to the light valve; and
   the reflection optical system according to claim 12;
   wherein the luminous flux from said light source is optically modulated by said light valve, and projected onto a screen placed on said enlargement side image surface by the reflection optical system.

* * * * *